United States Patent
Miyamoto et al.

(10) Patent No.: US 8,249,794 B2
(45) Date of Patent: Aug. 21, 2012

(54) INTER-CYLINDER AIR-FUEL RATIO IMBALANCE JUDGMENT DEVICE FOR MULTI-CYLINDER INTERNAL COMBUSTION ENGINE

(75) Inventors: Hiroshi Miyamoto, Susono (JP); Hiroshi Sawada, Gotenba (JP); Yasushi Iwazaki, Ebina (JP); Tatsuya Tsuji, Susono (JP); Toru Kidokoro, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/257,842

(22) PCT Filed: Sep. 8, 2009

(86) PCT No.: PCT/JP2009/065983
§ 371 (c)(1),
(2), (4) Date: Sep. 20, 2011

(87) PCT Pub. No.: WO2011/030451
PCT Pub. Date: Mar. 17, 2011

(65) Prior Publication Data
US 2012/0116651 A1 May 10, 2012

(51) Int. Cl.
*B60T 7/12* (2006.01)
(52) U.S. Cl. .................... 701/103; 701/114
(58) Field of Classification Search .......... 701/103–105, 701/114, 115; 123/434, 435, 672, 673
See application file for complete search history.

(56) References Cited

U.S. PATENT DOCUMENTS

| 7,152,594 B2 | 12/2006 | Anilovich et al. |
| 7,783,408 B2* | 8/2010 | Teraya ........................... 701/102 |
| 2008/0121213 A1 | 5/2008 | Kurosawa et al. |
| 2009/0037079 A1 | 2/2009 | Suzuki et al. |
| 2009/0211350 A1* | 8/2009 | Iwazaki et al. ............. 73/114.72 |
| 2011/0288739 A1* | 11/2011 | Kidokoro et al. ............... 701/99 |
| 2012/0035831 A1* | 2/2012 | Kidokoro et al. ............. 701/104 |

FOREIGN PATENT DOCUMENTS

| JP | A-2008-051003 | 3/2008 |
| JP | A-2008-128160 | 6/2008 |
| JP | A-2009-030455 | 2/2009 |
| WO | WO 2009/013600 A2 | 1/2009 |

OTHER PUBLICATIONS

International Search Report issued in International Application No. PCT/JP2009/065983 dated Dec. 15, 2009 (with translation).

* cited by examiner

*Primary Examiner* — John Kwon
(74) *Attorney, Agent, or Firm* — Oliff & Berridge, PLC

(57) ABSTRACT

When the intake air amount is smaller than the specific intake air amount, the unit air-fuel ratio change amount calculated during the engine operation is corrected such that the unit air-fuel ratio change amount increases in the condition that the base unit air-fuel ratio change amount is an upper limit and when the intake air amount is greater than the specific intake air amount, the unit air-fuel ratio change amount calculated during the engine operation is corrected such that the unit air-fuel ratio change amount decreases in the condition that the base unit air-fuel ratio change amount is a lower limit. When the corrected unit air-fuel ratio change amount is greater than the judgment value, it is judged that the inter-cylinder air-fuel ratio imbalance condition occurs.

9 Claims, 34 Drawing Sheets (A)

(B)

INTER-CYLINDER AIR-FUEL RATIO IMBALANCE JUDGMENT DEVICE FOR MULTI-CYLINDER INTERNAL COMBUSTION ENGINE

TECHNICAL FIELD

The present invention relates to an inter-cylinder air-fuel ratio imbalance judgment device for a multi-cylinder internal combustion engine.

BACKGROUND ART

A multi-cylinder internal combustion engine is disclosed in U.S. Pat. No. 7,152,594, which engine has a plurality of combustion chambers, fuel injectors arranged corresponding to each of the combustion chambers, and an air-fuel ratio sensor arrange for detecting an air-fuel ratio of an exhaust gas in an exhaust passage downstream of a portion where the exhaust passages each communicating with the corresponding combustion chamber converge, in which an amount of fuel injected from each fuel injector is controlled such that an air-fuel ratios of the mixtures formed in the combustion chambers are controlled to a target air-fuel ratio on the basis of the output value of the air-fuel ratio sensor.

In the above-mentioned U.S. patent, there is a description, regarding the air-fuel ratio of the exhaust gas discharged from the combustion chamber. That is, the air-fuel ratio of the exhaust gas discharged from the combustion chamber becomes great or small periodically. The air-fuel ratio of the exhaust gas changes accordingly and therefore viewing the output value of the air-fuel ratio sensor along the time axis, the line described by the output values of the air-fuel ratio sensor periodically moves up and down. Further, viewing the length of the line described by the output values of the air-fuel ratio sensor for a constant time (hereinafter, this length will be referred to as "sensor output line length"), when the air-fuel ratio of the mixture formed in the combustion chamber is accurately controlled to the target air-fuel ratio, the sensor output line length become a certain specific length in the case where the engine speed and the amount of the air sucked into the combustion chamber (hereinafter, this amount will be referred to as "intake air amount") are both constant. On the other hand, when the air-fuel ratio of the mixture formed in one or more of the combustion chambers is not accurately controlled to the target air-fuel ratio, the sensor output line length becomes longer than the above-mentioned specific length even if the engine speed and the intake air amount are both constant.

According to the invention disclosed in the above-mentioned U.S. patent, a sensor output line length when the air-fuel ratio of the mixture formed in the combustion chamber is accurately controlled to the target air-fuel ratio is previously obtained as a base sensor output line length, depending on the engine speed and the intake air amount, the sensor output line length is calculated during the operation of the internal combustion engine, the calculated sensor output line length is compared with the base sensor output line length, depending on the engine speed and the intake air amount at that time and when the calculated sensor output line length is shorter than the base sensor output lien length, it is judged that the air-fuel ratio of the mixture formed in the combustion chamber is accurately controlled to the target air-fuel ratio. On the other hand, when the calculated sensor output line length is longer than the base sensor output line length, it is judged that the air-fuel ratio of the mixture formed in one or more of the combustion chamber is not accurately controlled, i.e. it is judged that the condition where there is a difference in the air-fuel ratio between the mixtures formed in the combustion chambers (hereinafter, this condition will be referred to as "inter-cylinder air-fuel ratio imbalance condition) occurs.

When the inter-cylinder air-fuel ratio imbalance condition occurs, the emission property of the exhaust gas discharged from the combustion chamber becomes worse. Accordingly, in the invention disclosed in the above-mentioned U.S. patent, when it is judged that the inter-cylinder air-fuel ratio imbalance condition occurs, it is indicated.

In the invention disclosed in the above-mentioned U.S. patent, as explained above, the base sensor output line length used for judging whether the inter-cylinder air-fuel ratio imbalance condition occurs, i.e. judging the occurrence of the inter-cylinder air-fuel ratio imbalance condition depends on the engine speed. Therefore, in order to judge the occurrence of the inter-cylinder air-fuel ratio imbalance condition, it is necessary to previously obtain the base sensor output line length, depending on the engine speed. However, it is a very heavy load to previously obtain the base sensor output line length, depending on the engine speed and therefore the cost of the manufacturing of the internal combustion engine increases. Therefore, the judgment of the occurrence of the inter-cylinder air-fuel ratio imbalance condition is very essential to reduce the emission of the exhaust gas, however, it is not preferred to previously obtain the base sensor output line length, depending on the engine speed in order to reduce the cost of manufacturing of the internal combustion engine. For the reasons, the technique for judging the occurrence of the inter-cylinder air-fuel ratio imbalance condition without previously obtaining the base sensor output line length, depending on the engine speed is desired. In other words, the technique for judging the occurrence of the inter-cylinder air-fuel ratio imbalance condition without previously obtaining a judgment value used for judging the occurrence of the inter-cylinder air-fuel ratio imbalance condition is desired.

DISCLOSURE OF THE INVENTION

Accordingly, the object of the present invention is to judge whether the inter-cylinder air-fuel ratio imbalance condition occurs using a judgment value which is independent of the engine speed. In other words, the object of the present invention is to judge whether the inter-cylinder air-fuel ratio imbalance condition occurs using a judgment value which is independent of the engine speed, which condition where the air-fuel ratio of the mixture formed in each combustion chamber is not controlled to the target air-fuel ratio or to within a predetermined allowed air-fuel ratio range including the target air-fuel ratio.

In order to accomplish the above-mentioned object, according to the first invention of this application, in a multi-cylinder internal combustion engine, having a plurality of combustion chambers, fuel injectors arranged corresponding to the combustion chambers, respectively and an air-fuel ratio sensor arranged for detecting an air-fuel ratio of an exhaust gas in one of an exhaust passage converging portion where exhaust passages in communication with corresponding combustion chambers converge and an exhaust passage portion downstream of the exhaust passage converging portion, wherein an amount of fuel injected from each fuel injector is controlled such that an air-fuel ratio of a mixture formed in each combustion chamber becomes a target air-fuel ratio on the basis of an output value of the air-fuel ratio sensor, there is provided an inter-cylinder air-fuel ratio imbalance judgment device for the multi-cylinder internal combustion engine for judging whether there is an inter-cylinder air-fuel ratio imbalance condition where a difference in the air-fuel ratio of the mixture between the combustion chambers is greater than a predetermined air-fuel ratio difference, wherein assuming that an amount of air introduced into the combustion chamber is referred to as an intake air amount, an amount of change of the air-fuel ratio of the exhaust gas detected by the air-fuel ratio sensor per unit time is referred to as a unit air-fuel ratio change amount, and the unit air-fuel ratio change amount when the difference in the air-fuel ratio of the mixture between the combustion chambers is smaller than or equal to the predetermined air-fuel ratio difference and the intake air amount is a specific intake air amount is referred to as a base unit air-fuel ratio change amount, one of the base unit air-fuel ratio change amount and the unit air-fuel ratio change amount greater than the base unit air-fuel ratio change amount by a predetermined value is set as a judgment value, wherein the unit air-fuel ratio change amount is calculated during the operation of the internal combustion engine, wherein when the intake air amount is smaller than the specific intake air amount, the unit air-fuel ratio change amount calculated during the operation of the internal combustion engine is corrected such that the unit air-fuel ratio change amount increases in the condition that the base unit air-fuel ratio change amount is an upper limit for the corrected unit air-fuel ratio change amount, wherein when the intake air amount is greater than the specific intake air amount, the unit air-fuel ratio change amount calculated during the operation of the internal combustion engine is corrected such that the unit air-fuel ratio change amount decreases in the condition that the base unit air-fuel ratio change amount is a lower limit for the corrected unit air-fuel ratio change amount, and wherein when the corrected unit air-fuel ratio change amount is greater than the judgment value, it is judged that the inter-cylinder air-fuel ratio imbalance condition occurs.

According to the first invention, it is accurately judged whether the inter-cylinder air-fuel ratio imbalance condition occurs. That is, the change amount of the air-fuel ratio of the exhaust gas detected by the air-fuel ratio sensor per unit time, i.e. the unit air-fuel ratio change amount tends to be great as the difference in the air-fuel ratio between the mixtures formed in the combustion chambers. Therefore, basically, when the unit air-fuel ratio change amount is great, the difference in the air-fuel ratio between the mixtures formed in the combustion chambers and therefore it can be judged that the inter-cylinder air-fuel ratio imbalance condition occurs. However, the unit air-fuel ratio change amount tends to be great as the intake air amount is great. Accordingly, the unit air-fuel ratio change amount in the case where no inter-cylinder air-fuel ratio imbalance condition occurs and the intake air amount is extremely great is almost the same as that in the case where the inter-cylinder air-fuel ratio imbalance condition occurs and the intake air amount is extremely small. Therefore, simply, as a result of the comparison of the unit air-fuel ratio change amount calculated during the operation of the internal combustion engine with the judgment value, even when the unit air-fuel ratio change amount is greater than the judgment value, there is a possibility that no inter-cylinder air-fuel ratio imbalance condition occurs and on the other hand, even when the unit air-fuel ratio change amount is equal to or smaller than the judgment value, there is a possibility that the inter-cylinder air-fuel ratio imbalance condition occurs.

In this regard, in the first invention, the specific intake air amount is employed as a boundary regarding the intake air amount and then the unit air-fuel ratio change amount is corrected such that the unit air-fuel ratio change amount increases as the intake air amount is smaller than the specific intake air amount in the condition that the base unit air-fuel ratio change amount is the upper limit for the corrected unit air-fuel ratio change amount and on the other hand, the unit air-fuel ratio change amount is corrected such that the unit air-fuel ratio change amount decreases as the intake air amount is greater than the specific intake air amount in the condition that the base unit air-fuel ratio change amount is the lower limit for the corrected unit air-fuel ratio change amount. That is, the unit air-fuel ratio change amount calculated during the operation of the internal combustion engine is corrected to approach the unit air-fuel ratio change amount when the intake air amount is the specific intake air amount. According to this, the difference between the unit air-fuel ratio change amount corrected when no inter-cylinder air-fuel ratio imbalance condition occurs and the intake air amount is extremely great and the unit air-fuel ratio change amount corrected when the inter-cylinder air-fuel ratio imbalance condition occurs and the intake air amount is extremely small becomes great. In addition, in the first invention, the judgment value is set using as the base the base unit air-fuel ratio change amount, i.e. the unit air-fuel ratio change amount when the difference in the air-fuel ratio between the mixtures formed in the combustion chambers is equal to or smaller than a predetermined air-fuel ratio difference and the intake air amount corresponds to the specific intake air amount and therefore, it can be accurately judged whether the inter-cylinder air-fuel ratio imbalance judgment occurs by judging that no inter-cylinder air-fuel ratio imbalance judgment occurs when the corrected unit air-fuel ratio change amount is equal to or smaller than the judgment value as a result of the comparison of the corrected unit air-fuel ratio change amount with the judgment value and on the other hand, by judging that the inter-cylinder air-fuel ratio imbalance judgment occurs when the corrected unit air-fuel ratio change amount is greater than the judgment value as a result of the comparison of the corrected unit air-fuel ratio change amount with the judgment value.

Further, according to the second invention of this application, in the first invention, assuming that the unit air-fuel ratio change amount per a unit intake air amount obtained from a relational expression between the unit air-fuel ratio change amount and the intake air amount when the difference in the air-fuel ratio of the mixture between the combustion chambers is referred to as a correction coefficient, and the difference of the specific intake air amount relative to the intake air amount corresponding to the unit air-fuel ratio change amount calculated during the operation of the internal combustion engine is referred to as an intake air amount difference, the unit air-fuel ratio change amount calculated during the operation of the internal combustion engine is corrected by multiplying the unit air-fuel ratio change amount calculated during the operation of the internal combustion engine by a value obtained by multiplying the correction coefficient by the intake air amount difference.

Further, according to the third invention of this application, in the first invention, assuming that a relational expression between the unit air-fuel ratio change amount and the intake air amount when the difference in the air-fuel ratio of the mixture between the combustion chambers is smaller or equal to the predetermined air-fuel ratio difference is referred to as a base relational expression, the unit air-fuel ratio change amount obtained from the base relational expression when the intake air amount corresponding to the unit air-fuel ration change amount calculated during the operation of the internal combustion engine is applied to the base relational expression is acquired as a provisional unit air-fuel ratio change amount and the unit air-fuel ratio change amount obtained from the base relational expression when the specific intake air amount is applied to the base relational expression is acquired as the base unit air-fuel ratio change amount, and the unit air-fuel ratio change amount calculated during the operation of the internal combustion engine is corrected by multiplying the unit air-fuel ratio change amount calculated during the operation of the internal combustion engine by a ratio of the base unit air-fuel ratio change amount relative to the provisional unit air-fuel ratio change amount.

Further, according to the fourth invention of this application, in the second invention, the correction coefficient is obtained on the basis of a unit air-fuel ratio change amount calculated during the operation of the internal combustion engine and the intake air amount associated with the calculated unit air-fuel ratio change amount.

According to the fourth invention, the correction coefficient used for correcting the unit air-fuel ratio change amount calculated during the operation of the internal combustion engine is calculated during the operation of the internal combustion engine. Accordingly, it is not necessary to previously obtain the correction coefficient by experiments, etc.

Further, according to the fifth invention of this application, in the third invention, the base relational expression is obtained on the basis of a unit air-fuel ratio change amount calculated during the operation of the internal combustion engine and the intake air amount associated with the calculated unit air-fuel ratio change amount.

According to the fifth invention, the base relational expression used for correcting the unit air-fuel ratio change amount calculated during the operation of the internal combustion engine is calculated during the operation of the internal combustion engine. Accordingly, it is not necessary to previously obtain the base relational expression by experiments, etc.

Further, according to the sixth invention of this application, in the fourth invention, a degree of dispersion of a plurality of intake air amounts acquired in association with the unit air-fuel ratio change amounts calculated during the operation of the internal combustion engine is calculated as a dispersion degree, when the calculated dispersion degree is greater than a predetermined dispersion degree, a change amount of the unit air-fuel ratio change amount obtained from a relational expression between the intake air amount and the unit air-fuel ratio change amount obtained on the basis of the unit air-fuel ratio change amount calculated during the operation of the internal combustion engine and the intake air amount acquired in association with the unit air-fuel ration change amount is used as the correction coefficient, and when the calculated dispersion degree is smaller than or equal to the predetermined dispersion degree, a change amount of a previously obtained unit air-fuel ratio change amount is used as the correction coefficient.

According to the sixth invention, the previously obtained change amount of the unit air-fuel ratio change amount is used as the correction coefficient when the degree which the values of the intake air amounts acquired in relation to the unit air-fuel ratio change amount calculated during the operation of the internal combustion engine disperse is equal to or smaller than the predetermined dispersion degree, i.e. when the values of the acquired intake air amounts focus on a narrow range and therefore even if the change amount of the unit air-fuel ratio change amount is obtained as the correction coefficient using the intake air amounts, the obtained correction coefficient is inappropriate for correcting the unit air-fuel ratio change amount. In other words, according to the invention, the change amount of the unit air-fuel ratio change amount obtained on the basis of the unit air-fuel ratio change amounts calculated during the operation of the internal combustion engine and the intake air amounts acquired in relation to the unit air-fuel ratio change amounts is used as the correction coefficient only when the degree which the values of the intake air amounts acquired in relation to the unit air-fuel ratio change amount calculated during the operation of the internal combustion engine disperse is greater than the predetermined dispersion degree, i.e. only when the values of the acquired intake air amounts widely disperse and therefore the correction coefficient obtained using the intake air amounts is appropriate for correcting the unit air-fuel ratio change amount. Therefore, according to the invention, independently of the dispersion degree of the intake air amounts acquired during the operation of the internal combustion engine, it can be accurately judged whether the inter-cylinder air-fuel ratio imbalance condition occurs.

Further, according to the seventh invention of this application, in the fifth invention, a degree of dispersion of a plurality of the intake air amounts acquired in association with the unit air-fuel ratio change amount calculated during the operation of the internal combustion engine is calculated as a dispersion degree, when the calculated dispersion degree is greater than a predetermined dispersion degree, a relational expression between the intake air amount and the unit air-fuel ratio change amount obtained on the basis of the unit air-fuel ratio change amount calculated during the operation of the internal combustion engine and the intake air amount acquired in association with the unit air-fuel ratio change amount is used as the base relational expression, and when the calculated dispersion degree is smaller than or equal to the predetermined dispersion degree, a relational expression between a previously obtained unit air-fuel ratio change amount and the intake air amount is used to the base relational expression.

According to the seventh invention, the previously obtained relational expression between the unit air-fuel ratio change amount and the intake air amount is used as the base relational expression when the degree which the values of the intake air amounts acquired in relation to the unit air-fuel ratio change amount calculated during the operation of the internal combustion engine disperse is equal to or smaller than the predetermined dispersion degree, i.e. when the values of the acquired intake air amounts focus on a narrow range and therefore even if the relational expression between the unit air-fuel ratio change amount and the intake air amount is obtained using the intake air amounts, the obtained relational expression does not exactly indicate the relationship between the unit air-fuel ratio change amount and the intake air amount. In other words, according to the invention, the relational expression between the unit air-fuel ratio change amount and the intake air amount obtained on the basis of the unit air-fuel ratio change amounts calculated during the operation of the internal combustion engine and the intake air amounts acquired in relation to the unit air-fuel ratio change amounts is used as the base relational expression only when the degree which the values of the intake air amounts acquired in relation to the unit air-fuel ratio change amount calculated during the operation of the internal combustion engine disperse is greater than the predetermined dispersion degree, i.e. only when the values of the acquired intake air amounts widely disperse and therefore the relational expression between the unit air-fuel ratio change amount and the intake air amount obtained using the intake air amounts exactly indicates the relationship between the unit air-fuel ratio change amount and the intake air amount. Therefore, according to the invention, independently of the dispersion degree of the intake air amounts acquired during the operation of the internal combustion engine, it can be accurately judged whether the inter-cylinder air-fuel ratio imbalance condition occurs.

Further, according to the eighth invention of this application, in any of the first to seventh inventions, the internal combustion engine comprises an air flow meter for detecting the intake air amount in an intake passage, assuming that a time which the air takes from the passage of the air through the air flow meter to the detection of the air-fuel ratio of the exhaust gas by the air-fuel ratio sensor, which exhaust gas corresponds to the air passing through the air flow meter and reaching the air-fuel ratio sensor, is referred to as an air transfer delay time, the intake air amount detected by the air flow meter prior to the time of detection of the air-fuel ratio of the exhaust gas by the air-fuel ratio sensor by the air transfer delay time, which exhaust gas is used for calculation of the unit air-fuel ratio change amount when the unit air-fuel ratio change amount is calculated during the operation of the internal combustion engine, is used as the intake air amount corresponding to the unit air-fuel ratio change amount calculated during the internal combustion engine.

According to the eighth invention, it can be further accurately judged whether the inter-cylinder air-fuel ratio imbalance condition occurs. That is, it takes a certain time for the air passing the air flow meter to reach the air-fuel ratio sensor. Therefore, the intake air amount detected by the air flow meter at the time of the calculation of the unit air-fuel ratio change amount is not strictly equal to the amount of the exhaust gas reaching the air-fuel ratio sensor at the time of the calculation of the unit air-fuel ratio change amount. Therefore, when the unit air-fuel ratio change amount is calculated on the basis of the air-fuel ratio of the exhaust gas detected by the air-fuel ratio sensor, the intake air amount exactly corresponding to the calculated unit air-fuel ratio change amount is the intake air amount detected by the air flow meter before the time of the calculation of the unit air-fuel ratio change amount by the time which is necessary for the air passing the air flow meter to reach the air-fuel ratio sensor. In this regard, according to the invention, the unit air-fuel ratio change amount is corrected using the intake air amount exactly corresponding to the unit air-fuel ratio change amount calculated during the operation of the internal combustion engine and it is judged whether the inter-cylinder air-fuel ratio imbalance condition occurs on the basis of the corrected unit air-fuel ratio change amount. Accordingly, it can be further accurately whether the inter-cylinder air-fuel ratio imbalance condition occurs.

Further, according to the ninth invention of this application, in any of the first to eighth inventions, the judgment of whether there is the inter-cylinder air-fuel ratio imbalance condition is performed when the intake air amount is within a predetermined range.

According to the ninth invention, the result of the judgment of whether the inter-cylinder air-fuel ratio imbalance condition occurs is reliable. That is, when the intake air amount is extremely small or great, the unit air-fuel ratio change amount calculated during the operation of the internal combustion engine may not be a value corresponding to the difference in the air-fuel ratio between the mixtures formed in the combustion chambers. In this regard, in this invention, only when the intake air amount is within the predetermined range, the inter-cylinder air-fuel ratio imbalance judgment is performed.

Accordingly, the result of the judgment of whether the inter-cylinder air-fuel ratio imbalance condition occurs is reliable.

BRIEF DESCRIPTION OF THE DRAWINGS

FIG. 1 is an entire view of a spark ignition type of a multi-cylinder internal combustion engine which an inter-cylinder air-fuel ratio imbalance judgment device according to the invention is applied to.

BEST MODE FOR CARRYING OUT THE INVENTION

Figure 1:
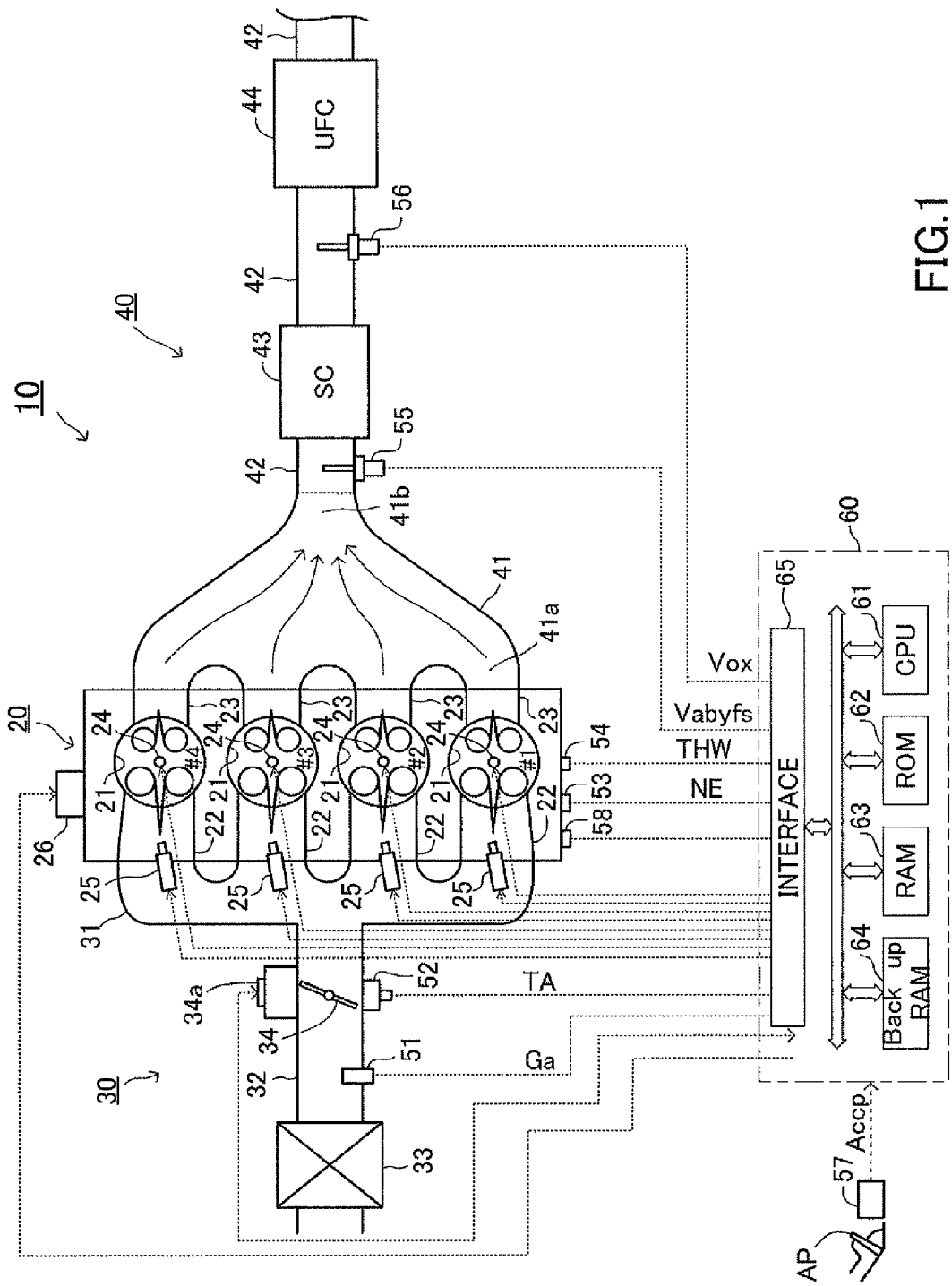

Below, embodiments of the inter-cylinder air-fuel ratio imbalance judgment device for the multi-cylinder internal combustion engine of the invention will be explained referring to the drawings. FIG. 1 is an entire view of the spark ignition type multi-cylinder internal combustion engine which the inter-cylinder air-fuel ratio imbalance judgment device of the invention is applied. The spark ignition type multi-cylinder internal combustion engine which will be explained below is a so-called four-cycle internal combustion engine where the intake, compression, combustion and exhaust strokes are sequentially performed.

In FIG. 1, 10 denotes the spark ignition type multi-cylinder internal combustion engine (hereinafter, simply referred to as "internal combustion engine"). The internal combustion engine 10 has a main body 20. The main body 20 has a cylinder block and a cylinder head. Further, the main body 20 has four combustion chambers 21, each of which is formed by the top wall surface of a piston, an inner wall surface of a cylinder bore and a lower wall surface of the cylinder head. In FIG. 1, #1 denotes a combustion chamber 21 which is illustrated at the lowermost position and hereinafter, will be referred to as "first cylinder", #2 denotes a combustion chamber 21 which is illustrated just above the first cylinder #1 and hereinafter, will be referred to as "second cylinder", #3 denotes a combustion chamber 21 which is illustrated just above the second cylinder #2 and hereinafter, will be referred to as "third cylinder" and #4 denotes a combustion chamber 21 which is illustrated just above the third cylinder #3 and hereinafter, will be referred to as "fourth cylinder".

Intake ports 22 each communicating with the corresponding combustion chamber 21 are formed in the cylinder head. Air is sucked into the combustion chamber 21 via the intake ports 22. The intake ports 22 are closed and opened by intake valves (not shown). Exhaust ports 23 each communicating with the corresponding combustion chamber 21 are formed in the cylinder head. Exhaust gas is discharged from the combustion chambers 21 to the exhaust ports 23. The exhaust ports 23 are closed and opened by exhaust valves (not shown).

Spark plugs 24 corresponding to the combustion chambers 21 are positioned in the cylinder head. The spark plugs 24 are positioned in the cylinder head to be exposed to the interiors of the combustion chambers 21 such that the plugs can ignite the mixture of the fuel and the air formed in the combustion chambers 21. Further, fuel injectors 25 corresponding to the intake ports 22 are positioned in the cylinder head. The fuel injectors 25 are positioned in the cylinder head to be exposed to the interiors of the intake ports 22 such that the fuel injectors 25 can inject the fuel into the intake ports 22.

An intake manifold 31 is connected to the intake ports 22. The intake manifold 31 has branch portions each connected to the corresponding intake port 22 and a surge tank portion which the branch portions collect. An intake pipe 32 is connected to the surge tank portion of the intake manifold 31. In this embodiment (hereinafter, referred to as "first embodiment"), an intake passage 30 is formed by the intake ports 22, the intake manifold 31 and the intake pipe 32. An air filter 33 is positioned in the intake pipe 32. A throttle valve 34 is rotatably positioned in the intake pipe 32 between the air filter 33 and the intake manifold 31. An actuator 34a for driving the throttle valve 34 is connected to the throttle valve 34. The flow passage area of the intake pipe 31 is changed by the throttle value 34 being rotated by the actuator 34a and thereby the amount of the air sucked into the combustion chambers 21 is controlled.

On the other hand, an exhaust manifold 41 is connected to the exhaust ports 23. The exhaust manifold 41 has branch portions 41a each connected to the corresponding exhaust port 23 and an exhaust collection portion 41b which the branch portions collect. An exhaust pipe 42 is connected to the exhaust collection portion 41b of the exhaust manifold 41. In the first embodiment, an exhaust passage 40 is formed by the exhaust ports 23, the exhaust manifold 41 and the exhaust pipe 42. An exhaust gas purification catalyst 43 for purifying the specific components included in the exhaust gas (hereinafter, this exhaust gas purification catalyst will be referred to as "upstream catalyst") is positioned in the exhaust pipe 42. Further, an exhaust gas purification catalyst 44 for purifying the specific components included in the exhaust gas (hereinafter, this exhaust gas purification catalyst will be referred to as "downstream catalyst") is positioned in the exhaust pipe 42 downstream of the upstream catalyst 43.

Figure 2:
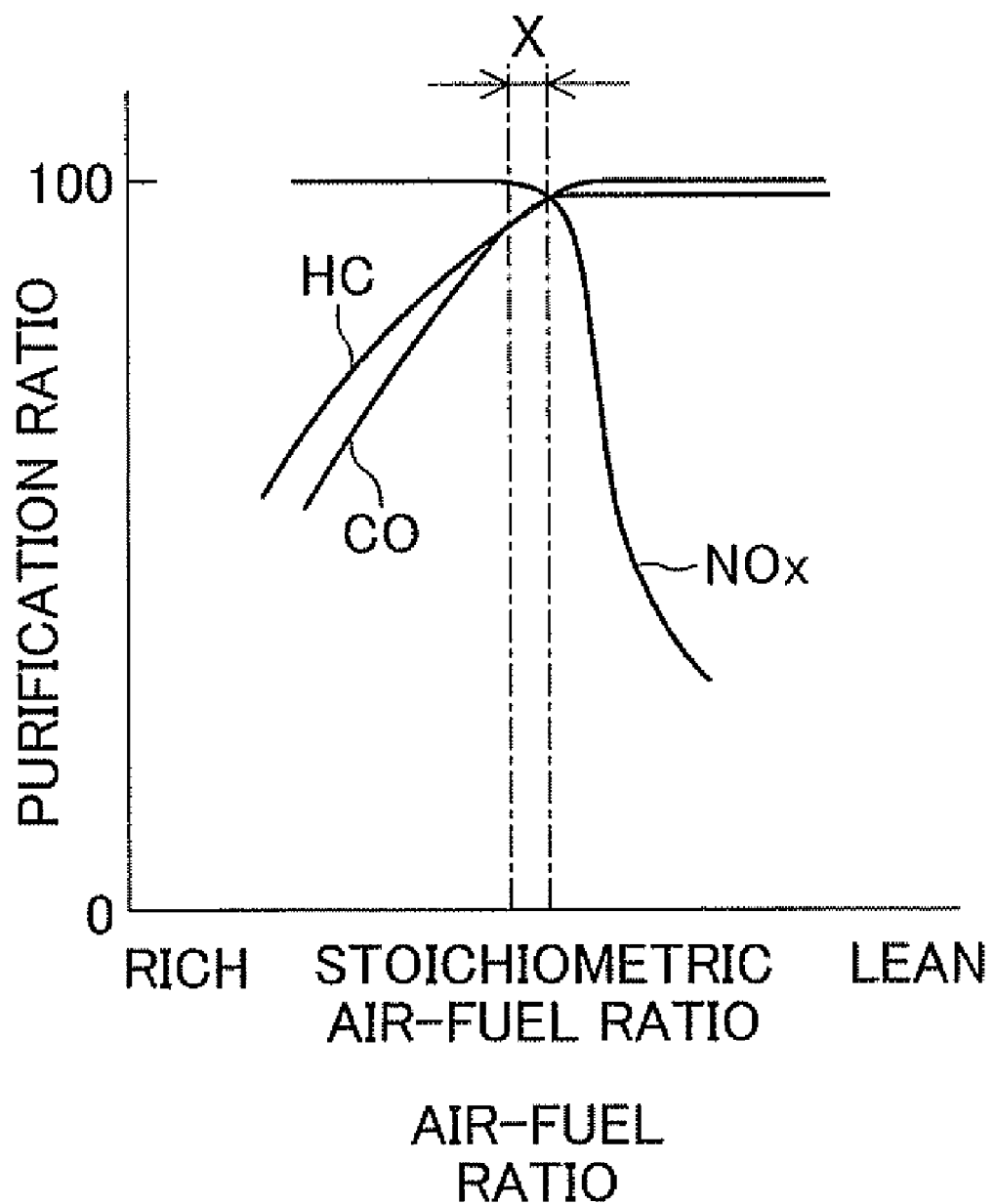
FIG. 2 is a view showing a purification ability of upstream and downstream catalysts.

The upstream catalyst 43 is a so-called three-way catalyst and as shown in FIG. 2, can purify nitrogen oxide (hereinafter, referred to as "NOx"), carbon monoxide (hereinafter, referred to as "CO") and hydrocarbon (hereinafter, referred to as "HC") included in the exhaust gas at the high purification rate when the temperature of the upstream catalyst is higher than a certain temperature (i.e. the activation temperature) and the air-fuel ratio of the exhaust gas flowing into the upstream catalyst is within the range X adjacent to the stoichiometric air-fuel ratio. On the other hand, the upstream catalyst 43 has an oxygen absorbent/discharge ability for absorbing the oxygen therein from the exhaust gas when the air-fuel ratio of the exhaust gas flowing into the upstream catalyst 43 is leaner than the stoichiometric air-fuel ratio and for discharging the absorbed oxygen therefrom when the air-fuel ratio of the exhaust gas flowing into the upstream catalyst 43 is richer than the stoichiometric air-fuel ratio. Therefore, as far as this oxygen absorbent/discharge ability functions normally, even when the air-fuel ratio of the exhaust gas flowing into the upstream catalyst 43 is leaner or richer than the stoichiometric air-fuel ratio, the atmosphere in the upstream catalyst 43 is maintained generally adjacent to the stoichiometric air-fuel ratio and therefore the NOx, CO and HC included in the exhaust gas are purified at the high purification rate by the upstream catalyst 43.

The downstream catalyst 44 is also a so-called three-way catalyst and similar to the upstream catalyst 43, the downstream catalyst 44 can purify the NOx, CO and HC at the high purification rate and has the oxygen absorbent/discharge ability.

An air flow meter 51 for detecting the amount of the air flowing in the intake pipe 32, i.e. the amount of the air sucked into the combustion chamber 21 (hereinafter, this amount of the air will be referred to as "intake air amount") is positioned in the intake pipe 32.

A crank position sensor 53 for detecting the rotational phase of a crank shaft (not shown) is positioned in the main body 20 of the internal combustion engine 10. The crank position sensor 53 outputs a narrow pulse every the crank shaft rotates 10 degrees and outputs a wide pulse every the crank shaft rotates 360 degrees. Rotational speed of the crank shaft, i.e. engine speed is calculated on the basis of the pulses. An accelerator opening degree sensor 57 detects the amount of the depression of an accelerator pedal AP.

An air-fuel ratio sensor 55 for detecting the air-fuel ratio of the exhaust gas (hereinafter, this air-fuel ratio sensor will be referred to as "upstream air-fuel ratio sensor") is positioned in the exhaust pipe 42 upstream of the upstream catalyst 43. Further, an air-fuel ratio sensor 56 for detecting the air-fuel ratio of the exhaust gas (hereinafter, this air-fuel ratio sensor will be referred to as "downstream air-fuel ratio sensor") is positioned in the exhaust pipe 42 between the upstream and downstream catalysts 43 and 44.

Figure 3:
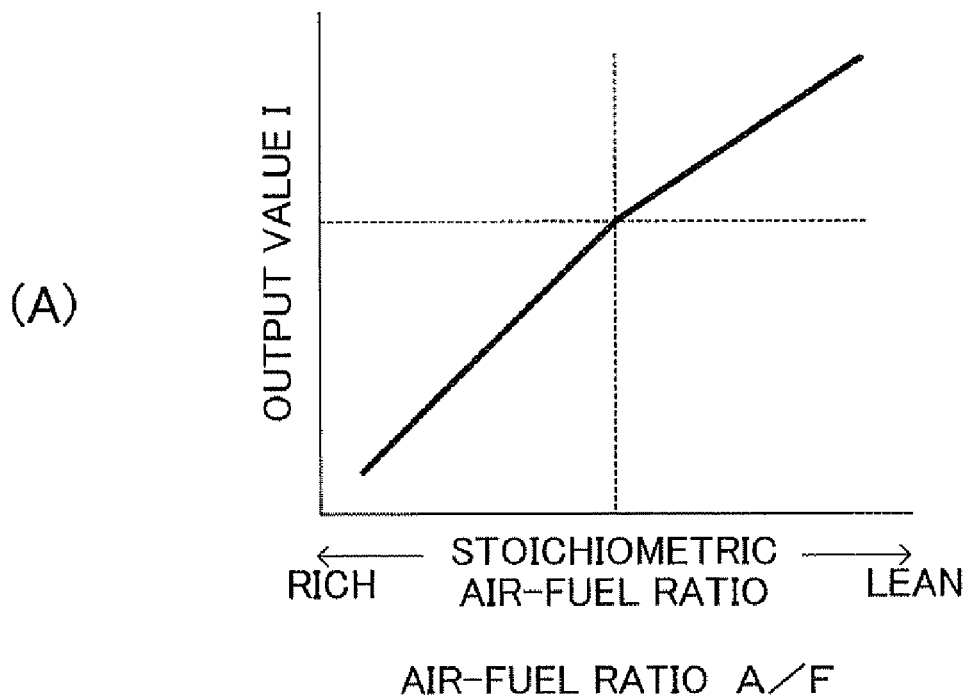
FIG. 3(A) is a view showing an output property of an upstream air-fuel ratio sensor.
FIG. 3(B) is a view showing an output property of a downstream air-fuel ratio sensor.
Figure 3:
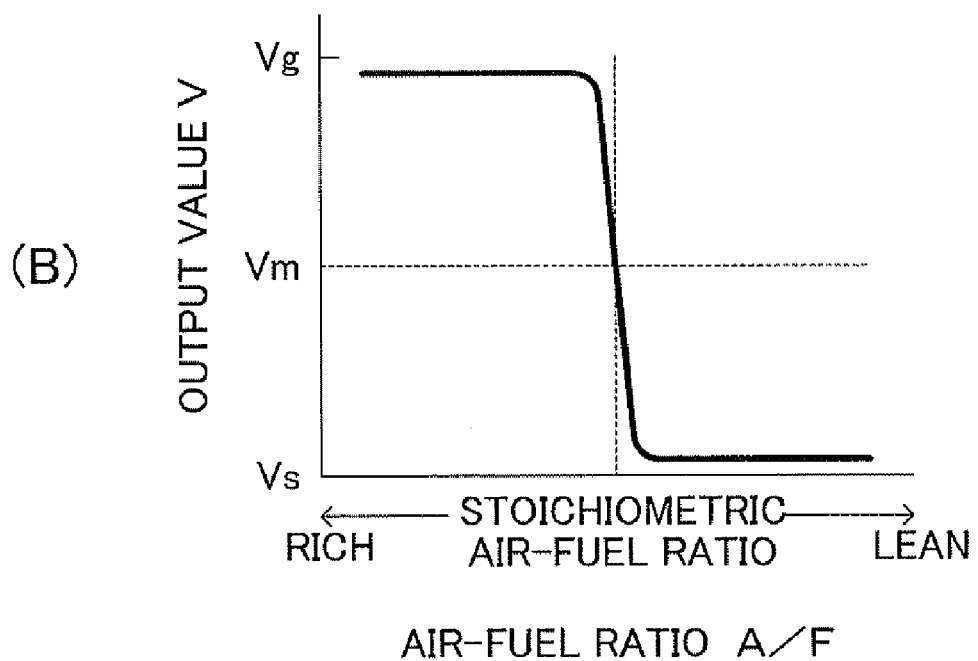

As shown in FIG. 3(A), the upstream air-fuel ratio sensor 55 is a so-called limiting current type oxygen concentration sensor which outputs an output value I which becomes small as the detected air-fuel ratio of the exhaust gas becomes rich and on the other hand, becomes great as the detected air-fuel ratio of the exhaust gas becomes lean.

On the other hand, as shown in FIG. 3(B), the downstream air-fuel ratio sensor 56 is a so-called electromotive force type oxygen concentration sensor which outputs a relatively great constant output value Vg when the detected air-fuel ratio of the exhaust gas is richer than the stoichiometric air-fuel ratio, outputs a relatively small constant output value Vs when the detected air-fuel ratio of the exhaust gas is leaner than the stoichiometric air-fuel ratio and outputs an output value Vm intermediate between the relatively great and small constant output values Vg and Vs when the detected air-fuel ratio of the exhaust gas is the stoichiometric air-fuel ratio.

An electronic control unit (ECU) 60 is constituted by a microcomputer and has a CPU (a microprocessor) 61, a ROM (a read only memory) 62, a RAM (a random access memory) 63, a back-up RAM 64 and an interface 65 including AD converters which are connected to each other by a bidirectional bus. The interface 65 is connected to the ignition plugs 24, the fuel injectors 25 and the actuator 34a for the throttle valve 34. Further, the air flow meter 51, the crank position sensor 53, the upstream and downstream air-fuel ratio sensors 55 and 56 and the accelerator opening degree sensor 57 are connected to the interface 65.

Figure 4:
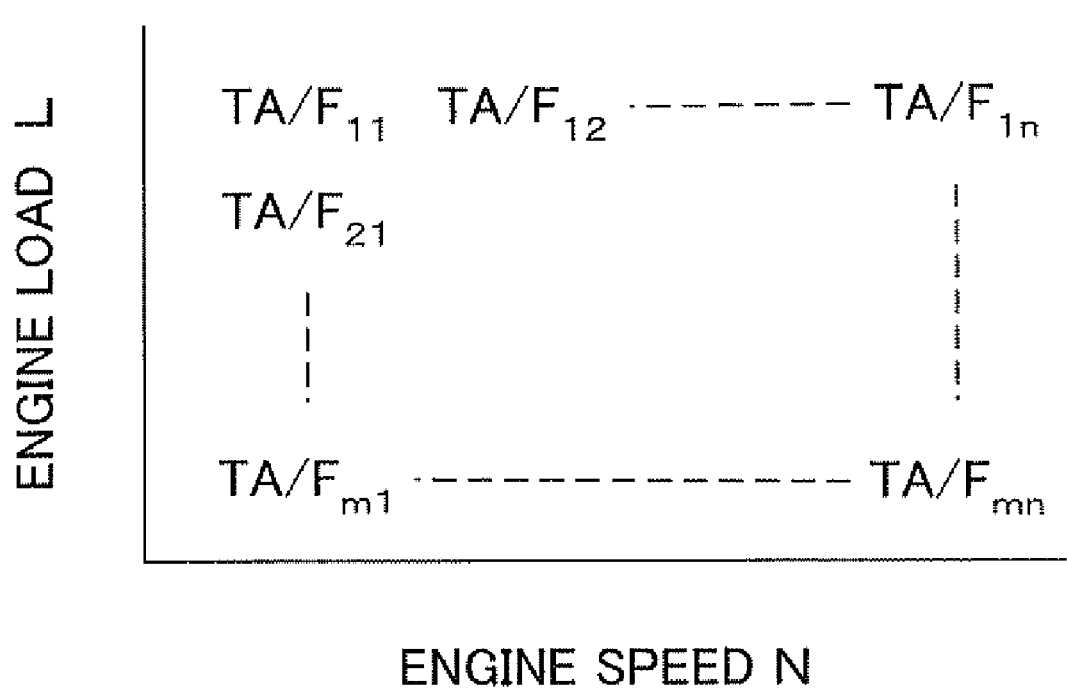
FIG. 4 is a view showing a map used to determine a target air-fuel ratio.

In the first embodiment, as shown in FIG. 4, an air-fuel ratio to be a target (hereinafter, this air-fuel ratio will be referred to as "target air-fuel ratio") TA/F as the air-fuel ratio of the mixture formed in the combustion chamber 21 (hereinafter, simply referred to as "mixture"), depending on the operational condition of the internal combustion engine 10, in particular, the engine speed and the engine load is stored in the electronic control unit 60 as a map as a function of the engine speed N and the engine load L. During the operation of the internal combustion engine (hereinafter, referred to as "during the engine operation"), the target air-fuel ratio TA/F is read from the map of FIG. 4, depending on the engine speed N and the engine load L and the amount of the fuel injected from each fuel injector 25 (hereinafter, this amount will be referred to as "fuel injection amount") is controlled, depending on the intake air amount such that the air-fuel ratio of the mixture becomes the target air-fuel ratio. It should be noted that the intake air amount is controlled such that the internal combustion engine can output the required output, depending on the engine speed and the engine load.

Below, a control of the fuel injection amount will be explained in the case where the target air-fuel ratio is the stoichiometric air-fuel ratio and the air-fuel ratio of the mixture is controlled to the stoichiometric air-fuel ratio.

When the air-fuel ratio of the exhaust gas leaner than the stoichiometric air-fuel ratio is detected by the upstream air-fuel ratio sensor 55, the air-fuel ratio of the mixture is leaner than stoichiometric air-fuel ratio. In this case, in the first embodiment, the fuel injection amount is progressively increased such that the air-fuel ratio of the mixture approaches the stoichiometric air-fuel ratio. On the other hand, when the air-fuel ratio of the exhaust gas richer than the stoichiometric air-fuel ratio is detected by the upstream air-fuel ratio sensor 55, the air-fuel ratio of the mixture is richer than stoichiometric air-fuel ratio. In this case, in the first embodiment, the fuel injection amount is progressively decreased such that the air-fuel ratio of the mixture approaches the stoichiometric air-fuel ratio. The air-fuel ratio of the mixture is totally controlled to the stoichiometric air-fuel ratio by the fuel injection amount being controlled as explained above.

In the case where the fuel injection amount is controlled as explained above, the air-fuel ratio of the mixture becomes richer and leaner than the stoichiometric air-fuel ratio. In other words, the air-fuel ratio of the mixture oscillates across the stoichiometric air-fuel ratio. In this regard, in order to control the air-fuel ratio of the mixture to the stoichiometric air-fuel ratio, it is desired that the amplitude of the oscillation of the air-fuel ratio across the stoichiometric air-fuel ratio is small. That is, it is desired that when the air-fuel ratio of the mixture is leaner than the stoichiometric air-fuel ratio, the air-fuel ratio of the mixture is made to approach the stoichiometric air-fuel ratio as rapidly as possible and on the other hand, when the air-fuel ratio of the mixture is richer than the stoichiometric air-fuel ratio, the air-fuel ratio of the mixture is made to approach the stoichiometric air-fuel ratio as rapidly as possible.

In the first embodiment, when the change of the air-fuel ratio of the mixture from the lean side to the rich side of the stoichiometric air-fuel ratio is detected by the upstream air-fuel ratio sensor 55, the fuel injection amount is relatively greatly decreased at once. Thereby, when the air-fuel ratio of the mixture changes from the lean side to the rich side of the stoichiometric air-fuel ratio, the air-fuel ratio of the mixture is made to relatively greatly approach the stoichiometric air-fuel ratio. On the other hand, when the change of the air-fuel ratio of the mixture from the rich side to the lean side of the stoichiometric air-fuel ratio is detected by the upstream air-fuel ratio sensor 55, the fuel injection amount is relatively greatly increased at once. Thereby, when the air-fuel ratio of the mixture changes from the rich side to the lean side of the stoichiometric air-fuel ratio, the air-fuel ratio of the mixture is made to relatively greatly approach the stoichiometric air-fuel ratio. According to this, the amplitude of the oscillation of the air-fuel ratio of the mixture across the stoichiometric air-fuel ratio becomes small.

In order to move the air-fuel ratio of the mixture close to the stoichiometric air-fuel ratio more rapidly, it is desired that the value for decreasing the fuel injection amount at once (hereinafter, this value will be referred to as "skip decrease value") when the air-fuel ratio of the mixture changes from the lean side to the rich side of the stoichiometric air-fuel ratio is set to be a great value as the difference between the stoichiometric air-fuel ratio and the air-fuel ratio of the mixture when it changes from the lean side to the rich side of the stoichiometric air-fuel ratio is great and the value for increasing the fuel injection amount at once (hereinafter, this value will be referred to as "skip increase value") when the air-fuel ratio of the mixture changes from the rich side to the lean side of the stoichiometric air-fuel ratio is set to be a great value as the difference between the stoichiometric air-fuel ratio and the air-fuel ratio of the mixture when it changes from the rich side to the lean side of the stoichiometric air-fuel ratio is great.

Accordingly, in the first embodiment, the skip decrease and increase values are controlled as follows.

That is, it can be deemed that the air-fuel ratio of the mixture is greatly leaner than the stoichiometric air-fuel ratio as the period (hereinafter, this period will be referred to as "lean period") where the air-fuel ratio of the exhaust gas leaner than the stoichiometric air-fuel ratio has been detected by the downstream air-fuel ratio sensor 56 is long. That is, the air-fuel ratio of the exhaust gas flowing out of the upstream catalyst 43 should be the stoichiometric air-fuel ratio by the oxygen absorbent/discharge ability of the upstream catalyst 43. Nonetheless, when the lean period is long, it can be deemed that the great amount of the oxygen which the upstream catalyst 43 cannot absorb flows into the upstream catalyst 43, i.e. the air-fuel ratio of the mixture is greatly leaner than the stoichiometric air-fuel ratio. Accordingly, in the first embodiment, when the air-fuel ratio of the mixture changes the rich side to the lean side of the stoichiometric air-fuel ratio, the skip increase value is set to a great value as the lean period is long.

On the other hand, it can be deemed that the air-fuel ratio of the mixture is greatly richer than the stoichiometric air-fuel ratio as the period (hereinafter, this period will be referred to as "rich period") where the air-fuel ratio of the exhaust gas richer than the stoichiometric air-fuel ratio has been detected by the downstream air-fuel ratio sensor 56 is long. That is, the air-fuel ratio of the exhaust gas flowing out of the upstream catalyst 43 should be the stoichiometric air-fuel ratio by the oxygen absorbent/discharge ability of the upstream catalyst 43. Nonetheless, when the rich period is long, it can be deemed that the amount of the oxygen flowing into the upstream catalyst 43 is small such that the upstream catalyst 43 discharges all oxygen absorbed therein, i.e. the air-fuel ratio of the mixture is greatly richer than the stoichiometric air-fuel ratio. Accordingly, in the first embodiment, when the air-fuel ratio of the mixture changes the lean side to the rich side of the stoichiometric air-fuel ratio, the skip decrease value is set to a great value as the rich period is long.

The air-fuel ratio of the mixture is totally accurately controlled to the stoichiometric air-fuel ratio by the fuel injection amount being controlled as explained above.

Next, examples of flowcharts for performing the control of fuel injection amount according to the first embodiment will be explained. As the flowcharts for performing the control of the fuel injection amount according to the first embodiment, flowcharts shown in FIGS. 5 to 7 is used.

Figure 5:
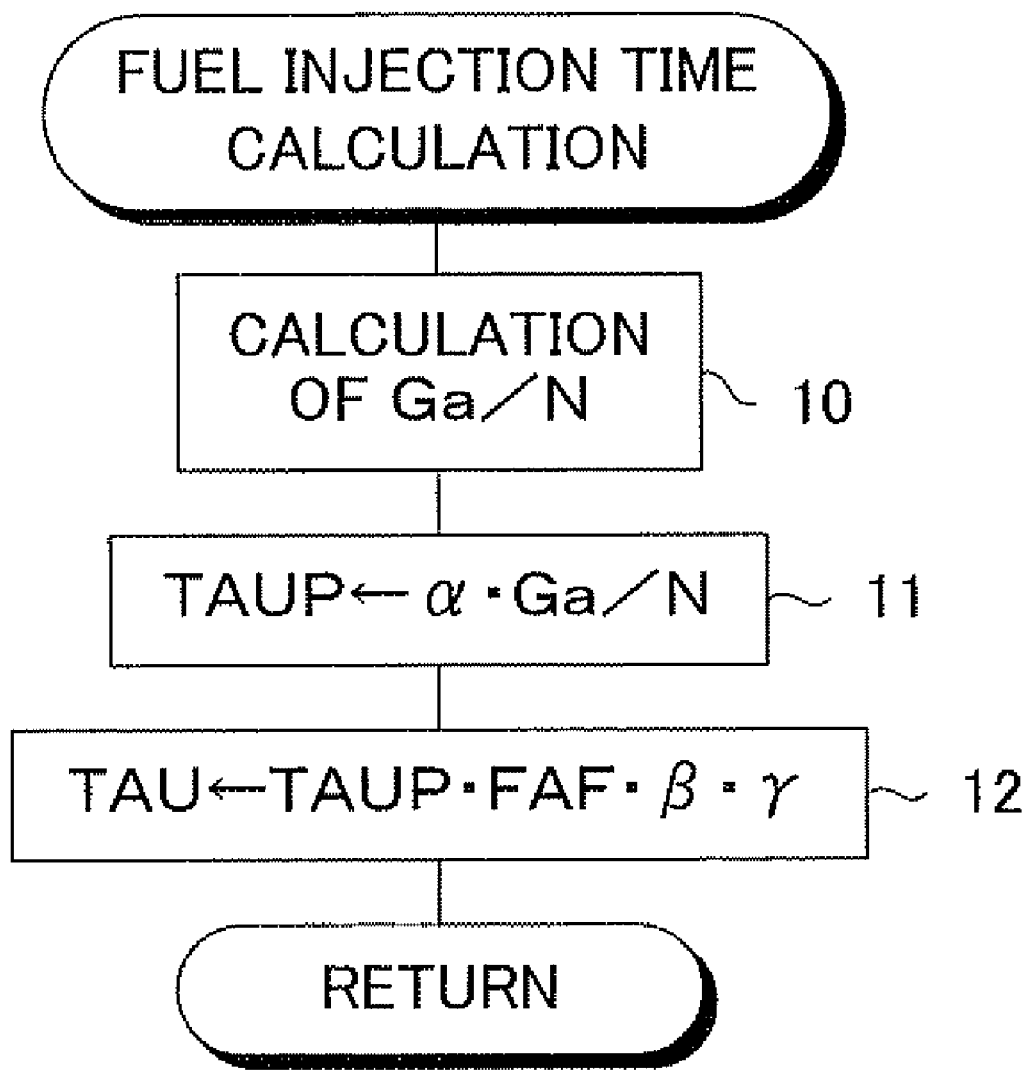
FIG. 5 is a view showing an example of a flowchart for calculating a time for injecting fuel from a fuel injector.

FIG. 5 is a flowchart for calculating time to inject fuel from the fuel injector. When the routine of FIG. 5 starts, first, at the step 10, a ratio Ga/N of the intake air amount Ga relative to the engine speed N is calculated. Next, at the step 11, a value Ga/N*$\alpha$ is input to a base fuel injection time TAUP, which value Ga/N*$\alpha$ is obtained by multiplying the ratio Ga/N calculated at the step 10 by a constant $\alpha$. Next, at the step 12, a value TAUP*FAF*$\beta$*$\gamma$ is input to a fuel injection time TAU, which value TAUP*FAF*$\beta$*$\gamma$ is obtained by multiplying the base fuel injection time TAUP calculated at the step 11 by an air-fuel ratio correction coefficient FAF (this is a coefficient calculated by a routine of FIG. 6 and will be explained later) and constants $\beta$ and $\gamma$ determined depending on the operation condition of the internal combustion engine, and the routine is directly terminated. In the first embodiment, the fuel is injected from the fuel injector by the fuel injection time TAU calculated at the step 12.

Figure 6:
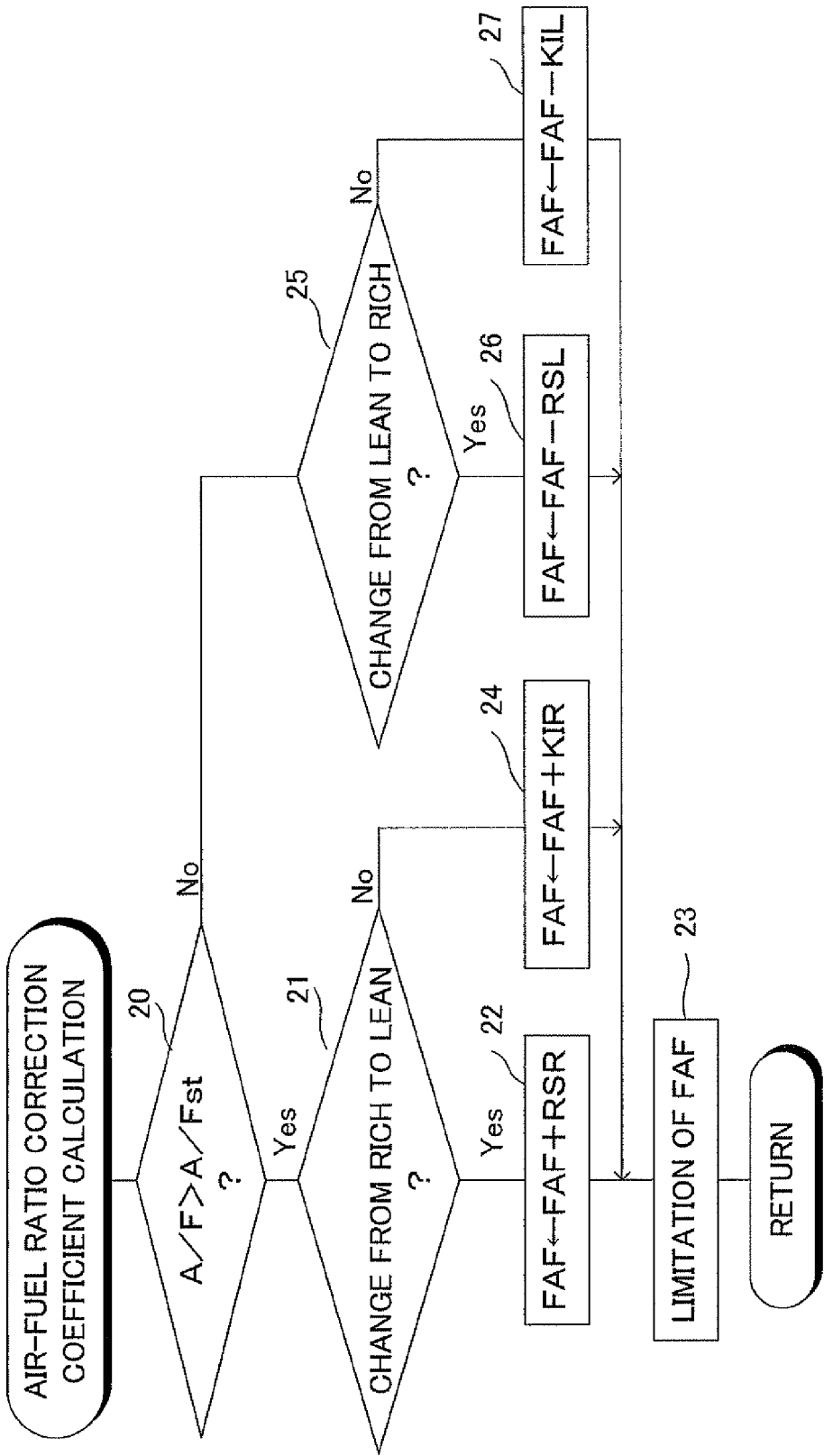
FIG. 6 is a view showing an example of a flowchart for calculating an air-fuel ratio correction coefficient.
Figure 7:
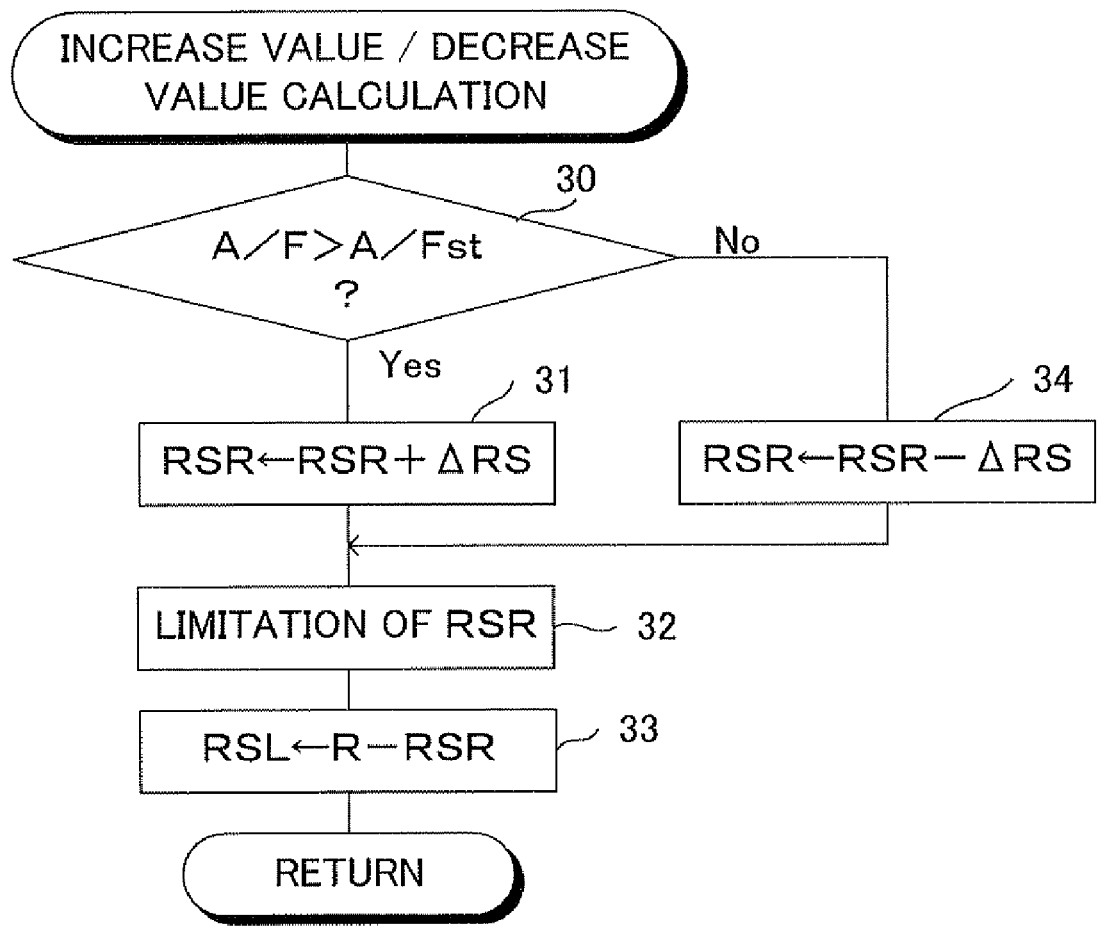
FIG. 7 is a view showing an example of a flowchart for calculating skip increase and decrease values.

FIG. 6 is a flowchart for calculating the air-fuel ratio correction coefficient FAF used at the step 12 shown in FIG. 5. When the routine of FIG. 6 starts, first, at the step 20, it is judged whether the air-fuel ratio A/F of the exhaust gas detected by the upstream air-fuel ratio sensor 55 is greater than the stoichiometric air-fuel ratio A/Fst (A/F>A/Fst), i.e. whether the air-fuel ratio of the exhaust gas is leaner than the stoichiometric air-fuel ratio. When it is judged that A/F>A/Fst, the routine proceeds to the step 21 and the steps following the step 21. On the other hand, when it is judged that A/F$\leq$A/Fst, the routine proceeds to the step 25 and the steps following the step 25.

When at the step 20, it is judged that A/F>A/Fst, i.e. it is judged that the air-fuel ratio of the exhaust gas is leaner than the stoichiometric air-fuel ratio, and then the routine proceeds to the step 21, it is judged whether it is immediately after the air-fuel ratio of the exhaust gas detected by the upstream air-fuel ratio sensor 55 changed from the air-fuel ratio richer than the stoichiometric air-fuel ratio to the air-fuel ratio leaner than the stoichiometric air-fuel ratio. When it is judged that it is immediately after the air-fuel ratio of the exhaust gas changed from the air-fuel ratio richer than the stoichiometric air-fuel ratio to the air-fuel ratio leaner than the stoichiometric air-fuel ratio, the routine proceeds to the step 22 and a value FAF+RSR is set as an updated air-fuel ratio correction coefficient FAF, which value FAF+RSR is obtained by adding a skip increase value RSR (this is a value calculated by a routine of FIG. 7 and will be explained later) to the air-fuel ratio correction coefficient FAF calculated at the last performance of the routine of FIG. 6. Next, at the step 23, the air-fuel correction coefficient FAF calculated at the step 22 is limited to an allowed range and the routine is terminated. On the other hand, when at the step 21, it is judged that it is not immediately after the air-fuel ratio of the exhaust gas changed from the air-fuel ratio richer than the stoichiometric air-fuel ratio to the air-fuel ratio leaner than the stoichiometric air-fuel ratio, the routine proceeds to the step 24 and a value FAF+KIR is set as an updated air-fuel ratio correction coefficient FAF, which value FAF+KIR is obtained by adding a constant value KIR to the air-fuel ratio correction coefficient FAF calculated at the last performance of the routine of FIG. 6. Next, at the step 23, the air-fuel correction coefficient FAF calculated at the step 24 is limited to the allowed range and the routine is terminated.

On the other hand, when at the step 20, it is judged that A/F≦A/Fst, i.e. it is judged that the air-fuel ratio of the exhaust gas is richer than the stoichiometric air-fuel ratio, and then the routine proceeds to the step 25, it is judged whether it is immediately after the air-fuel ratio of the exhaust gas detected by the upstream air-fuel ratio sensor 55 changed from the air-fuel ratio leaner than the stoichiometric air-fuel ratio to the air-fuel ratio richer than the stoichiometric air-fuel ratio. When it is judged that it is immediately after the air-fuel ratio of the exhaust gas changed from the air-fuel ratio leaner than the stoichiometric air-fuel ratio to the air-fuel ratio richer than the stoichiometric air-fuel ratio, the routine proceeds to the step 26 and a value FAF−RSL is set as an updated air-fuel ratio correction coefficient FAF, which value FAF+RSL is obtained by subtracting a skip decrease value RSL (this is a value calculated by the routine of FIG. 7 and will be explained later) from the air-fuel ratio correction coefficient FAF calculated at the last performance of the routine of FIG. 6. Next, at the step 23, the air-fuel correction coefficient FAF calculated at the step 26 is limited to the allowed range and the routine is terminated. On the other hand, when at the step 25, it is judged that it is not immediately after the air-fuel ratio of the exhaust gas changed from the air-fuel ratio leaner than the stoichiometric air-fuel ratio to the air-fuel ratio richer than the stoichiometric air-fuel ratio, the routine proceeds to the step 27 and a value FAF−KIL is set as an updated air-fuel ratio correction coefficient FAF, which value FAF−KIL is obtained by subtracting a constant value KIL from the air-fuel ratio correction coefficient FAF calculated at the last performance of the routine of FIG. 6. Next, at the step 23, the air-fuel correction coefficient FAF calculated at the step 27 is limited to the allowed range and the routine is terminated.

FIG. 7 is a flowchart for calculating the skip increase value RSR used at the step 22 shown in FIG. 6 and the skip decrease value RSL used at the step 26 shown in FIG. 6. When the routine of FIG. 7 starts, first, at the step 30, it is judged whether the air-fuel ratio A/F of the exhaust gas detected by the downstream air-fuel ratio sensor 56 is greater than the stoichiometric air-fuel ratio A/Fst (A/F>A/Fst), i.e. whether the air-fuel ratio of the exhaust gas is leaner than the stoichiometric air-fuel ratio. When it is judged that A/F>A/Fst, the routine proceeds to the step 31. On the other hand, when it is judged that A/F≦A/Fst, the routine proceeds to the step 34.

When at the step 30, it is judged that A/F>A/Fst, i.e. it is judged that the air-fuel ratio of the exhaust gas is leaner than the stoichiometric air-fuel ratio, and then the routine proceeds to the step 31, a value RSR+ΔRS is set as an updated skip increase value RSR, which value RSR+ΔRS is obtained by adding a predetermined value ΔRS to the skip increase value RSR calculated at the last performance of the routine of FIG. 7. Next, at the step 32, the skip increase value RSR calculated at the step 31 is limited to an allowed range. Next, at the step 33, a value is set as an updated skip decrease value RSL, which value is obtained by subtracting the skip increase value RSR limited at step 32 from a constant R, and the routine is terminated.

On the other hand, when at the step 30, it is judged that A/F≦A/Fst, i.e. it is judged that the air-fuel ratio of the exhaust gas is richer than the stoichiometric air-fuel ratio, and then the routine proceeds to the step 34, a value RSR−ΔRS is set as an updated skip increase value RSR, which value RSR−ΔRS is obtained by subtracting the predetermined value ΔRS from the skip increase value RSR calculated at the last performance of the routine of FIG. 7. Next, at the step 32, the skip increase value RSR calculated at the step 34 is limited to the allowed range. Next, at the step 33, a value is set as an updated skip decrease value RSL, which value is obtained by subtracting the skip increase value RSR limited at step 32 from the constant R, and the routine is terminated.

The internal combustion engine 10 has four fuel injectors 25. For example, when one of the fuel injectors has a malfunction, the following phenomena occur.

That is, in the first embodiment, the amount of the fuel injected from each fuel injector is controlled such that the air-fuel ratio of the mixture becomes a target air-fuel ratio on the basis of the air-fuel ratio of the exhaust gas detected by the air-fuel ratio sensors 55 and 56. That is, when it is judged that the air-fuel ratio of the mixture is leaner than the stoichiometric air-fuel ratio on the basis of the air-fuel ratio of the exhaust gas detected by the air-fuel ratio sensors, the fuel injection amount in each fuel injector is increased and on the other hand, when it is judged that the air-fuel ratio of the mixture is richer than the stoichiometric air-fuel ratio on the basis of the air-fuel ratio of the exhaust gas detected by the air-fuel ratio sensors, the fuel injection amount in each fuel injector is decreased. In other words, in the first embodiment, the air-fuel ratio sensors are not positioned for each combustion chamber but are commonly positioned for all combustion chambers and therefore when it is judged that the air-fuel ratio of the mixture is leaner than the stoichiometric air-fuel ratio, it is judged that the air-fuel ratios of the mixtures in all combustion chambers are leaner than the stoichiometric air-fuel ratio and on the other hand, when it is judged that the air-fuel ratio of the mixture is richer than the stoichiometric air-fuel ratio, it is judged that the air-fuel ratios of the mixtures in all combustion chambers are richer than the stoichiometric air-fuel ratio. Accordingly, when it is judged that the air-fuel ratio of the mixture is leaner than the stoichiometric air-fuel ratio, the fuel injection amount is increased in all combustion chambers and on the other hand, when it is judged that the air-fuel ratio of the mixture is richer than the stoichiometric air-fuel ratio, the fuel injection amount is decreased in all combustion chambers.

In this regard, for example, in the case where there is a malfunction in one of the fuel injectors (hereinafter, the fuel injector having a malfunction will be referred to as "malfunctioning fuel injector") in which the amount of fuel greater than the amount commanded by the electronic control unit (hereinafter, this amount will be referred to as "commanded fuel injection amount") is injected, when the commands are provided with all fuel injectors from the electronic control unit 60 such that the same amount of the fuel is injected in all fuel injectors 25, the commanded fuel injection amount of the fuel is injected from the remaining fuel injectors (hereinafter, the fuel injectors will be referred to as "normal fuel injectors") and therefore the air-fuel ratios of the mixtures formed in the corresponding combustion chambers become the stoichiometric air-fuel ratio, however, the air-fuel ratio of the mixture formed in the combustion chamber corresponding to the malfunctioning fuel injector becomes richer than the stoichiometric air-fuel ratio. Therefore, in this case, the emission property of the exhaust gas discharged from the combustion chamber corresponding to the functioning fuel injector becomes worse.

Further, when the exhaust gas discharged from the combustion chamber 21 corresponding to the malfunctioning fuel injector reaches the upstream air-fuel ratio sensor, it is judged that the air-fuel ratio of the mixture is richer than the stoichiometric air-fuel ratio and then the fuel injection amounts for all fuel injectors are decreased and therefore the air-fuel ratios of the mixtures formed in the combustion chambers corresponding to the normal fuel injectors become leaner than the stoichiometric air-fuel ratio. Therefore, in this case, the emission properties of the exhaust gases discharged from the combustion chambers corresponding to the normal fuel injectors become worse.

As is obvious, according to the first embodiment, even when the air-fuel ratio of the mixture formed in the combustion chamber 21 corresponding to the malfunctioning fuel injector 25 becomes richer than the stoichiometric air-fuel ratio and the air-fuel ratios of the mixtures formed in the combustion chambers 21 corresponding to the normal fuel injectors 25 become leaner than the stoichiometric air-fuel ratio, the fuel injection amount in each fuel injector is controlled such that the air-fuel ratio of the mixture formed in each combustion chamber becomes the stoichiometric air-fuel ratio and therefore it can be deemed that the air-fuel ratio of the mixture is totally controlled to the stoichiometric air-fuel ratio. However, even if it can be deemed that the air-fuel ratio of the mixture is totally controlled to the stoichiometric air-fuel ratio, the air-fuel ratio of the mixture becomes greatly richer and leaner than the stoichiometric air-fuel ratio during the performance of the air-fuel ratio control of the first embodiment and therefore individually viewing the air-fuel ratio of the mixture formed in each combustion chamber, the emission property of the exhaust gas discharged from each combustion chamber becomes worse.

On the other hand, in the case where there is a malfunction in one of the fuel injectors (hereinafter, the fuel injector having a malfunction will be referred to as "malfunctioning fuel injector") in which the amount of fuel smaller than the commanded fuel injection amount is injected, when the commands are provided with all fuel injectors from the electronic control unit 60 such that the same amount of the fuel is injected in all fuel injectors 25, the commanded fuel injection amount of the fuel is injected from the remaining normal fuel injectors and therefore the air-fuel ratios of the mixtures formed in the corresponding combustion chambers become the stoichiometric air-fuel ratio, however, the air-fuel ratio of the mixture formed in the combustion chamber corresponding to the malfunctioning fuel injector becomes leaner than the stoichiometric air-fuel ratio. Therefore, in this case, the emission property of the exhaust gas discharged from the combustion chamber corresponding to the functioning fuel injector becomes worse.

Further, when the exhaust gas discharged from the combustion chamber 21 corresponding to the malfunctioning fuel injector reaches the upstream air-fuel ratio sensor, it is judged that the air-fuel ratio of the mixture is leaner than the stoichiometric air-fuel ratio and then the fuel injection amounts for all fuel injectors are increased and therefore the air-fuel ratios of the mixtures formed in the combustion chambers corresponding to the normal fuel injectors become richer than the stoichiometric air-fuel ratio. Therefore, in this case, the emission properties of the exhaust gases discharged from the combustion chambers corresponding to the normal fuel injectors become worse.

As is obvious, according to the first embodiment, even when the air-fuel ratio of the mixture formed in the combustion chamber 21 corresponding to the malfunctioning fuel injector 25 becomes leaner than the stoichiometric air-fuel ratio and the air-fuel ratios of the mixtures formed in the combustion chambers 21 corresponding to the normal fuel injectors 25 become richer than the stoichiometric air-fuel ratio, the fuel injection amount in each fuel injector is controlled such that the air-fuel ratio of the mixture formed in each combustion chamber becomes the stoichiometric air-fuel ratio and therefore it can be deemed that the air-fuel ratio of the mixture is totally controlled to the stoichiometric air-fuel ratio. However, even if it can be deemed that the air-fuel ratio of the mixture is totally controlled to the stoichiometric air-fuel ratio, the air-fuel ratio of the mixture becomes greatly leaner and richer than the stoichiometric air-fuel ratio during the performance of the air-fuel ratio control of the first embodiment and therefore individually viewing the air-fuel ratio of the mixture formed in each combustion chamber, the emission property of the exhaust gas discharged from each combustion chamber becomes worse.

As explained above, in the case where there is a malfunction in a certain fuel injector in which the amount of the fuel greater or smaller than the commanded fuel injection amount is injected, the emission property of the exhaust gas discharged from the combustion chamber becomes worse.

In consideration of the above-explained situation, it is very important to know that the condition where there is a malfunction in a certain fuel injector in which the amount of the fuel greater or smaller than the commanded fuel injection amount is injected, i.e. the condition where there is a difference in the air-fuel ratio between the mixtures formed in the combustion chambers (hereinafter, this condition will be referred to as "inter-cylinder air-fuel ratio imbalance condition") occurs in order to know the condition of the emission property of the exhaust gas and then take measures for improving the emission property of the exhaust gas.

Accordingly, in the first embodiment, it is judged whether an inter-cylinder air-fuel ratio imbalance condition occurs, i.e. the occurrence of the inter-cylinder air-fuel ratio imbalance condition is judged as follows.

That is, assuming that the rotational angle of the crank shaft is referred to as "crank angle", in the combustion chambers 21 of the internal combustion engine 10, the exhaust stroke is performed sequentially in the first, fourth, third and second cylinders #1, #4, #3 and #2, respectively, every the crank angle proceeds by 180 degrees. Therefore, the exhaust gas is sequentially discharged from the combustion chambers 21 every the crank angle proceeds by 180 degrees and then sequentially reaches the upstream air-fuel ratio sensor 55. Therefore, the upstream air-fuel ratio sensor generally sequentially detects the air-fuel ratios of the exhaust gases discharged from the first, fourth, third and second cylinders, respectively.

Figure 8:
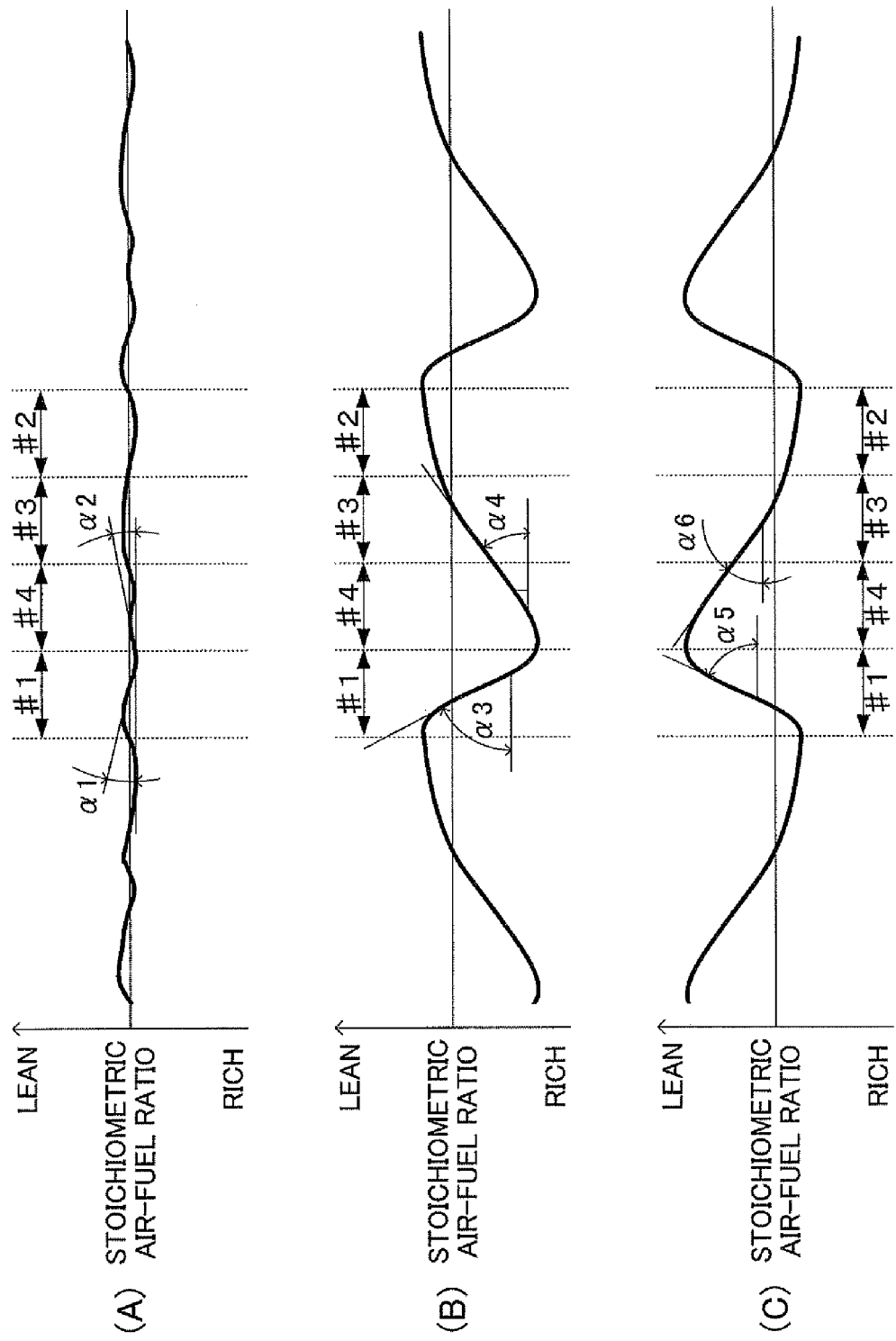
FIG. 8(A) is a view showing a transition of the upstream air-fuel ratio sensor in the case where all fuel injectors are normal.
FIG. 8(B) is a view showing a transition of the upstream air-fuel ratio sensor in the case where there is a malfunction in the fuel injector corresponding to the first cylinder #1 in which the amount of fuel injected therefrom is greater than the commanded fuel injection amount while the remaining fuel injectors are normal.
FIG. 8(c) is a view showing a transition of the upstream air-fuel ratio sensor in the case where there is a malfunction in the fuel injector corresponding to the first cylinder #1 in which the amount of fuel injected therefrom is smaller than the commanded fuel injection amount while the remaining fuel injectors are normal.

In this regard, in the case where all fuel injector 25 are normal, the output value output from the upstream air-fuel ratio sensor corresponding to the exhaust gas reaching the upstream air-fuel ratio sensor 55 changes as shown in FIG. 8(A). That is, as explained above, according to the air-fuel ratio control of the first embodiment, the air-fuel ratio of the mixture formed in each combustion chamber 21 is totally controlled to the stoichiometric air-fuel ratio by being changed between the air-fuel ratios richer and leaner than the stoichiometric air-fuel ratio. Further, when the air-fuel ratio of the mixture leaner than the stoichiometric air-fuel ratio is detected by the upstream air-fuel ratio sensor, the increase value relative to the fuel injection amount in each fuel injector is set such that the air-fuel ratio of the mixture reaches the stoichiometric air-fuel ratio as rapidly as possible and on the other hand, when the air-fuel ratio of the mixture richer than the stoichiometric air-fuel ratio is detected by the upstream air-fuel ratio sensor, the decrease value relative to the fuel injection amount in each fuel injector is set such that the air-duel ratio of the mixture reaches the stoichiometric air-fuel ratio as rapidly as possible. Accordingly, when all fuel injectors are normal, as shown in FIG. 8(A), the output value of the upstream air-fuel ratio sensor (hereinafter, this output value will be referred to as "sensor output value") changes repeatedly to above and below the output value corresponding to the stoichiometric air-fuel ratio with a relatively small amplitude.

On the other hand, in the case where there is a malfunction in the fuel injector 25 corresponding to the first cylinder #1 in which the amount of the fuel greater than the commanded fuel injection amount is injected and the fuel injectors corresponding to the remaining cylinders #2 to #4 are normal, the sensor output value changes as shown in FIG. 8(B). That is, the air-fuel ratio of the mixture formed in the first cylinder #1 corresponding to the malfunctioning fuel injector is greatly richer than the stoichiometric air-fuel ratio and therefore the air-fuel ratio of the exhaust gas discharged from the first cylinder is also greatly richer than the stoichiometric air-fuel ratio. Accordingly, when the exhaust gas discharged from the first cylinder reaches the upstream air-fuel ratio sensor 55, the sensor output value rapidly decreases toward the output value corresponding to the air-fuel ratio of the exhaust gas discharged from the first cylinder, i.e. corresponding to the air-fuel ratio greatly richer than the stoichiometric air-fuel ratio. Further, according to the air-fuel control of the first embodiment, when the sensor output value corresponding to the air-fuel ratio greatly richer than the stoichiometric air-fuel ratio is output, i.e. when the upstream air-fuel ratio sensor detects an air-fuel ratio greatly richer than the stoichiometric air-fuel ratio, the fuel injection amount in all fuel injectors are greatly decreased and therefore the air-fuel ratios of the mixtures formed in the fourth, third and second cylinders #4, #3 and #2 become greatly leaner than the stoichiometric air-fuel ratio. Accordingly, when the exhaust gases discharged from the fourth to second cylinders reach the upstream air-fuel ratio sensor, the sensor output value rapidly increases toward the output value corresponding to the air-fuel ratio of the exhaust gas discharged from these cylinders, i.e. corresponding to the air-fuel ratio greatly leaner than the stoichiometric air-fuel ratio. Further, according to the air-fuel ratio control of the first embodiment, when the sensor output value corresponding to the air-fuel ratio leaner than the stoichiometric air-fuel ratio is output, i.e. the upstream air-fuel ratio sensor detects the air-fuel ratio leaner than the stoichiometric air-fuel ratio, the fuel injection amounts regarding all fuel injectors are increased and therefore the air-fuel ratio of the mixture formed in the first cylinder becomes greatly richer than the stoichiometric air-fuel ratio. Accordingly, in the case where there is a malfunction in a certain fuel injector in which the amount of the fuel greater than the commanded fuel injection amount is injected, as shown in FIG. 8(B), the sensor output value changes repeatedly to above and below the output value corresponding to the stoichiometric air-fuel ratio with a relatively great amplitude.

On the other hand, in the case where there is a malfunction in the fuel injector 25 corresponding to the first cylinder #1 in which the amount of the fuel smaller than the commanded fuel injection amount is injected and the fuel injectors corresponding to the remaining cylinders #2 to #4 are normal, the sensor output value changes as shown in FIG. 8(C). That is, the air-fuel ratio of the mixture formed in the first cylinder #1 corresponding to the malfunctioning fuel injector is greatly leaner than the stoichiometric air-fuel ratio and therefore the air-fuel ratio of the exhaust gas discharged from the first cylinder is also greatly leaner than the stoichiometric air-fuel ratio. Accordingly, when the exhaust gas discharged from the first cylinder reaches the upstream air-fuel ratio sensor 55, the sensor output value rapidly increases toward the output value corresponding to the air-fuel ratio of the exhaust gas discharged from the first cylinder, i.e. corresponding to the air-fuel ratio greatly leaner than the stoichiometric air-fuel ratio. Further, according to the air-fuel control of the first embodiment, when the sensor output value corresponding to the air-fuel ratio greatly leaner than the stoichiometric air-fuel ratio is output, i.e. when the upstream air-fuel ratio sensor detects an air-fuel ratio greatly leaner than the stoichiometric air-fuel ratio, the fuel injection amount in all fuel injectors are greatly increased and therefore the air-fuel ratios of the mixtures formed in the fourth, third and second cylinders #4, #3 and #2 become greatly richer than the stoichiometric air-fuel ratio. Accordingly, when the exhaust gases discharged from the fourth to second cylinders reach the upstream air-fuel ratio sensor, the sensor output value rapidly decreases toward the output value corresponding to the air-fuel ratio of the exhaust gas discharged from these cylinders, i.e. corresponding to the air-fuel ratio greatly richer than the stoichiometric air-fuel ratio. Further, according to the air-fuel ratio control of the first embodiment, when the sensor output value corresponding to the air-fuel ratio richer than the stoichiometric air-fuel ratio is output, i.e. the upstream air-fuel ratio sensor detects the air-fuel ratio richer than the stoichiometric air-fuel ratio, the fuel injection amounts regarding all fuel injectors are decreased and therefore the air-fuel ratio of the mixture formed in the first cylinder becomes greatly leaner than the stoichiometric air-fuel ratio. Accordingly, in the case where there is a malfunction in a certain fuel injector in which the amount of the fuel smaller than the commanded fuel injection amount is injected, as shown in FIG. 8(C), the sensor output value changes repeatedly to above and below the output value corresponding to the stoichiometric air-fuel ratio with a relatively great amplitude.

As explained above, the change of the sensor output value in the case where there is a malfunction in a certain fuel injector is greatly different from that in the case where all fuel injectors are normal.

In particular, in the case where all fuel injectors are normal, as shown in FIG. 8(A), when the sensor output value decreases along with the change of the air-fuel ratio of the exhaust gas reaching the upstream air-fuel ratio sensor toward the rich side, the average slope of the line described by the changing sensor output value (hereinafter, this slope will be simply referred to as "slope") is a relatively small slope $\alpha 1$. On the other hand, when the sensor output value increases along with the change of the air-fuel ratio of the exhaust gas reaching the upstream air-fuel ratio sensor toward the lean side, the average slope of the line described by the changing sensor output value (hereinafter, this slope will be also simply referred to as "slope") is a relatively small slope $\alpha 2$. In this case, the absolute values of the slopes $\alpha 1$ and $\alpha 2$ are generally equal to each other.

On the other hand, in the case where there is a malfunction in a certain fuel injector in which the amount of the fuel greater than the commanded fuel injection amount is injected, as shown in FIG. 8(B), when the sensor output value decreases along with the change of the air-fuel ratio of the exhaust gas reaching the upstream air-fuel ratio sensor toward the rich side, the slope of the line described by the changing sensor output value is a relatively great slope $\alpha 3$. On the other hand, when the sensor output value increases along with the change of the air-fuel ratio of the exhaust gas reaching the upstream air-fuel ratio sensor toward the lean side, the slope of the line described by the changing sensor output value is a relatively great slope $\alpha 4$. In this case, the absolute value of the slope $\alpha 3$ of the line described by the decreasing sensor output value is slightly greater than that of the slope $\alpha 4$ of the line described the increasing sensor output value.

On the other hand, in the case where there is a malfunction in a certain fuel injector in which the amount of the fuel smaller than the commanded fuel injection amount is injected, as shown in FIG. 8(C), when the sensor output value increases along with the change of the air-fuel ratio of the exhaust gas reaching the upstream air-fuel ratio sensor toward the lean side, the slope of the line described by the changing sensor output value is a relatively great slope α5. On the other hand, when the sensor output value decreases along with the change of the air-fuel ratio of the exhaust gas reaching the upstream air-fuel ratio sensor toward the rich side, the slope of the line described by the changing sensor output value is a relatively great slope α6. In this case, the absolute value of the slope α5 of the line described by the increasing sensor output value is slightly greater than that of the slope α6 of the line described the decreasing sensor output value.

As explained above, the slopes of the lines described by the changing sensor output values in the case where all fuel injectors are normal, in the case where there is a malfunction in a certain fuel injector in which the amount of the fuel greater than the commanded fuel injection amount is injected and in the case where there is a malfunction in a certain fuel injector in which the amount of the fuel smaller than the commanded fuel injection amount is injected are different from each other. Therefore, the occurrence of the inter-cylinder air-fuel ratio imbalance condition can be judged using the slope. That is, the slope of the line described by the changing sensor output value in the case where there is a malfunction in a certain fuel injector is basically greater than that in case that all fuel injectors are normal. Therefore, a possible slope of the line described by the changing sensor output value in the case where all fuel injectors are normal or the value greater than the possible slope is employed as a threshold and when the slope of the line described by the changing sensor output value is greater than the threshold during the engine operation, it can be judged that the inter-cylinder air-fuel ratio imbalance condition occurs.

In the first embodiment, basically, on the basis of this concept, it is judged whether the inter-cylinder air-fuel ratio imbalance condition occurs. However, in the first embodiment, in order to accurately judge whether the inter-cylinder air-fuel ratio imbalance condition occurs, the judgment of whether inter-cylinder air-fuel ratio imbalance condition occurs is performed as follows.

That is, from the study of the inventors of this application, it is realized that the slope of the line described by the changing sensor output value is a parameter independent of the engine speed, however a parameter which changes, depending on the intake air amount.

Figure 9:
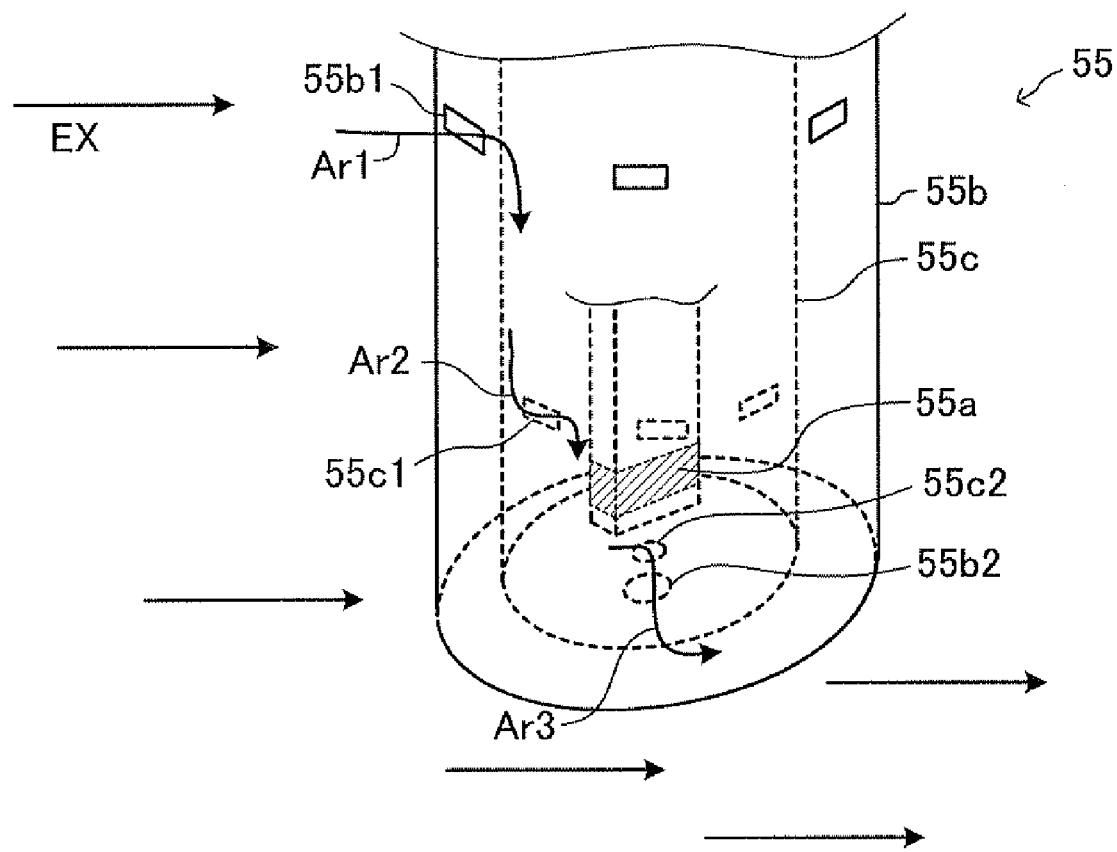
FIG. 9 is a partially schematic perspective view showing a part of the upstream air-fuel ratio sensor.
Figure 10:
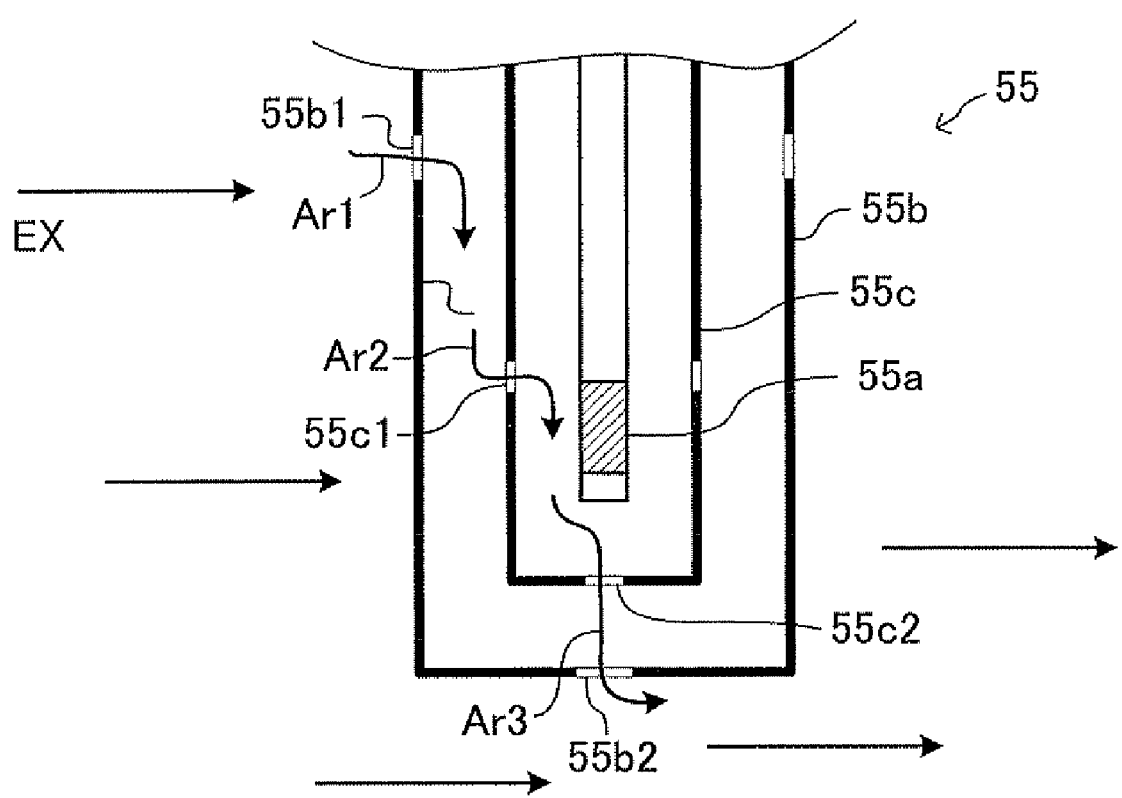
FIG. 10 is a partial cross-sectional view of a part showing the upstream air-fuel ratio sensor.

That is, as shown in FIGS. 9 and 10, the upstream air-fuel ratio sensor 55 has an air-fuel ratio detecting element 55*a*, an outer protection cover 55*b* and an inner protection cover 55*c*. The protection covers 55*b* and 55*c* house the air-fuel ratio detecting element 55*a* therein to cover the air-fuel ratio detecting element 55*a*. Further, the protection covers 55*b* and 55*c* have inlet apertures 55*b*1 and 55*c*1, through which the exhaust gas reaching the upstream air-fuel ratio sensor 55 flows into the interior of the upstream air-fuel ratio sensor and reaches the air-fuel ratio detecting element 55*a*, and outlet apertures 55*b*2 and 55*c*2, through which the exhaust gas flowing into the interior of the upstream air-fuel ratio sensor flows out to the exhaust pipe 42, respectively.

Further, the upstream air-fuel ratio sensor 55 is positioned on the exhaust pipe 42 such that the protection covers 55*b* and 55*c* are exposed to the interior of the exhaust pipe 42. Therefore, as shown by the arrow Ar1 in FIGS. 9 and 10, the exhaust gas EX flowing in the exhaust pipe 42 flows through the inlet apertures 55*b*1 of the outer protection cover 55*b* into the space between the outer and inner protection covers 55*b* and 55*c*. Then, as shown by the arrow Ar2, the exhaust gas flows through the inlet apertures 55*c*1 of the inner protection cover 55*c* into the interior of the inner protection cover 55*c* and reaches the air-fuel ratio detecting element 55*a*. Thereafter, as shown by the arrow Ar3, the exhaust gas flows out through the outlet apertures 55*c*2 and 55*b*2 of the inner and outer protection cover 55*c* and 55*b* to the exhaust pipe 42. The exhaust gas reaching the upstream air-fuel ratio sensor 55 flows in the interior of the upstream air-fuel ratio sensor as explained above and therefore the exhaust gas reaching the upstream air-fuel ratio sensor is sucked into the inlet apertures 55*b*1 of the outer protection cover 55*b* by the flow of the exhaust gas flowing adjacent to the outlet apertures 55*b*2 of the outer protection cover 55*b*.

Accordingly, the velocity of the flow of the exhaust gas in the protection covers 55*b* and 55*c* changes, depending on the velocity of the flow of the exhaust gas flowing adjacent to the outlet apertures 55*b*2 of the outer protection cover 55*b*, i.e. depending on the intake air amount per unit time. In other words, the time which the exhaust gas reaching the inlet apertures 55*b*1 of the outer protection cover 55*b* takes to reach the air-fuel ratio detecting element 55*a* depends on the intake air amount, however it does not depend on the engine speed. This can be equally applied to the air-fuel sensor having only the inner protection cover.

Figure 11:
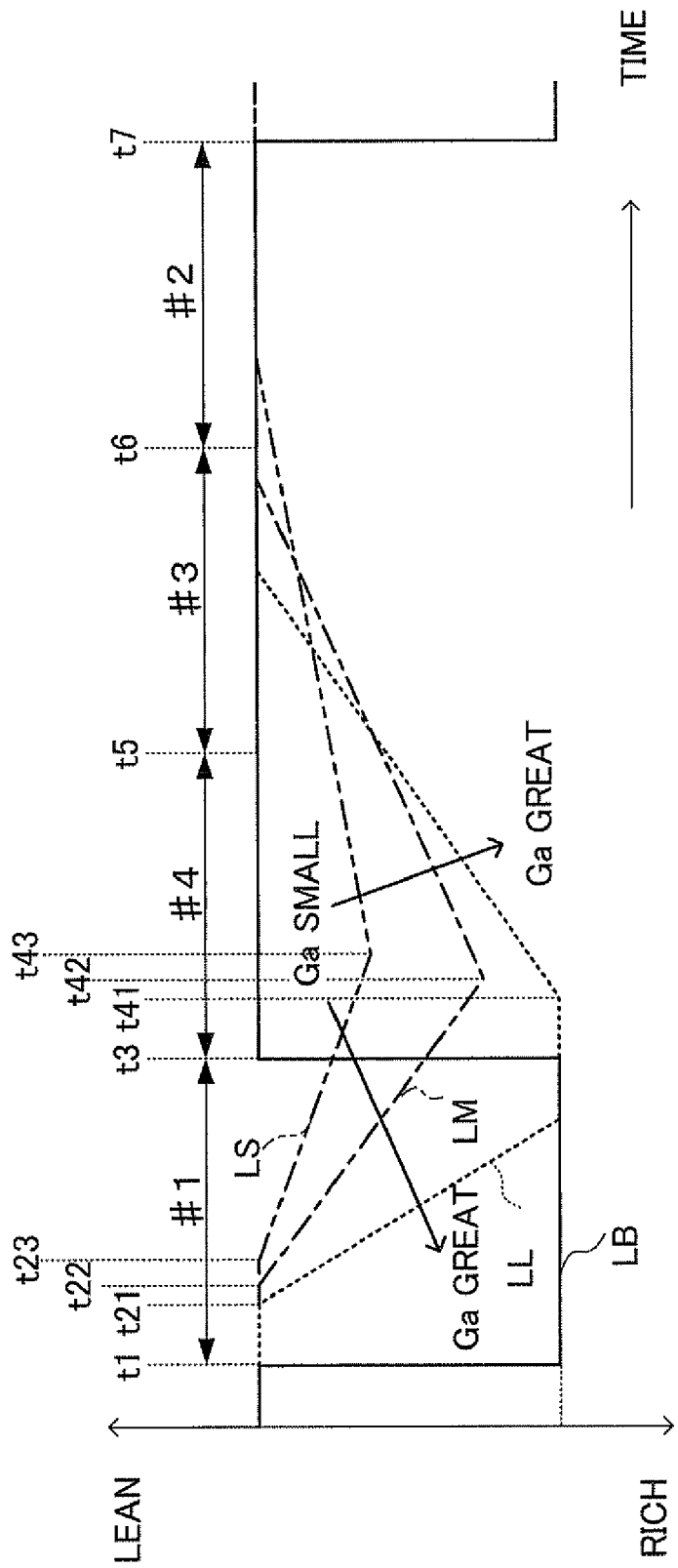
FIG. 11 is a view showing a transition of the air-fuel ratio of the exhaust gas in the upstream air-fuel ratio sensor in the case where there is a malfunction in the fuel injector corresponding to the first cylinder #1 in which the amount of fuel injected therefrom is greater than the commanded fuel injection amount while the reminder of the fuel injectors are normal.

Therefore, for example, in the case where there is a malfunction in the fuel injector 25 corresponding to the first cylinder #1 in which the amount of the fuel greater than the commanded fuel injection amount is injected, the remaining fuel injectors are normal and the engine speed is constant, the sensor output value changes, depending on the intake air amount as shown in FIG. 11.

That is, in FIG. 11, the line LB indicates the change of the air-fuel ratio of the exhaust gas reaching the outlet apertures 55*b*1 of the outer protection cover 55*b* and in the example shown in FIG. 11, the exhaust gases discharged from the first, fourth, third and second cylinders #1, #4, #3 and #2 reach the inlet apertures of the outer protection cover at the times t1, t3, t5 and t6, respectively.

Further, in FIG. 11, the line LL indicates the change of the air-fuel ratio of the exhaust gas contacting to the air-fuel ratio detecting element 55*a* in the case where the intake air amount is relatively great, the line LM indicates the change of the air-fuel ratio of the exhaust gas contacting to the air-fuel ratio detecting element in the case where the intake air amount is middle and the line LS indicates the change of the air-fuel ratio of the exhaust gas contacting to the air-fuel ratio detecting element in the case where the intake air amount is relatively small.

In FIG. 11, as shown by the line LB, once the exhaust gas discharged from the first cylinder #1 in which the air-fuel ratio of the mixture is richer than the stoichiometric air-fuel ratio reaches the inlet apertures 55*b*1 of the outer protection cover 55*b* at the time t1, the exhaust gas reaches the air-fuel ratio detecting element 55*a* through the inlet apertures. In this regard, as explained above, the velocity of the flow of the exhaust gas flowing in the interior of the protection covers 55*b* and 55*c* depends on that flowing in the exhaust pipe 42 and therefore the exhaust gas flowing into the inlet apertures reaches the air-fuel ratio detecting element at the time t21 immediately after the time t1 in the case where the intake air amount is relatively great (i.e. the velocity of the flow of the exhaust gas flowing in the exhaust pipe is relatively great) as shown by the line LL, the exhaust gas flowing into the inlet apertures reaches the air-fuel ratio detecting element at the time t22 after the time t21 and slightly after the time t1 in the case where the intake air amount is meddle (i.e. the velocity of the flow of the exhaust gas flowing in the exhaust pipe is middle) as shown by the line LM and the exhaust gas flowing into the inlet apertures reaches the air-fuel ratio detecting element at the time t23 after the time t22 and relatively greatly after the time t1 in the case where the intake air amount is relatively small (i.e. the velocity of the flow of the exhaust gas flowing in the exhaust pipe is relatively small) as shown by the line LS. That is, the exhaust gas reaching the inlet apertures of the outer protection cover reaches the air-fuel ratio detecting element at the time near the time t1 as the intake air amount is great.

In this regard, the exhaust gas contacting to the air-fuel ratio detecting element 55a is the mixture of the exhaust gas newly reaching the air-fuel ratio detecting element and the exhaust gas already existing adjacent to the air-fuel ratio detecting element. Therefore, even when the exhaust gas discharged from the first cylinder #1 having an air-fuel ratio greatly richer than the stoichiometric air-fuel ratio reaches the air-fuel ratio detecting element, the air-fuel ratio of the exhaust gas contacting to the air-fuel ratio detecting element does not promptly correspond to the air-fuel ratio of the exhaust gas discharged from the first cylinder #1, but progressively decreases toward the air-fuel ratio of the exhaust gas discharged from the first cylinder #1. The average slope of the line described by the changing air-fuel ratio of the exhaust gas contacting to the air-fuel ratio detecting element is great as the intake air amount is great.

Further, as shown by the line LB in FIG. 11, once the exhaust gas discharged from the fourth cylinder #4 in which the air-fuel ratio of the mixture is controlled to the stoichiometric air-fuel ratio reaches the inlet apertures 55b1 of the outer protection cover 55b at the time t3 after the exhaust gas discharged from the first cylinder #1 reaches the air-fuel ratio detecting element, the exhaust gas reaches the air-fuel ratio detecting element 55a through the inlet apertures. In this regard, the exhaust gas flowing into the inlet apertures reaches the air-fuel ratio detecting element at the time t41 immediately after the time t3 in the case where the intake air amount is relatively great (i.e. the velocity of the flow of the exhaust gas flowing in the exhaust pipe is relatively great) as shown by the line LL, the exhaust gas flowing into the inlet apertures reaches the air-fuel ratio detecting element at the time t42 after the time t41 and slightly after the time t3 in the case where the intake air amount is meddle (i.e. the velocity of the flow of the exhaust gas flowing in the exhaust pipe is middle) as shown by the line LM and the exhaust gas flowing into the inlet apertures reaches the air-fuel ratio detecting element at the time t43 after the time t42 and relatively greatly after the time t3 in the case where the intake air amount is relatively small (i.e. the velocity of the flow of the exhaust gas flowing in the exhaust pipe is relatively small) as shown by the line LS.

For the same reason as that explained in relation to the case where the exhaust gas discharged from the first cylinder #1 reaches the air-fuel ratio detecting element 55a, when the exhaust gas discharged from the fourth cylinder #4 having an air-fuel ratio controlled to the stoichiometric air-fuel ratio reaches the air-fuel ratio detecting element, the air-fuel ratio of the exhaust gas contacting to the air-fuel ratio detecting element does not promptly correspond to the air-fuel ratio of the exhaust gas discharged from the fourth cylinder #4, but progressively increases toward the air-fuel ratio of the exhaust gas discharged from the fourth cylinder #4. The average slope of the line described by the changing air-fuel ratio of the exhaust gas contacting to the air-fuel ratio detecting element is great as the intake air amount is great.

It should be noted that in the case shown by the line LM where the intake air amount is middle and the case shown by the line LS where the intake air amount is relatively small, the exhaust gas discharged from the fourth cylinder #4 in which the exhaust stroke is performed next to that in the first cylinder #1 reaches the air-fuel ratio detecting element before the air-fuel ratio of the exhaust gas contacting to the air-fuel ratio detecting element 55a corresponds to the air-fuel ratio of the exhaust gas discharged from the first cylinder #1. Accordingly, the air-fuel ratio of the exhaust gas contacting the air-fuel ratio detecting element increases before it corresponds to the air-fuel ratio of the exhaust gas discharged from the first cylinder #1.

Figure 12:
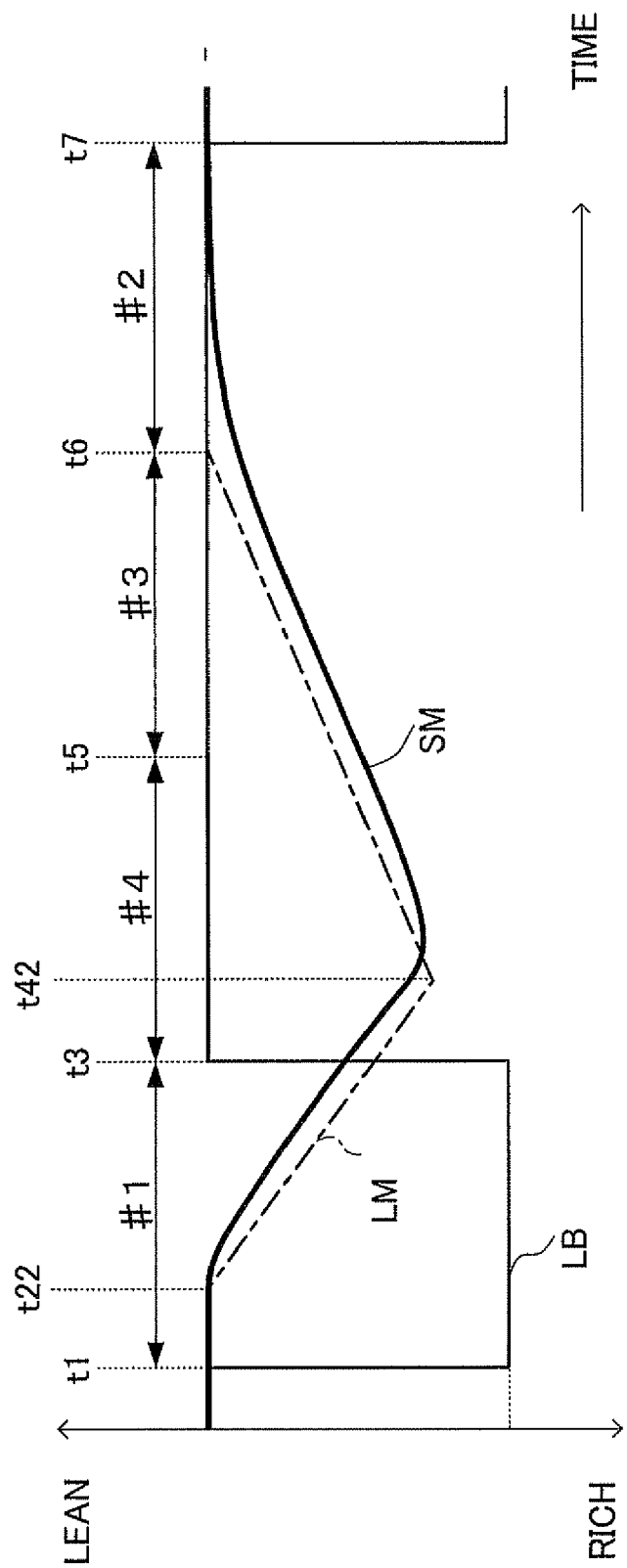
FIG. 12 is a view showing transitions of the air-fuel ratio of the exhaust gas in the upstream air-fuel ratio sensor and the output value of the upstream air-fuel ratio sensor in the case where there is a malfunction in the fuel injector corresponding to the first fuel injector #1 in which the amount of fuel injected therefrom is greater than the commanded fuel injection amount while the remainder of the fuel injectors are normal under the middle intake air amount.

Further, the sensor output value changes with a slightly delay time along with the change of the air-fuel ratio of the exhaust gas contacting to the air-fuel ratio detecting element 55a. Accordingly, for example, in the case where there is a malfunction in the fuel injector 25 corresponding to the first cylinder #1 in which the amount of the fuel greater than the commanded fuel injection amount is injected, the remaining fuel injectors are normal and the intake air amount is meddle, as shown in FIG. 12, when the air-fuel ratio of the exhaust gas reaching the inlet apertures 55b1 of the outer protection cover 55b changes as shown by the line LB, the air-fuel ratio of the exhaust gas contacting to the air-fuel ratio detecting element 55a changes as shown by the line LM and the sensor output value changes as shown by the line SM.

Figure 13:
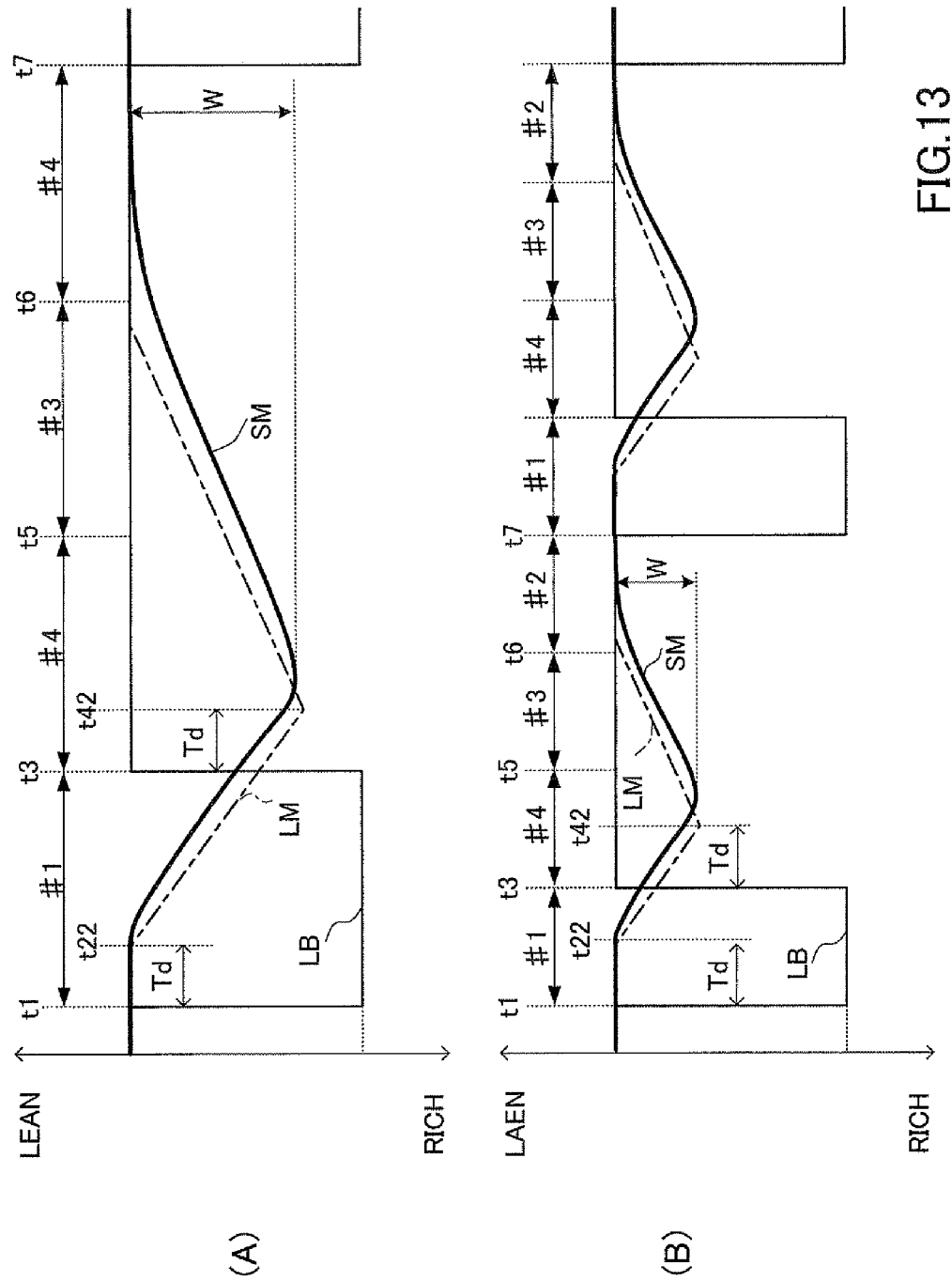
FIG. 13(A) is a view showing a transition of the air-fuel ratio of the exhaust gas in the upstream air-fuel ratio sensor in the case where in the case where there is a malfunction in the fuel injector corresponding to the first fuel injector #1 in which the amount of fuel injected therefrom is greater than the commanded fuel injection amount while the remainder of the fuel injectors are normal under the middle intake air amount and the specific constant engine speed.
FIG. 13(B) is a view showing a transition of the air-fuel ratio of the exhaust gas in the upstream air-fuel ratio sensor in the case where in the case where there is a malfunction in the fuel injector corresponding to the first fuel injector #1 in which the amount of fuel injected therefrom is greater than the commanded fuel injection amount while the remainder of the fuel injectors are normal under the middle intake air amount and the engine speed which is double the specific constant engine speed.

On the other hand, for example, in the case where there is a malfunction in the fuel injector 25 corresponding to the first cylinder #1 in which the amount of the fuel greater than the commanded fuel injection amount is injected, the remaining fuel injectors are normal and the intake air amount is meddle, when the engine speed is a constant value N1, the air-fuel ratio of the exhaust gas reaching the inlet apertures 55b1 of the outer protection cover 55b changes as shown by the line LB in FIG. 13(A) and the sensor output value changes as shown by the line SM in FIG. 13(A). On the other hand, when the engine speed is a constant value N2 which is the double of the constant value N1, the air-fuel ratio of the exhaust gas reaching the inlet apertures of the outer protection cover changes as shown by the line LB in FIG. 13(B) and the sensor output value changes as shown by the line SM in FIG. 13(B).

As can be understood from FIGS. 13(A) and 13(B), when the exhaust gas discharged from the first cylinder #1 corresponding to the malfunctioning fuel injector 25 reaching the air-fuel ratio detecting element 55a and the air-fuel ratio of the exhaust gas contacting to the air-fuel ratio detecting element decreases to the rich side, the average slope of the line described by the air-fuel ratio of the exhaust gas shown by the line LM in FIG. 13(A) is the same as that shown by the line LM in FIG. 13(B) even when there is a difference in the engine speed. Further, when the exhaust gas discharged from the fourth cylinder #4 corresponding to the normal fuel injector reaches the air-fuel ratio detecting element, following the exhaust gas discharged from the first cylinder #1 and the air-fuel ratio of the exhaust gas contacting the air-fuel ratio detecting element increases to the lean side, the average slope of the line described by the air-fuel ratio of the exhaust gas shown by the line LM in FIG. 13(A) is the same as that shown by the line LM in FIG. 13(B) even when there is a difference in the engine speed.

That is, in the case where there is no difference in the intake air amount, even when there is a difference in the engine speed, the amount of the exhaust gas discharged from each combustion chamber per unit time is constant. Therefore, in this case, the velocity of the flow of the exhaust gas flowing in the exhaust pipe 42 is constant. Accordingly, the velocity of the flow of the exhaust gas is also constant when the exhaust gas reaching the inlet apertures 55b1 of the outer protection cover 55b of the upstream air-fuel ratio sensor 55 diffuses in the interior of the upstream air-fuel ratio sensor and then reaches the air-fuel ratio detecting element 55a. That is, in the case where there is no difference in the intake air amount, even when there is a difference in the engine speed, the exhaust gas reaching the upstream air-fuel ratio sensor diffuses in the interior thereof at the constant flow velocity. For this reason, in the case where there is no difference in the intake air amount, even when there is a difference in the engine speed, there is no difference in the average slope of the line described by the air-fuel ratio of the exhaust gas when the air-fuel ratio of the exhaust gas contacting to the air-fuel ratio detecting element decreases to the rich side and there is no difference in the average slope of the line described by the air-fuel ratio of the exhaust gas when the air-fuel ratio of the exhaust gas contacting to the air-fuel ratio detecting element increases to the lean side.

It should be noted that as shown in FIGS. 13(A) and 13(B), the time from the time t1, where the exhaust gas discharged from the first cylinder #1 in which the air-fuel ratio of the mixture deviates to the richer side of the stoichiometric air-fuel ratio reaches the inlet apertures 55b1 of the outer protection cover 55b, to the time t22, where the exhaust gas reaches the air-fuel ratio detecting element, is a constant time Td even when the engine speed varies. Also, as shown in FIGS. 13(A) and 13(B), the time from the time t3, where the exhaust gas discharged from the fourth cylinder #4 in which the air-fuel ratio of the mixture is controlled to the stoichiometric air-fuel ratio reaches the inlet apertures of the outer protection cover, to the time t42, where the exhaust gas reaches the air-fuel ratio detecting element, is a constant time Td even when the engine speed varies. Further, as can be understood from FIGS. 13(A) and 13(B), the width W of the change of the sensor output value is small as the engine speed is great.

As explained above, the average slope of the line described by the changing air-fuel ratio of the exhaust gas contacting to the air-fuel ratio detecting element 55a is a parameter which is independent of the engine speed and becomes great as the intake air amount becomes great.

In the first embodiment, in consideration of the above-explained matters, it is judged whether the inter-cylinder air-fuel ratio imbalance condition occurs. That is, assuming that the change amount of the air-fuel ratio of the exhaust gas contacting to the air-fuel ratio detecting element 55a of the upstream air-fuel ratio sensor 55 per unit time is referred to as "unit air-fuel ratio change amount", a relational expression between the unit air-fuel ratio change amount and the intake air amount in the case where all fuel injectors are normal is previously obtained by experiments, etc., the change amount of the unit air-fuel ratio change amount per unit intake air amount is obtained from the obtained relational expression and the obtained change amount is stored as a correction coefficient in the electronic control unit 60. Further, the intake air amount used for a base for judging whether inter-cylinder air-fuel ratio imbalance condition occurs is selected and the selected intake air amount is stored as a base intake air amount in the electronic control unit. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

Further, the unit air-fuel ratio change amount is calculated on the basis of the output value of the upstream air-fuel ratio sensor 55 during the engine operation and the calculated unit air-fuel ratio change amount is corrected according to the following expression 1.

$$\Delta A/Favec = \Delta A/Fave + K^*(Gab - Gaave) \quad (1)$$

In the above expression 1, "ΔA/Favec" is the unit air-fuel ratio change amount after being corrected (hereinafter this unit air-fuel ratio change amount will be referred to as "corrected unit air-fuel ratio change amount"), "ΔA/Fave" is the unit air-fuel ratio change amount calculated during the engine operation, "K" is the correction coefficient (i.e. the change amount of the unit air-fuel ratio change amount per unit intake air amount obtained from the relational expression between the unit air-fuel ratio change amount and the intake air amount in the case where all fuel injectors are normal) stored in the electronic control unit, "Gab" is the base intake air amount and "Gaave" is the intake air amount detected by the air flow meter 51 when the unit air-fuel ratio change amount is calculated during the engine operation, strictly, is the intake air amount detected by the air flow meter when the upstream air-fuel ratio sensor outputs the output value used for calculating the unit air-fuel ratio change amount during the engine operation (hereinafter, which intake air amount will be simply referred to as "the intake air amount at the time of the calculation of the unit air-fuel ratio change amount").

Further, the corrected unit air-fuel ratio change amount ΔA/Favec calculated according to the above-mentioned expression 1 is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the first embodiment, the unit air-fuel ratio change amount calculated during the engine operation is converted to the unit air-fuel ratio change amount in the case where the intake air amount is equal to the base intake air amount and the converted unit air-fuel ratio change amount (i.e. the corrected unit air-fuel ratio change amount) is compared with the judgment value set to a value greater than the unit air-fuel ratio change amount in the case where the intake air amount is equal to the base intake air amount and all fuel injectors are normal by a predetermined value.

Figure 14:
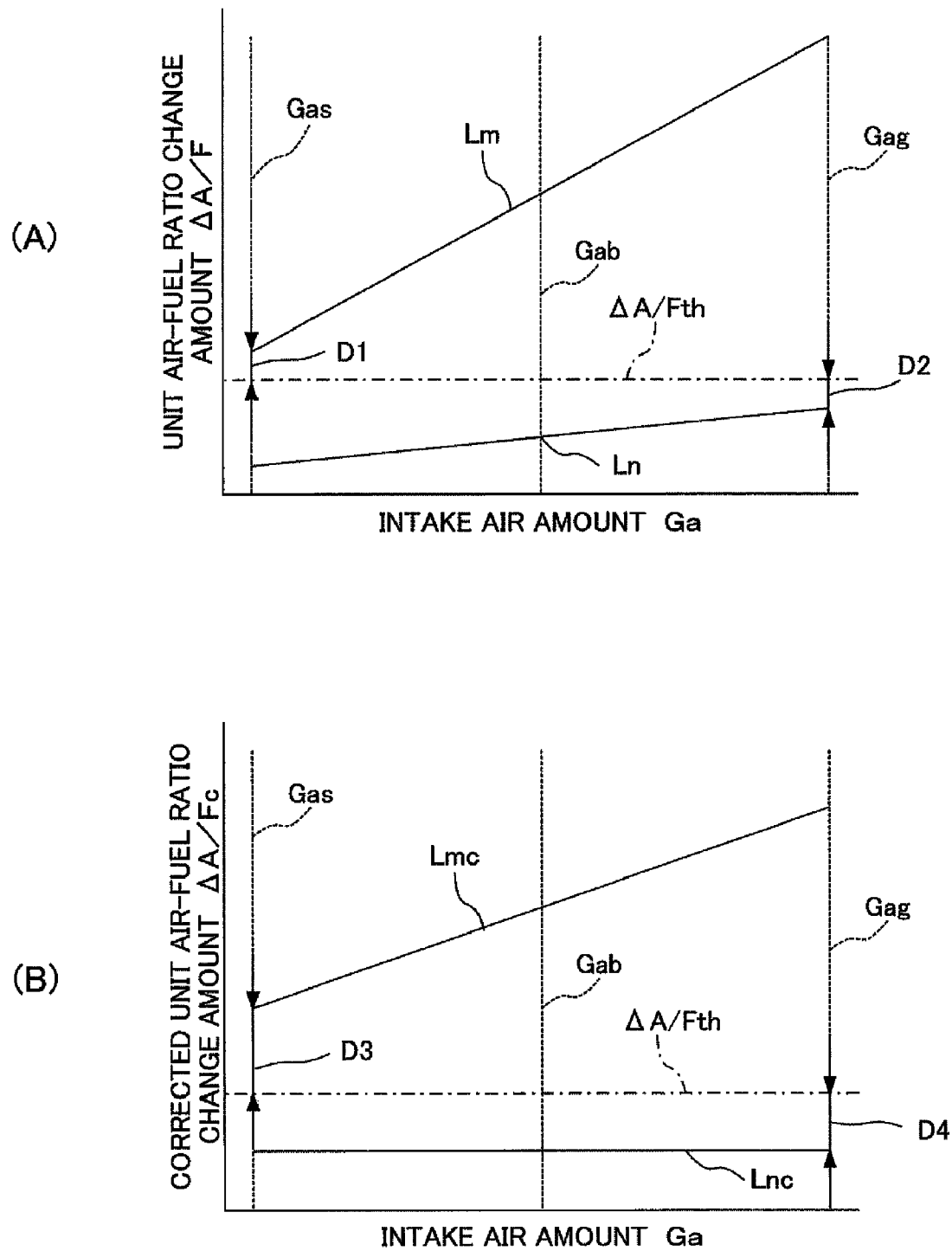
FIG. 14(A) is a view showing a relationship between the intake air amount and the unit air-fuel ratio change amount.
FIG. 14(B) is a view showing a relationship between the intake air amount and the corrected unit air-fuel ratio change amount.

That is, the relationship between the intake air amount and the unit air-fuel ratio change amount in the case where all fuel injectors are normal is shown by the line Ln in FIG. 14(A). On the other hand, the relationship between the intake air amount and the unit air-fuel ratio change amount in the case where there is a malfunction in a certain fuel injector is shown by the line Lm in FIG. 14(A). As is obvious from FIG. 14(A), even when all fuel injectors are normal and even when there is a malfunction in a certain fuel injector, the unit air-fuel ratio change amount tends to be great as the intake air amount is great. Further, when the intake air amount is constant, the unit air-fuel ratio change amount in the case where there is a malfunction in a certain fuel injector is greater than that in the case where all fuel injectors are normal.

In this regard, as shown in FIG. 14(A), when a value between the unit air-fuel ratio change amount in the case where all fuel injectors are normal and the unit air-fuel ratio change amount in the case where there is a malfunction in a certain fuel injector is set to the judgment value $\Delta A/Fth$ independently of the intake air amount, the judgment of the occurrence of the inter-cylinder air-fuel ratio imbalance condition should be accurate by comparing the unit air-fuel ratio change amount calculated during the engine operation with the judgment value $\Delta A/Fth$ and judging that no inter-cylinder air-fuel ratio imbalance condition occurs when the unit air-fuel ratio change amount is equal to or smaller than the judgment value $\Delta A/Fth$ or judging that the inter-cylinder air-fuel ratio imbalance condition occurs when the unit air-fuel ratio change amount is greater than the judgment value $\Delta A/Fth$.

However, as shown in FIG. 14(A), the difference D1 between the unit air-fuel ratio change amount and the judgment value $\Delta A/Fth$ in the case where there is a malfunction in a certain fuel injector and the intake air amount is an extremely small amount Gas is small. Accordingly, when the judgment value is set to a relatively great value, there is a possibility that the unit air-fuel ratio change amount calculated during the engine operation in the case where the intake air amount is the extremely small amount Gas may be equal to or smaller than the judgment value, despite the fact that there is a malfunction in a certain fuel injector. Further, when the unit air-fuel ratio change amount smaller than the true value is calculated due to the disturbances, there is a possibility that the unit air-fuel ratio change amount calculated during the engine operation in the case where the intake air amount is the extremely small amount Gas may be equal to or smaller than the judgment value, despite the fact that there is a malfunction in a certain fuel injector. In both cases, it is judged that no inter-cylinder air-fuel ratio imbalance condition occurs and therefore the accuracy of the judgment of the occurrence of the inter-cylinder air-fuel ratio imbalance condition is not high.

Similarly, as shown in FIG. 14(A), the difference D2 between the unit air-fuel ratio change amount and the judgment value $\Delta A/Fth$ in the case where all fuel injectors are normal and the intake air amount is an extremely great amount Gag is also small. Accordingly, when the judgment value is set to a relatively small value, there is a possibility that the unit air-fuel ratio change amount calculated during the engine operation in the case where the intake air amount is the extremely great amount Gag may be greater than the judgment value, despite the fact that all fuel injectors are normal. Further, when the unit air-fuel ratio change amount greater than the true value is calculated due to the disturbances, there is a possibility that the unit air-fuel ratio change amount calculated during the engine operation in the case where the intake air amount is the extremely great amount Gag may be greater than the judgment value, despite the fact that all fuel injectors are normal. In both cases, it is judged that the inter-cylinder air-fuel ratio imbalance condition occurs and therefore the accuracy of the judgment of the occurrence of the inter-cylinder air-fuel ratio imbalance condition is not high.

Ax explained above, in order to accurately judge the occurrence of the inter-cylinder air-fuel ratio imbalance condition using the unit air-fuel ratio change amount calculated during the engine operation without consideration of the intake air amount, it is necessary to set the judgment value extremely carefully.

On the other hand, when the unit air-fuel ratio change amount calculated during the engine operation is corrected according to the above-expression 1, the relationship between the intake air amount and the corrected unit air-fuel ratio change amount in the case where all fuel injectors are normal is shown by the line Lnc in FIG. 14(B). That is, in this case, the unit air-fuel ratio change amount corresponding to the intake air amount smaller than the base intake air amount Gab is corrected by the above-mentioned expression 1 such that it becomes great. On the other hand, the unit air-fuel ratio change amount corresponding to the intake air amount greater than the base intake air amount Gab is corrected by the above-mentioned expression 1 such that it becomes small. As a result, the change amount of the unit air-fuel ratio change amount per unit intake air amount becomes small, in particular, in this case, becomes zero. Therefore, the slope of the line Lnc in FIG. 14(B) is smaller than that of the line Ln in FIG. 14(A).

On the other hand, when the unit air-fuel ratio change amount calculated during the engine operation is corrected according to the above-mentioned expression 1, the relationship between the intake air amount and the corrected unit air-fuel ratio change amount in the case where there is a malfunction in a certain fuel injector is shown by the line Lmc in FIG. 14(B). That is, in this case, the unit air-fuel ratio change amount corresponding to the intake air amount smaller than the base intake air amount Gab is corrected by the above-mentioned expression 1 such that it becomes great. On the other hand, the unit air-fuel ratio change amount corresponding to the intake air amount greater than the base intake air amount Gab is corrected by the above-mentioned expression 1 such that it becomes small. As a result, the change amount of the unit air-fuel ratio change amount per unit intake air amount becomes small. Therefore, the slope of the line Lmc in FIG. 14(B) is smaller than that of the line Lm in FIG. 14(A).

When the unit air-fuel ratio change amount is thus corrected by the above-mentioned expression 1, as shown in FIG. 14(B), the difference D3 between the corrected unit air-fuel ratio change amount and the judgment value $\Delta A/Fth$ in the case where there is a malfunction in a certain fuel injector and the intake air amount is the extremely small amount Gas is greater than the difference D1 shown in FIG. 14(A). Accordingly, even when the judgment value is set to a relatively great value, the possibility that the corrected unit air-fuel ratio change amount in the case where there is a malfunction in a certain fuel injector and the intake air amount is the extremely small amount Gas may be equal to or smaller than the judgment value is small. Further, even when the unit air-fuel ratio change amount smaller than the true value is calculated due to the disturbances, the possibility that the corrected unit air-fuel ratio change amount in the case where there is a malfunction in a certain fuel injector and the intake air amount is the extremely small amount Gas may be equal to or smaller than the judgment value is small.

In addition, when the judgment value is not set to an excessively great value, the possibility that the corrected unit air-fuel ratio change amount in the case where there is a malfunction in a certain fuel injector and the intake air amount is the extremely small amount Gas may be equal to or smaller than the judgment value is extremely small.

Similarly, as shown in FIG. 14(B), the difference D4 between the corrected unit air-fuel ratio change amount and the judgment value $\Delta A/Fth$ in the case where all fuel injectors are normal and the intake air amount is the extremely great amount Gag is greater than the difference D2 shown in FIG. 14(A). Accordingly, even when the judgment value is set to a relatively small value, the possibility that the corrected unit air-fuel ratio change amount in the case where all fuel injectors are normal and the intake air amount is the extremely great amount Gag may be greater than the judgment value is small. Further, even when the unit air-fuel ratio change amount greater than the true value is calculated due to the disturbances, the possibility that the corrected unit air-fuel ratio change amount in the case where all fuel injectors are normal and the intake air amount is the extremely great amount Gag may be greater than the judgment value is small.

In addition, when the judgment value is not set to an excessively small value, the possibility that the corrected unit air-fuel ratio change amount in the case where all fuel injectors are normal and the intake air amount is the extremely great amount Gag may be greater than the judgment value is extremely small.

As explained above, according to the inter-cylinder air-fuel ratio imbalance judgment of the first embodiment, as far as the judgment value is not set to an extremely great or small value and is set to an appropriate value, the corrected unit air-fuel ratio change amount calculated when there is a malfunction in a certain fuel injector is not equal to or smaller than the judgment value and the corrected unit air-fuel ratio change amount calculated when all fuel injectors are normal is not greater than the judgment value. Therefore, it can be accurately judged whether the inter-cylinder air-fuel ratio imbalance condition occurs.

In other words, in the case where the inter-cylinder air-fuel ratio imbalance judgment of the first embodiment is employed, even when the judgment value is set to a relatively great or small value, the possibility that the corrected unit air-fuel ratio change amount calculated during the engine operation when there is a malfunction in a certain fuel injector may be equal to or smaller than the judgment value is small and the possibility that the corrected unit air-fuel ratio change amount calculated during the engine operation when all fuel injectors are normal may be greater than the judgment value is small. Therefore, by employing the inter-cylinder air-fuel ratio imbalance judgment of the first embodiment, the great flexibility regarding the setting of the judgment value used for inter-cylinder air-fuel ratio imbalance judgment can be obtained.

Further, in the inter-cylinder air-fuel ratio imbalance judgment of the first embodiment, when the unit air-fuel ratio change amount is corrected according to the above-mentioned expression 1, the unit air-fuel ratio change amount is corrected to a great value as the intake air amount is smaller than the base intake air amount in the condition that the unit air-fuel ratio change amount when the intake air amount is the base intake amount is an upper limit and on the other hand, the unit air-fuel ratio change amount is corrected to a small value as the intake air amount is greater than the base intake air amount in the condition that the unit air-fuel ratio change amount when the intake air amount is the base intake air amount is a lower limit. Therefore, when any amount is selected for the base intake air amount, eventually, the unit air-fuel ratio change amount is corrected using the base intake air amount as a base and also the judgment value is set using the base intake air amount as a base and therefore it can be accurately judged whether the inter-cylinder air-fuel ratio imbalance condition occurs.

It should be noted that the judgment value used for the inter-cylinder air-fuel ratio imbalance judgment of the first embodiment is set to the unit air-fuel ratio change amount greater than the unit air-fuel ratio change amount in the case where all fuel injectors are normal and the intake air amount is the base intake air amount by a predetermined value. In this regard, it is preferred that the predetermined value is set such that the judgment value is greater than the unit air-fuel ratio change amount in the case where all fuel injectors are normal and the intake air amount is the minimum amount and is smaller than the unit air-fuel ratio change amount in the case where there is a malfunction in a certain fuel injector and the intake air amount is the maximum amount. However, if some decreasing of the accuracy of the inter-cylinder air-fuel ratio imbalance judgment can be accepted, in the inter-cylinder air-fuel ratio imbalance judgment of the first embodiment, the unit air-fuel ratio change amount in the case where all fuel injectors are normal and the intake air amount is the base intake air amount may be used as the judgment value.

Further, in the inter-cylinder air-fuel ratio imbalance judgment of the first embodiment, the unit air-fuel ratio change amount in the case where all fuel injectors are normal and the intake air amount is the base intake air amount is set for the setting of the judgment value. In this regard, it is preferred that the unit air-fuel ratio change amount used for the setting of the judgment value is the maximum amount among the unit air-fuel ratio change amounts in the case where all fuel injectors are normal and the intake air amount is the base intake air amount. However, the average value of the unit air-fuel ratio change amounts in the case where all fuel injector are normal and the intake air amount is the base intake air amount may be used for the setting of the judgment value.

Further, in the inter-cylinder air-fuel ratio imbalance judgment of the first embodiment, it is preferred that the unit air-fuel ratio change amount applied to the above-mentioned expression 1 is the average value of the unit air-fuel ratio change amounts calculated during a predetermined period. In this case, it is also preferred that the intake air amount applied to the above-mentioned expression 1 is the average value of the intake air amounts during the predetermined period.

However, the unit air-fuel ratio change amount applied to the above-mentioned expression 1 may be the maximum amount among the unit air-fuel ratio change amounts calculated during a predetermined period. In this case, the intake air amount applied to the above-mentioned expression 1 may be the intake air amount corresponding to the maximum unit air-fuel ratio change amount or the average of the intake air amounts during the predetermined period.

Further, the unit air-fuel ratio change amount applied to the above-mentioned expression 1 may be the absolute value of the positive change rate or the absolute value of the negative change rate among the change rates of the air-fuel ratios of the exhaust gases per unit time calculated on the basis of the output value of the upstream air-fuel ratio sensor.

Further, the unit air-fuel ratio change amount applied to the above-mentioned expression 1 may be the average value of the absolute values of the positive change rates or the average value of the absolute values of the negative change rates among the change rates of the air-fuel ratios of the exhaust gases per unit time calculated during a predetermined period on the basis of the output value of the upstream air-fuel ratio sensor. In both cases, it is preferred that the intake air amount applied to the above-mentioned expression 1 is the average value of the intake air amounts during the predetermined period.

Further, the unit air-fuel ratio change amount applied to the above-mentioned expression 1 may be the maximum value among the absolute values of the positive change rates or the absolute values of the negative change rates among the change rages of the air-fuel ratios of the exhaust gases per unit time calculated during a predetermined period on the basis of the output value of the upstream air-fuel ratio sensor. In both cases, the intake air amount applied to the above-mentioned expression 1 may be the intake air amount corresponding to the maximum value or the average value of the intake air amounts during the predetermined period.

Further, the unit air-fuel ratio change amount applied to the above-mentioned expression 1 may be the greater value of the maximum value among the absolute values of the positive change rates and the maximum value among the absolute values of the negative change rates among the change rates of the air-fuel ratios of the exhaust gases per unit time calculated during a predetermined period on the basis of the output value of the upstream air-fuel ratio sensor. In this case, the intake air amount applied to the above-mentioned expression 1 may be the intake air amount corresponding to the greater maximum value or the average value of the intake air amounts during the predetermined period.

Further, the unit air-fuel ratio change amount applied to the above-mentioned expression 1 may be the greater value of the average value of the absolute values of the positive change rates and the average value of the absolute values of the negative change rates among the change rates of the air-fuel ratios of the exhaust gases per unit time calculated during a predetermined period on the basis of the output value of the upstream air-fuel ratio sensor. In this case, it is preferred that the intake air amount applied to the above-mentioned expression 1 is the average value of the intake air amounts during the predetermined period.

Further, when the intake air amount is extremely small or great, the unit air-fuel ratio change amount calculated during the engine operation may not be the amount corresponding to the difference in the air-fuel ratio between the mixtures formed in the combustion chambers. Therefore, in the first embodiment, it is preferred that the inter-cylinder air-fuel ratio imbalance judgment is performed only when the intake air amount is within a predetermined range. According to this, the result of the judgment of the occurrence of the inter-cylinder air-fuel ratio imbalance condition is reliable.

Further, in the inter-cylinder air-fuel ratio imbalance judgment of the first embodiment, the unit air-fuel ratio change amount calculated during the engine operation is calculated on the basis of the output value of the upstream air-fuel ratio sensor. In this regard, the output value of the upstream air-fuel ratio sensor corresponds to the air-fuel ratio of the exhaust gas contacting to the air-fuel ratio detecting element of the upstream air-fuel ratio sensor. Therefore, the unit air-fuel ratio change amount calculated during the engine operation is a change amount of the output value of the upstream air-fuel ratio sensor per unit time. In other words, in the first embodiment, the judgment of the inter-cylinder air-fuel ratio imbalance condition using the unit air-fuel ratio change amount calculated on the basis of the output value of the upstream air-fuel ratio sensor corresponds to that using the change amount of the output value of the upstream air-fuel ratio sensor per unit time.

Further the judgment value used for the inter-cylinder air-fuel ratio imbalance judgment of the first embodiment is set to the unit air-fuel ratio change amount greater than that in the case where all fuel injectors are normal and the intake air amount is the base intake air amount by the predetermined value. In this regard, the fact that the difference in the air-fuel ratio between the mixtures formed in the combustion chambers is equal to or smaller than the allowed air-fuel ratio difference means that all fuel injectors are normal. Therefore, the judgment value used for inter-cylinder air-fuel ratio imbalance judgment of the first embodiment is the unit air-fuel ratio change amount greater than that in the case where the difference in the air-fuel ratio between the mixtures formed in the combustion chambers is equal to or smaller than the allowed air-fuel ratio difference by a predetermined value.

Further, as explained above, according to the inter-cylinder air-fuel ratio imbalance judgment of the first embodiment, even when any intake air amount is employed as the base intake air amount, it can be accurately judged whether the inter-cylinder air-fuel ratio imbalance condition occurs. Therefore, in the first embodiment, it can be said that the base intake air amount is a certain specific intake air amount.

Further, in the first embodiment, in the case where there is a malfunction in a certain fuel injector, the difference in the air-fuel ratio between the mixtures formed in the combustion chambers is greater than the predetermined allowed air-fuel ratio difference and on the other hand, in the case where all fuel injectors are normal, the difference in the air-fuel ratio between the mixtures formed in the combustion chambers is equal to or smaller than the allowed air-fuel ratio difference. Therefore, the fact that the difference in the air-fuel ratio between the mixtures formed in the combustion chambers is greater than the allowed air-fuel ratio difference means that there is a malfunction in a certain fuel injector and therefore the inter-cylinder air-fuel ratio imbalance condition occurs and on the other hand, the fact that the difference in the air-fuel ratio between the mixtures formed in the combustion chambers is equal to or smaller than the allowed air-fuel ratio difference means that all fuel injectors are normal and therefore no inter-cylinder air-fuel ratio imbalance condition occurs.

Figure 15:
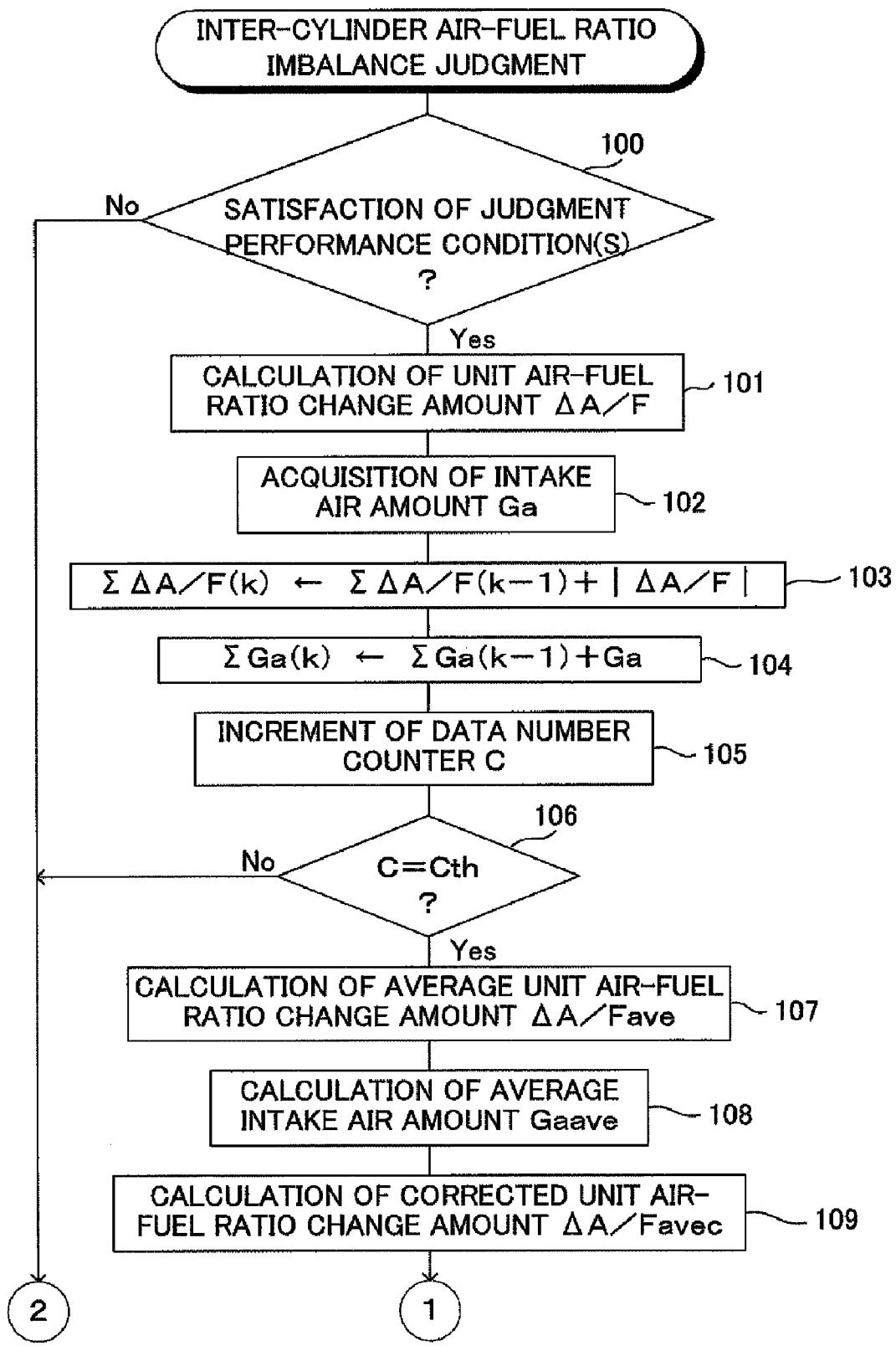
FIGS. 15 and 16 are views showing an example of a flowchart for performing an inter-cylinder air-fuel ratio imbalance judgment according to the first embodiment.
Figure 16:
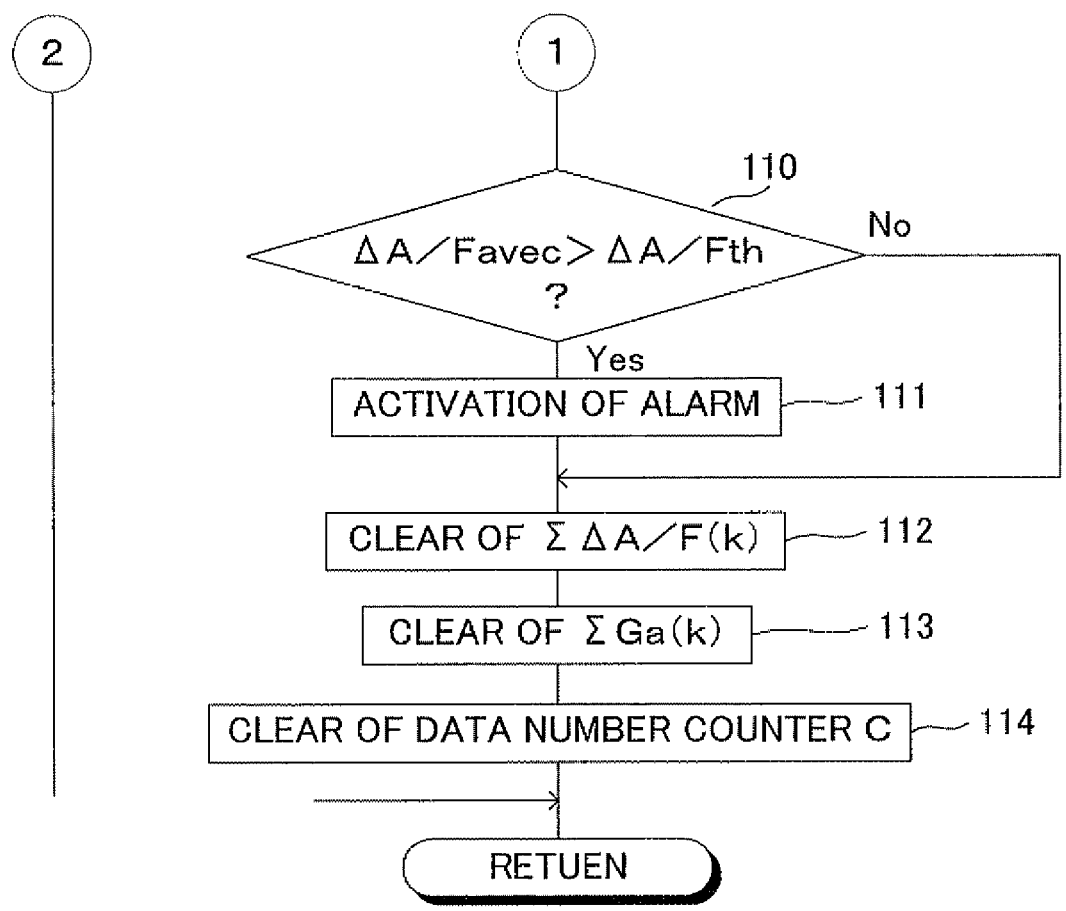

It should be noted that the inter-cylinder air-fuel ratio imbalance judgment of the first embodiment is performed, for example, according to a flowchart shown in FIGS. 15 and 16. Next, this flowchart will be explained.

When the routine of FIG. 15 starts, first, at the step 100, it is judged whether the condition(s) for allowing the performance of the inter-cylinder air-fuel ratio imbalance judgment is/are satisfied, for example, it is judged whether the intake air amount is within a predetermined range. When it is judged that the condition(s) for allowing the performance of the inter-cylinder air-fuel ratio imbalance judgment is/are not satisfied, the routine is directly terminated. On the other hand, the condition(s) for allowing the performance of the inter-cylinder air-fuel ratio imbalance judgment is/are satisfied, the routine proceeds to the step 101 and the steps following the step 101.

When at the step 100, it is judged that the condition(s) for allowing the performance of the inter-cylinder air-fuel ratio imbalance judgment is/are satisfied, and then the routine proceeds to the step 101, the unit air-fuel ratio change amount $\Delta A/F$ is calculated on the basis of the output value of the upstream air-fuel ratio sensor 55. Next, at the step 102, the present intake air amount Ga is acquired from the air flow meter 51. Next, at the step 103, an integration value $\Sigma\Delta A/F(k)$ of the unit air-fuel ratio change amounts at this performance of the routine of FIG. 15 is calculated (i.e. the integration value of the unit air-fuel ratio change amounts is updated) by adding the absolute value $|\Delta A/F|$ of the unit air-fuel ratio change amount calculated at the step 101 to the integration value $\Sigma\Delta A/F(k-1)$ of the unit air-fuel ratio change amounts calculated at the step 103 at the last performance of the routine of FIG. 15. Next, at the step 104, an integration value $\Sigma Ga(k)$ of the intake air amounts at this performance of the routine of FIG. 15 is calculated (i.e. the integration value of the intake air amounts is updated) by adding the intake air amount Ga acquired at the step 102 to the integration value $\Sigma Ga(k-1)$ of the intake air amounts calculated at the step 104 at the last performance of the routine of FIG. 15. Next, at the step 105, a data number counter C is incremented, which data number counter C indicates the number of the absolute values $|\Delta A/F|$ of the unit air-fuel ratio change amounts added to the integration value $\Sigma\Delta A/F$ of the unit air-fuel ratio change amounts calculated at the step 103. As is obvious, the data number counter C also indicates the number of the intake air amounts added to the integration value ΣGa of the intake air amounts calculated at the step 104.

Next, at the step 106, it is judged whether the data number counter C incremented at the step 105 reaches a predetermined value Cth (C=Cth). When it is judged that C≠Cth, the routine is directly terminated. On the other hand, when it is judged that C=Cth, the routine proceeds to the step 107 and the steps following the step 107.

When at the step 106, it is judged that C=Cth and then the routine proceeds to the step 107, the average value ΔA/Fave of the unit air-fuel ratio change amounts is calculated by dividing the integration value ΣΔ/AF of the unit air-fuel ratio change amounts calculated at the step 103 by the data number counter C incremented at the step 105. Next, at the step 108, the average value Gaave of the intake air amounts is calculated by dividing the integration value ΣGa of the intake air amounts calculated at the step 104 by the data number counter C incremented at the step 105. Next, at the step 109, the average value of the unit air-fuel ratio change amounts is corrected by applying the average value ΔA/Fave of the unit air-fuel ratio change amounts calculated at the step 107, the base intake air amount Gab and the average value Gaave of the intake air amounts calculated at the step 108 to the following expression 2 (this is the same as the above-mentioned expression 1) and thereby the corrected unit air-fuel ratio change amount ΔA/Favec is calculated.

$$\Delta A/Favec = \Delta A/Fave + K*(Gab - Gaave) \quad (2)$$

Next, at the step 110 shown in FIG. 16, it is judged whether the corrected unit air-fuel ratio change amount ΔA/Favec calculated at the step 109 shown in FIG. 15 is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 111 and an alarm is activated for informing that the inter-cylinder air-fuel ratio imbalance condition occurs, and then the routine proceeds to the step 112. On the other hand, when it is judged that ΔA/Favec≦ΔA/Fth, i.e. it is judged that no inter-cylinder air-fuel ratio imbalance condition occurs, the routine proceeds directly to the step 112.

When at the step 111, the alarm is activated after it is judged that ΔA/Favec≦ΔA/Fth at the step 110 and then the routine proceeds to the step 112 or when at the step 110, it is judged that ΔA/Favec≦ΔA/Fth and then the routine proceeds to the step 112, the integration value ΣΔA/F of the unit air-fuel ratio change amounts calculated at the step 103 shown in FIG. 15 is cleared. Next, at the step 113, the integration value ΣGa of the intake air amounts calculated at the step 104 is cleared. Next, at the step 114, the data number counter C incremented at the step 105 is cleared and then the routine is terminated.

Next, the inter-cylinder air-fuel ratio imbalance judgment of the second embodiment will be explained. Also, in the inter-cylinder air-fuel ratio imbalance judgment of the second embodiment, similar to that of the first embodiment, a relational expression between the unit air-fuel ratio change amount and the intake air amount in the case where all fuel injector are normal is previously obtained by experiments, etc. and the obtained relational expression is stored in the electronic control unit 60. In this regard, assuming that the unit air-fuel ratio change amount is indicated by "ΔA/F" and the intake air amount is indicated by "Ga", the relational expression is described by the following expression 3.

$$\Delta A/Fb = a*Ga + b \quad (3)$$

In the above expression 3, "a" is the slope and "b" is the intercept. Further, the intake air amount used for a base for judging whether inter-cylinder air-fuel ratio imbalance condition occurs is selected and the selected intake air amount is stored as a base intake air amount in the electronic control unit 60. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

Further, the unit air-fuel ratio change amount is calculated on the basis of the output value of the upstream air-fuel ratio sensor 55 during the engine operation and the calculated unit air-fuel ratio change amount is corrected according to the following expression 4.

$$\Delta A/Favec = \Delta A/Fave*(\Delta A/Fb/\Delta A/Fa) \quad (4)$$

In the above expression 4, "ΔA/Favec" is the unit air-fuel ratio change amount after being corrected (i.e. the corrected unit air-fuel ratio change amount), "ΔA/Fave" is the unit air-fuel ratio change amount calculated during the engine operation, "ΔA/Fb" is the unit air-fuel ratio change amount (hereinafter, this unit air-fuel ratio change amount will be referred to as "base unit air-fuel ratio change amount") calculated by applying the base intake air amount to the above-mentioned expression 3 and "ΔA/Fa" is the unit air-fuel ratio change amount (hereinafter, this unit air-fuel ratio change amount will be referred to as "the provisional unit air-fuel ratio change amount") calculated by applying the intake air amount at the time of the calculation of the unit air-fuel ratio change amount to the above-mentioned expression 3.

Further, the thus calculated corrected unit air-fuel ratio change amount ΔA/Favec is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the second embodiment, as is obvious from the above-mentioned expression 4 for correcting the unit air-fuel ratio change amount calculated during the engine operation, in the case where all fuel injectors are normal, the unit air-fuel ratio change amount calculated during the engine operation is corrected by the ratio ΔA/Fb/ΔA/Fa of the unit air-fuel ratio change amount ΔA/Fb corresponding to the base intake air amount relative to the unit air-fuel ratio change amount corresponding to the intake air amount at the time of the calculation of the unit air-fuel ratio change amount.

According to this, as the intake air amount at the time of the calculation of the unit air-fuel ratio change amount is smaller than the base intake air amount, the unit air-fuel ratio change amount calculated during the engine operation is corrected to the great value. Further, when the unit air-fuel ratio change amount calculated during the engine operation is thus corrected, as explained in relation to the inter-cylinder air-fuel ratio imbalance judgment of the first embodiment, referring to FIG. 14(B), in the case where there is a malfunction in a certain fuel injector and the intake air amount is extremely small, the difference between the corrected unit air-fuel ratio change amount and the judgment value is greater than that between the uncorrected unit air-fuel ratio change amount and the judgment value. Therefore, even when the judgment value is set to a relatively great value, in the case where there is a malfunction in a certain fuel injector and the intake air amount is extremely small, the possibility that the corrected unit air-fuel ratio change amount is equal to or smaller than the judgment value is small. Further, even when the unit air-fuel ratio change amount smaller than the true value is calculated due to the disturbances, in the case where there is a malfunction in a certain fuel injector and the intake air amount is extremely small, the possibility that the corrected unit air-fuel ratio change amount is equal to or smaller than the judgment value is small.

Further, when the judgment value is not set to an excessively great value, in the case where there is a malfunction in a certain fuel injector and the intake air amount is extremely small, the possibility that the corrected unit air-fuel ratio change amount is equal to or smaller than the judgment value is extremely small.

On the other hand, in the inter-cylinder air-fuel ratio imbalance judgment of the second embodiment, as the intake air amount at the time of the calculation of the unit air-fuel ratio change amount is greater than the base intake air amount, the unit air-fuel ratio change amount calculated during the engine operation is corrected to the small value. Further, when the unit air-fuel ratio change amount calculated during the engine operation is thus corrected, as explained in relation to the inter-cylinder air-fuel ratio imbalance judgment of the first embodiment, referring to FIG. 14(B), in the case where all fuel injectors are normal and the intake air amount is extremely great, the difference between the corrected unit air-fuel ratio change amount and the judgment value is greater than that between the uncorrected unit air-fuel ratio change amount and the judgment value. Therefore, even when the judgment value is set to a relatively small value, in the case where all fuel injectors are normal and the intake air amount is extremely great, the possibility that the corrected unit air-fuel ratio change amount is greater than the judgment value is small. Further, even when the unit air-fuel ratio change amount greater than the true value is calculated due to the disturbances, in the case where all fuel injectors are normal and the intake air amount is extremely great, the possibility that the corrected unit air-fuel ratio change amount is greater than the judgment value is small.

Further, when the judgment value is not set to an excessively small value, in the case where all fuel injectors are normal and the intake air amount is extremely great, the possibility that the corrected unit air-fuel ratio change amount is greater than the judgment value is extremely small.

As explained above, according to the inter-cylinder air-fuel ratio imbalance judgment of the second embodiment, as far as the judgment value is not set to an extremely great or small value and is set to an appropriate value, the corrected unit air-fuel ratio change amount calculated when there is a malfunction in a certain fuel injector is not equal to or smaller than the judgment value and the corrected unit air-fuel ratio change amount calculated when all fuel injectors are normal is not greater than the judgment value. Therefore, it can be accurately judged whether the inter-cylinder air-fuel ratio imbalance condition occurs.

Further, in the case where the inter-cylinder air-fuel ratio imbalance judgment of the second embodiment is employed, even when the judgment value is set to a relatively great or small value, the possibility that the corrected unit air-fuel ratio change amount calculated when there is a malfunction in a certain fuel injector may be equal to or smaller than the judgment value is small and the possibility that the corrected unit air-fuel ratio change amount calculated when all fuel injectors are normal may be greater than the judgment value is small. Therefore, by employing the inter-cylinder air-fuel ratio imbalance judgment of the second embodiment, the great flexibility regarding the setting of the judgment value used for inter-cylinder air-fuel ratio imbalance judgment can be obtained.

Further, in the inter-cylinder air-fuel ratio imbalance judgment of the second embodiment, when the unit air-fuel ratio change amount is corrected according to the above-mentioned expression 4, the unit air-fuel ratio change amount is corrected to a great value as the intake air amount is smaller than the base intake air amount in the condition that the unit air-fuel ratio change amount when the intake air amount is the base intake amount is an upper limit and on the other hand, the unit air-fuel ratio change amount is corrected to a small value as the intake air amount is greater than the base intake air amount in the condition that the unit air-fuel ratio change amount when the intake air amount is the base intake air amount is a lower limit. Therefore, when any amount is selected for the base intake air amount, eventually, the unit air-fuel ratio change amount is corrected using the base intake air amount as a base and also the judgment value is set using the base intake air amount as a base and therefore it can be accurately judged whether the inter-cylinder air-fuel ratio imbalance condition occurs.

It should be noted that the judgment value used for inter-cylinder air-fuel ratio imbalance judgment of the second embodiment is set similarly to that used for inter-cylinder air-fuel ratio imbalance judgment of the first embodiment.

Further, in the inter-cylinder air-fuel ratio imbalance judgment of the second embodiment, the unit air-fuel ratio change amount applied to the above-mentioned expression 4 is calculated similarly to that applied to the above-mentioned expression 1 in the inter-cylinder air-fuel ratio imbalance judgment of the first embodiment. Further, in the inter-cylinder air-fuel ratio imbalance judgment of the second embodiment, the intake air amount at the time of the calculation of the unit air-fuel ratio change amount applied to the above-mentioned expression 3 is calculated similarly to that applied to the above-mentioned expression 1 in the inter-cylinder air-fuel ratio imbalance judgment of the first embodiment.

Further, also in the second embodiment, similar to the first embodiment, it is preferred that the inter-cylinder air-fuel ratio imbalance judgment is performed only when the intake air amount is within a predetermined range. According to this, the result of the judgment of the occurrence of the inter-cylinder air-fuel ratio imbalance condition is reliable.

Further, in the inter-cylinder air-fuel ratio imbalance judgment of the second embodiment, the unit air-fuel ratio change amount calculated during the engine operation is calculated on the basis of the output value of the upstream air-fuel ratio sensor. In this regard, the output value of the upstream air-fuel ratio sensor corresponds to the air-fuel ratio of the exhaust gas contacting to the air-fuel ratio detecting element of the upstream air-fuel ratio sensor. Therefore, the unit air-fuel ratio change amount calculated during the engine operation is a change amount of the output value of the upstream air-fuel ratio sensor per unit time. In other words, in the second embodiment, the judgment of the inter-cylinder air-fuel ratio imbalance condition using the unit air-fuel ratio change amount calculated on the basis of the output value of the upstream air-fuel ratio sensor corresponds to that using the change amount of the output value of the upstream air-fuel ratio sensor per unit time.

Further, the unit air-fuel ratio change amount calculated during the engine operation in the inter-cylinder air-fuel ratio imbalance judgment of the second embodiment is also calculated on the basis of the output value of the upstream air-fuel ratio sensor, similar to the unit air-fuel ratio change amount calculated during the engine operation in the inter-cylinder air-fuel ratio imbalance judgment of the first embodiment. Therefore, also in the second embodiment, the judgment of the inter-cylinder air-fuel ratio imbalance condition using the unit air-fuel ratio change amount calculated on the basis of the output value of the upstream air-fuel ratio sensor corresponds to that using the change amount of the output value of the upstream air-fuel ratio sensor per unit time.

Further, as explained above, according to the inter-cylinder air-fuel ratio imbalance judgment of the second embodiment, even when any value is employed as the base intake air amount, it can be accurately judged whether the inter-cylinder air-fuel ratio imbalance condition occurs. Therefore, in the second embodiment, it can be said that the base intake air amount is a certain specific intake air amount.

Further, in the second embodiment, in the case where there is a malfunction in a certain fuel injector, the difference in the air-fuel ratio between the mixtures formed in the combustion chambers is greater than a predetermined allowed air-fuel ratio difference and on the other hand, in the case where all fuel injectors are normal, the difference in the air-fuel ratio between the mixtures formed in the combustion chambers is equal to or smaller than the allowed air-fuel ratio difference. Therefore, the difference in the air-fuel ratio between the mixtures formed in the combustion chambers greater than the allowed air-fuel ratio difference means that there is a malfunction in a certain fuel injector and the inter-cylinder air-fuel ratio imbalance condition occurs and on the other hand, the difference in the air-fuel ratio between the mixtures formed in the combustion chambers equal to or smaller than the allowed air-fuel ratio difference means that all fuel injectors are normal and no inter-cylinder air-fuel ratio imbalance condition occurs.

Figure 17:
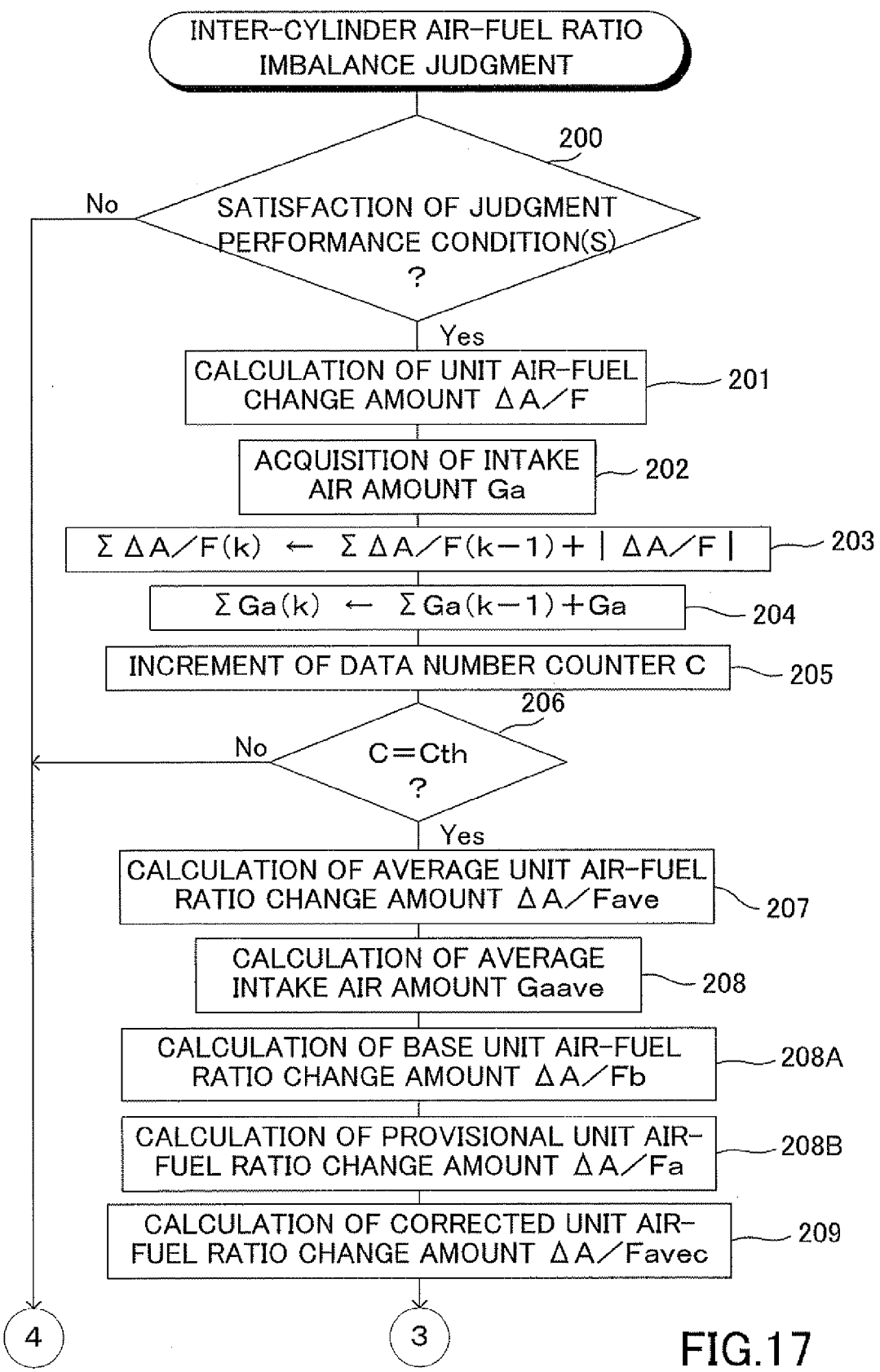
FIGS. 17 and 18 are views showing an example of a flowchart for performing an inter-cylinder air-fuel ratio imbalance judgment according to the second embodiment.
Figure 18:
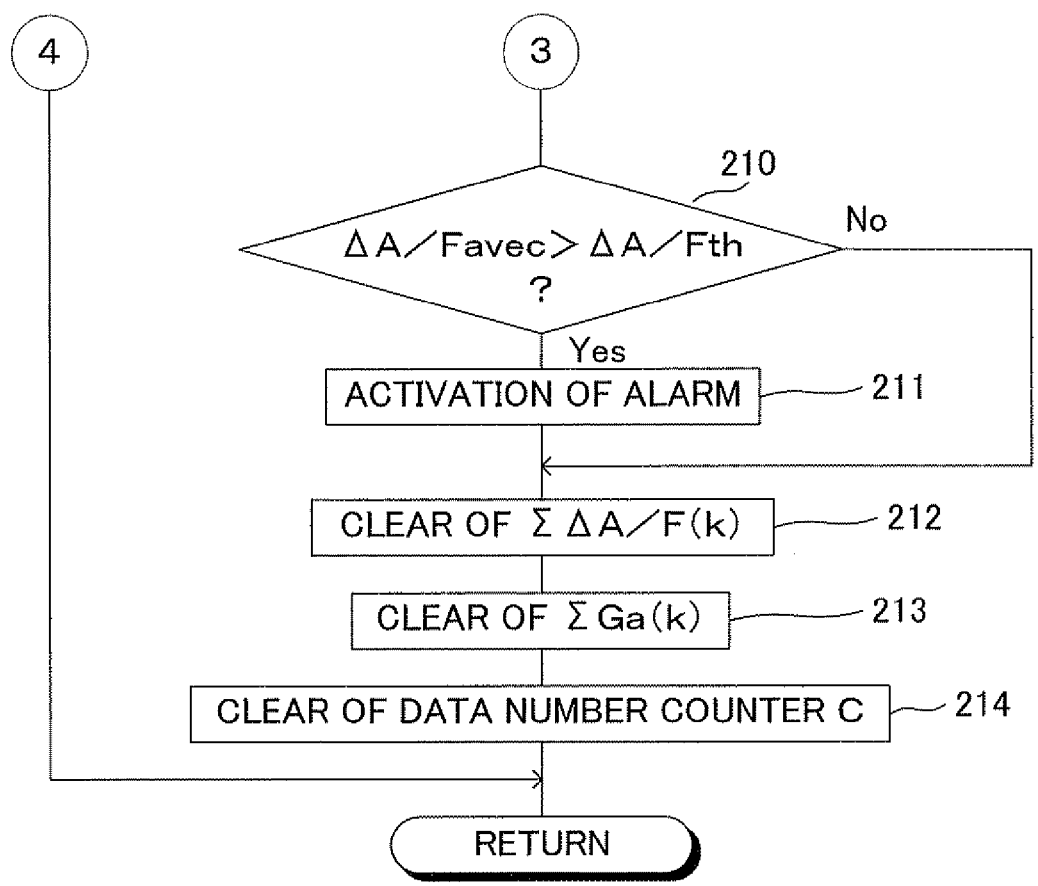

It should be noted that the inter-cylinder air-fuel ratio imbalance judgment of the second embodiment is performed, for example, according to a flowchart shown in FIGS. 17 and 18. Next, this flowchart will be explained. It should be noted that the steps 200 to 206 shown in FIG. 17 are the same as the steps 100 to 106 shown in FIG. 15, respectively and therefore the explanations thereof will be omitted. Further, the steps 212 to 214 shown in FIG. 18 are the same as the steps 112 to 114 shown in FIG. 16, respectively and therefore the explanations thereof will be omitted.

When at the step 206 shown in FIG. 17, it is judged that C=Cth and then the routine proceeds to the step 207, the average value ΔA/Fave of the unit air-fuel ratio change amounts is calculated by dividing the integration value ΣA/F of the unit air-fuel ratio change amounts calculated at the step 203 by the data number counter C incremented at the step 205. Next, at the step 208, the average value Gaave of the intake air amounts is calculated by dividing the integration value ΣGa of the intake air amounts calculated at the step 204 by the data number counter C incremented at the step 205. Next, at the step 208A, the base unit air-fuel ratio change amount ΔA/Fb is calculated by applying the base intake air amount Gab to "Ga" of the following expression 5 (this is the same as the above-mentioned expression 3).

$$\Delta A/Fb = a*Ga + b \quad (5)$$

Next, at the step 208B, the provisional unit air-fuel ratio change amount ΔA/Fa is calculated by applying the average value Gaave of the intake air amounts calculated at the step 208 to "Ga" of the above-mentioned expression 5.

Next, at the step 209, the average value of the unit air-fuel ratio change amounts is corrected by applying the average value ΔA/Fave of the unit air-fuel ratio change amounts calculated at the step 208, the base unit air-fuel ratio change amount ΔA/Fb calculated at the step 208A and the provisional unit air-fuel ratio change amount ΔA/Fa calculated at the step 208B to the following expression 6 (this is the same as the above-mentioned expression 4) and thereby the corrected unit air-fuel ratio change amount ΔA/Favec is calculated.

$$\Delta A/Favec = \Delta A/Fave*(\Delta A/Fb/\Delta A/Fa) \quad (6)$$

Next, at the step 210 shown in FIG. 18, it is judged whether the corrected unit air-fuel ratio change amount. ΔA/Favec calculated at the step 209 shown in FIG. 17 is greater than a judgment value ΔA/Fth (ΔA/Favec>ΔA/Fth). When it is judged that ΔA/Favec>ΔA/Fth, i.e., it is judged that the inter-cylinder air-fuel ratio imbalance condition occurs, the routine proceeds to the step 211 and the alarm is activated for informing that the inter-cylinder air-fuel ratio imbalance condition occurs, and then the routine proceeds to the step 212. On the other hand, when it is judged that ΔA/Favec≦ΔA/Fth, i.e. it is judged that no inter-cylinder air-fuel ratio imbalance condition occurs, the routine proceeds directly to the step 212.

In the inter-cylinder air-fuel ratio imbalance judgment of the first embodiment, the correction coefficient obtained by experiments, etc. is used as the correction coefficient used for correcting the unit air-fuel ratio change amount calculated during the engine operation. However, instead of this, as the correction coefficient used for correcting the unit air-fuel ratio change amount calculated during the engine operation, a correction coefficient calculated on the basis of the unit air-fuel ratio change amount calculated during the engine operation and the intake air amount at the time of the calculation of the unit air-fuel ratio change amount may be used. Next, this embodiment (hereinafter, referred to as "third embodiment") of the inter-cylinder air-fuel ratio imbalance judgment will be explained.

In the third embodiment, the intake air amount used for a base for judging whether inter-cylinder air-fuel ratio imbalance condition occurs is selected and the selected intake air amount is stored as a base intake air amount in the electronic control unit 60. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

On the other hand, the unit air-fuel ratio change amount is integrated every the unit air-fuel ratio change amount is calculated during the engine operation and the integration value (hereinafter, this integration value will be referred to as "unit air-fuel ratio change amount integration value") is stored in the electronic control unit 60. Further, the intake air amount at the time of the calculation of the unit air-fuel ratio change amount is integrated every the unit air-fuel ratio change amount is calculated and the integration value (hereinafter, this integration value will be referred to as "intake air amount integration value") is stored in the electronic control unit. Further, the square value of the intake air amount at the time of the calculation of the unit air-fuel ratio change amount is integrated every the unit air-fuel ratio change amount is calculated and the integration value (hereinafter, this integration value will be referred to as "square intake air amount integration value") is stored in the electronic control unit. Further, the product of the unit air-fuel ratio change amount and the intake air amount at the time of the calculation of the unit air-fuel ratio change amount is integrated every the unit air-fuel ratio change amount is calculated and the integration value (hereinafter, this integration value will be referred to as "unit air-fuel ratio change amount/intake air amount integration value") is stored in the electronic control unit.

Further, when the data number in each integration value stored in the electronic control unit (as is obvious, the data numbers in the integration values are the same as each other) reaches a predetermined number, respectively, a correction coefficient (hereinafter, this correction coefficient will be referred to as "variable correction coefficient") is calculated according to the following expression 7 and the calculated variable correction coefficient is used as the correction coefficient for correcting the unit air-fuel ratio change amount (the details of this usage will be explained later).

$$K=(\Sigma(\Delta A/F*Ga)*N-\Sigma Ga*\Sigma \Delta A/F)/(\Sigma(Ga*Ga)*N-\Sigma Ga*\Sigma Ga) \quad (7)$$

In the above expression 7, "K" is the variable correction coefficient, "$\Sigma(\Delta A/F*Ga)$" is the unit air-fuel ratio change amount/intake air amount integration value, "$\Sigma Ga$" is the intake air amount integration value, "$\Delta A/F$" is the unit air-fuel ratio change amount integration value, "$\Sigma(Ga*Ga)$" is the square intake air amount integration value and "N" is the data number of each integration value (as is obvious, the data numbers of the integration values are the same as each other).

Further, once the variable correction coefficient K is calculated, the unit air-fuel ratio change amount calculated on the basis of the output value of the upstream air-fuel ratio sensor 55 during the engine operation is corrected according to the following expression 8.

$$\Delta A/Favec=\Delta A/Fave+K*(Gab-Gaave) \quad (8)$$

In the above expression 8, "$\Delta A/Favec$" is the unit air-fuel ratio change amount after being corrected (i.e. the corrected unit air-fuel ratio change amount), "$\Delta A/Fave$" is the unit air-fuel ratio change amount calculated during the engine operation, "K" is the variable correction coefficient calculated by the above-mentioned expression 7, "Gab" is the base intake air amount and "Gaave" is the intake air amount at the time of the calculation of the unit air-fuel ratio change amount.

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the third embodiment, the unit air-fuel ratio change amount calculated during the engine operation is converted to the unit air-fuel ratio change amount in the case where the intake air amount is equal to the base intake air amount and the converted unit air-fuel ratio change amount (i.e. the corrected unit air-fuel ratio change amount) is compared with the judgment value set to a value greater than the unit air-fuel ratio change amount in the case where the intake air amount is equal to the base intake air amount and all fuel injectors are normal by a predetermined value. In this regard, the inter-cylinder air-fuel ratio imbalance judgment of the third embodiment is similar to that of the first embodiment. Therefore, according to the third embodiment, the effects similar to those obtained by the inter-cylinder air-fuel ratio imbalance judgment of the first embodiment can be obtained.

Further, in the case where the correction coefficient used for correcting the unit air-fuel ratio change amount calculated during the engine operation is previously obtained by experiments, etc., the huge number of the data of the combination of the intake air amount and the unit air-fuel ratio change amount is necessary. However, according to the inter-cylinder air-fuel ratio imbalance judgment of the third embodiment, the correction coefficient used for correcting the unit air-fuel ratio change amount calculated during the engine operation is calculated on the basis of the unit air-fuel ratio change amount calculated during the engine operation and the intake air amount at the time of the calculation of the unit air-fuel ratio change amount and therefore it is unnecessary to previously obtain the correction coefficient by experiments, etc.

Further, in the case where the correction coefficient used for correcting the unit air-fuel ratio change amount calculated during the engine operation is previously obtained by experiments, etc., generally, experiments are performed in a typical internal combustion engine and the correction coefficient is obtained. However, the properties of the internal combustion engines are different from each other, depending on the individual internal combustion engine and therefore the correction coefficient obtained by the experiments regarding a typical internal combustion engine may be inappropriate as the correction coefficient used for the inter-cylinder air-fuel ratio imbalance judgment for the individual internal combustion engine. However, according to the inter-cylinder air-fuel ratio imbalance judgment of the third embodiment, the correction coefficient used for correcting the unit air-fuel ratio change amount calculated during the engine operation is calculated on the basis of the unit air-fuel ratio change amount calculated during the individual internal combustion engine and the intake air amount at the time of the calculation of the unit air-fuel ratio change amount and therefore the calculated correction coefficient is appropriate as the correction coefficient used for the inter-cylinder air-fuel ratio imbalance judgment for individual internal combustion engine.

Figure 19:
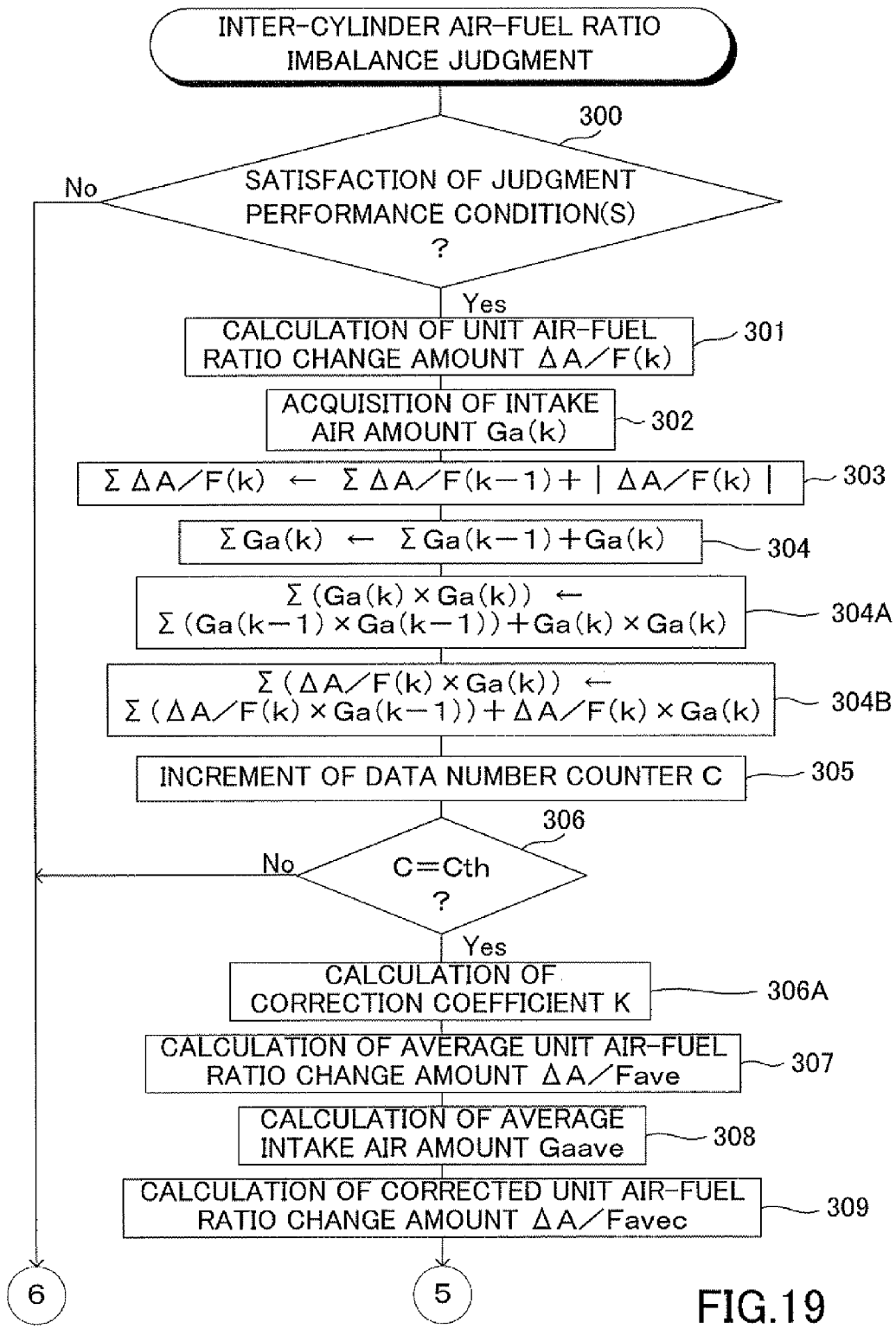
FIGS. 19 and 20 are views showing an example of a flowchart for performing an inter-cylinder air-fuel ratio imbalance judgment according to the third embodiment.
Figure 20:
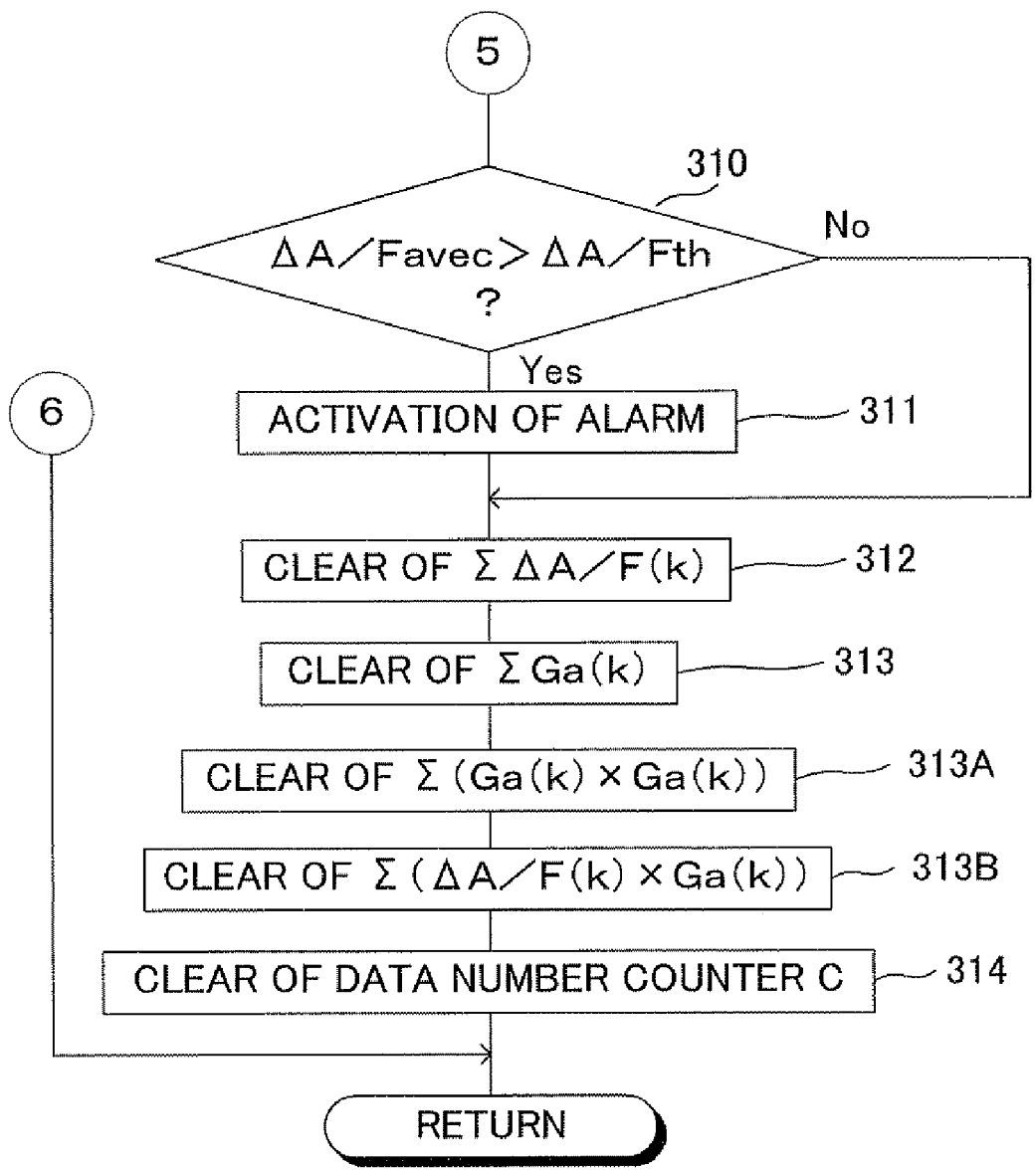

It should be noted that the inter-cylinder air-fuel ratio imbalance judgment of the third embodiment is performed, for example, according to a flowchart shown in FIGS. 19 and 20. Next, this flowchart will be explained.

When the routine of FIG. 19 starts, first, at the step 300, it is judged whether the condition(s) for allowing the performance of the inter-cylinder air-fuel ratio imbalance judgment is/are satisfied, for example, it is judged whether the intake air amount is within the predetermined range. When it is judged that the condition(s) for allowing the performance of the inter-cylinder air-fuel ratio imbalance judgment is/are not satisfied, the routine is directly terminated. On the other hand, when it is judged that the condition(s) for allowing the performance of the inter-cylinder air-fuel ratio imbalance judgment is/are satisfied, the routine proceeds to the step 301 and the steps following the step 301.

When at the step 300, it is judged that the condition(s) for allowing the performance of the inter-cylinder air-fuel ratio imbalance judgment is/are satisfied and then the routine proceeds to the step 301, the unit air-fuel ratio change amount. $\Delta A/F(k)$ is calculated on the basis of the output value of the upstream air-fuel sensor 55. Next, at the step 302, the present intake air amount $Ga(k)$ is acquired from the air flow meter 51. Next, at the step 303, the integration value $\Sigma A/F(k)$ of the unit air-fuel ratio change amounts at this performance of the routine of FIG. 19 is calculated (i.e. the integration value of the unit air-fuel ratio change amounts is updated) by adding the absolute value $|\Delta A/F(k)|$ of the unit air-fuel ratio change amount calculated at the step 301 to the integration value $\Sigma\Delta A/F(k-1)$ of the unit air-fuel ration change amounts calculated at the step 303 at the last performance of the routine of FIG. 19. Next, at the step 304, the integration value $\Sigma Ga(k)$ of the intake air amounts at this performance of the routine of FIG. 19 is calculated (i.e. the integration value of the intake air amounts is updated) by adding the intake air amount Ga(k) acquired at the step 302 to the integration value ΣGa(k−1) of the intake air amounts calculated at the step 304 at the last performance of the routine of FIG. 19. Next, at the step 304A, the square intake air amount integration value Σ(Ga(k)*Ga(k)) at this performance of the routine of FIG. 19 is calculated (i.e. the square intake air amount integration value is updated) by adding the square value Ga(k)*Ga(k) of the intake air amount Ga(k) acquired at the step 302 to the square intake air amount integration value Σ(Ga(k−1)*Ga(k−1)) calculated at the step 304A at the last performance of the routine of FIG. 19. Next, at the step 304B, the unit air-fuel ratio change amount/intake air amount integration value Σ(ΔA/F(k)*Ga(k)) at this performance of the routine of FIG. 19 is calculated (i.e. the unit air-fuel ratio change amount/intake air amount integration value is updated) by adding the product ΔA/F(k)*Ga(k) of the unit air-fuel ratio change amount ΔA/F(k) calculated at the step 301 and the intake air amount Ga(k) acquired at the step 302 to the unit air-fuel ration change amount/intake air amount integration value Σ(ΔA/F(k−1)*Ga(k−1)) calculated at the step 304B at the last performance of the routine of FIG. 19. Next, at the step 305, a data number counter C is incremented, which data number counter C indicates the number of the absolute values |ΔA/F(k)| of the unit air-fuel ratio change amounts added to the integration value ΣΔA/F of the unit air-fuel ratio change amounts calculated at the step 303. As is obvious, the data number counter C also indicates the number of the intake air amounts added to the integration value ΣGa of the intake air amounts calculated at the step 304, the number of the square values of the intake air amounts added to the square intake air amount integration value Σ(Ga(k)*Ga(k)) calculated at the step 304A and the number of the products of the unit air-fuel ratio change amount and the intake air amount added to the unit air-fuel ratio change amount/intake air amount integration value Σ(ΔA/F(k)*Ga(k)) calculated at the step 304B.

Next, at the step 306, it is judged whether the data number counter C incremented at the step 305 reaches a predetermined value Cth (C=Cth). When it is judged that C≠Cth, the routine is directly terminated. On the other hand, when it is judged that C=Cth, the routine proceeds to the step 306A and the steps following the step 306A.

When at the step 306, it is judged that C=Cth and then the routine proceeds to the step 306A, the variable correction coefficient K is calculated according to the following expression 9 (this is the same as the above-mentioned expression 7) on the basis of the integration value ΣΔA/F of the unit air-fuel ratio change amounts calculated at the step 303, the integration value ΣGa of the intake air amounts calculated at the step 304, the square intake air amount integration value Σ(Ga*Ga) calculated at the step 304A, the unit air-fuel ratio change amount/intake air amount integration value Σ(ΔA/F*Ga) calculated at the step 304B and a data number N which indicates the same number as that indicated by the data number counter C incremented at the step 305.

$$K=(\Sigma(\Delta A/F*Ga)*N-\Sigma Ga*\Sigma \Delta A/F)/(\Sigma(Ga*Ga)*N-\Sigma Ga*\Sigma Ga) \quad (9)$$

Next, at the step 309, the corrected unit air-fuel ratio change amount ΔA/Favec is calculated according to the following expression 10 (this is the same as the above-mentioned expression 8) on the basis of the average unit air-fuel ratio change amount ΔA/Fave calculated at the step 307, the average intake air amount Gaave calculated at the step 308, the correction coefficient K, i.e. the variable correction coefficient calculated at the step 306A and the base intake air amount Gab and then the routine proceeds to the step 310 shown in FIG. 20.

$$\Delta A/Favec=\Delta A/Fave+K*(Gab-Gaave) \quad (10)$$

Next, at the step 310 shown in FIG. 20, it is judged whether the corrected unit air-fuel ratio change amount ΔA/Favec calculated at the step 309 shown in FIG. 19 is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 311 and the alarm is activated for informing that the inter-cylinder air-fuel ratio imbalance condition occurs, and then the routine proceeds to the step 312. On the other hand, when it is judged that ΔA/Favec≦ΔA/Fth, i.e. it is judged that no inter-cylinder air-fuel ratio imbalance condition occurs, the routine proceeds directly to the step 312.

When at the step 311, the alarm is activated after it is judged that ΔA/Favec>ΔA/Fth at the step 310 and then the routine proceeds to the step 312 or when at the step 310, it is judged that ΣΔA/Favec≦ΔA/Fth and then the routine proceeds to the step 312, the integration value ΣΔA/F of the unit air-fuel ratio change amounts calculated at the step 303 shown in FIG. 19 is cleared. Next, at the step 313, the integration value ΣGa of the intake air amounts calculated at the step 304 is cleared. Next, at the step 313A, the square intake air amount integration value Σ(Ga*Ga) calculated at the step 304A is cleared. Next, at the step 313B, the unit air-fuel ratio change amount/intake air amount integration value Σ(ΔA/F*Ga) calculated at the step 304B is cleared. Next, at the step 314, the data number counter C incremented at the step 305 is cleared and then the routine is terminated.

In the third embodiment, the correction coefficient used for correcting the unit air-fuel ratio change amount calculated during the engine operation using the unit air-fuel ratio change amount calculated during the engine operation and the intake air amount at the time of the calculation of the unit air-fuel ratio change amount. However, instead of this, a relational expression between the unit air-fuel ratio change amount and the intake air amount may be obtained using the unit air-fuel ratio change amount calculated during the engine operation and the intake air amount at the time of the calculation of the unit air-fuel ratio change amount, a change amount of the unit air-fuel ratio change amount per unit intake air amount may be obtained from the obtained relational expression and the obtained change amount may be used as the correction coefficient used for correcting the unit air-fuel ratio change amount calculated during the engine operation. Next, this embodiment (hereinafter, referred to as "fourth embodiment") of the inter-cylinder air-fuel ratio imbalance will be explained.

In the inter-cylinder air-fuel ratio imbalance judgment of the fourth embodiment, the intake air amount used for a base for judging whether inter-cylinder air-fuel ratio imbalance condition occurs is selected and the selected intake air amount is stored as a base intake air amount in the electronic control unit 60. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

Further, the unit air-fuel ratio change amount is calculated during the engine operation on the basis of the output value of the upstream air-fuel ratio sensor 55, the calculated unit air-fuel ratio change amount is stored in the electronic control unit 60, the intake air amount at the time of the calculation of the unit air-fuel ratio change amount is acquired from the air flow meter 51 and the acquired intake air amount is stored in the electronic control unit. Further, when the data number of the unit air-fuel ratio change amounts and the data number of the intake air amounts stored in the electronic control unit reaches a predetermined number, a relational expression between the unit air-fuel ratio change amount and the intake air amount is obtained on the basis of the data of the unit air-fuel ratio change amounts and the data of the intake air amounts, for example, according to the least-square method. Further, a change amount of the unit air-fuel ratio change amount per unit intake air amount is obtained from the obtained relational expression and the obtained change amount is stored as a correction coefficient in the electronic control unit. Further, the data of the unit air-fuel ratio change amount and the data of the intake air amount stored in the electronic control unit are eliminated, and thereafter, the unit air-fuel ratio change amount is calculated on the basis of the output value of the upstream air-fuel ratio sensor, the calculated unit air-fuel ratio change amount is newly stored in the electronic control unit, the intake air amount at the time of the calculation of the unit air-fuel ratio change amount is acquired from the air flow meter and the acquired intake air flow meter is newly stored in the electronic control unit. Further, when the data number of the unit air-fuel ratio change amounts and the data number of the intake air amounts newly stored in the electronic control unit reaches the predetermined number, respectively, a relational expression between the unit air-fuel ratio change amount and the intake air amount is newly obtained on the basis of the data of the unit air-fuel ratio change amounts and the data of the intake air amounts, for example, according to the least-square method. Further, the change amount of the unit air-fuel ratio change amount per unit intake air amount is newly obtained from the newly obtained relational expression, the newly obtained change amount is stored as a new correction coefficient in the electronic control unit and the correction coefficient previously stored in the electronic control unit is eliminated. As explained above, the correction coefficient is newly obtained every the data number of the unit air-fuel ratio change amounts and the data number of the intake air amounts stored in the electronic control unit reaches the predetermined number and the correction coefficient previously stored in the electronic control unit is replaced with the newly obtained correction coefficient.

On the other hand, once the correction coefficient is obtained and the obtained correction coefficient is stored in the electronic control unit 60, as explained above, the unit air-fuel ratio change amount calculated on the basis of the output value of the upstream air-fuel ratio sensor 55 during the engine operation is stored in the electronic control unit and is corrected according to the following expression 11.

$$\Delta A/Favec = \Delta A/Fave + K^*(Gab - Gaave) \qquad (11)$$

In the above expression 11, "$\Delta A/Favec$" is the unit air-fuel ratio change amount after being corrected (i.e. the corrected unit air-fuel ratio change amount), "$\Delta A/Fave$" is the unit air-fuel ratio change amount calculated during the engine operation, "K" is the correction coefficient stored in the electronic control unit 60, "Gab" is the base intake air amount and "Gaave" is the intake air amount at the time of the calculation of the unit air-fuel ratio change amount.

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the fourth embodiment, the unit air-fuel ratio change amount calculated during the engine operation is converted to the unit air-fuel ratio change amount in the case where the intake air amount is equal to the base intake air amount and the converted unit air-fuel ratio change amount (i.e. the corrected unit air-fuel ratio change amount) is compared with the judgment value set to a value greater than the unit air-fuel ratio change amount in the case where the intake air amount is equal to the base intake air amount and all fuel injectors are normal by a predetermined value. In this regard, the inter-cylinder air-fuel ratio imbalance judgment of the fourth embodiment is similar to that of the first embodiment. Therefore, according to the fourth embodiment, the effects similar to those obtained by the inter-cylinder air-fuel ratio imbalance judgment of the first embodiment can be obtained.

Further, in the inter-cylinder air-fuel ratio imbalance judgment of the fourth embodiment, the correction coefficient used for correcting the unit air-fuel ratio change amount calculated during the engine operation is obtained on the basis of the unit air-fuel ratio change amount calculated during the engine operation and the intake air amount at the time of the calculation of the unit air-fuel ratio change amount. In this regard, the inter-cylinder air-fuel ratio imbalance judgment of the fourth embodiment is similar to that of the third embodiment. Therefore, according to the fourth embodiment, the effects similar to those obtained by the inter-cylinder air-fuel ratio imbalance judgment of the third embodiment can be obtained.

Figure 21:
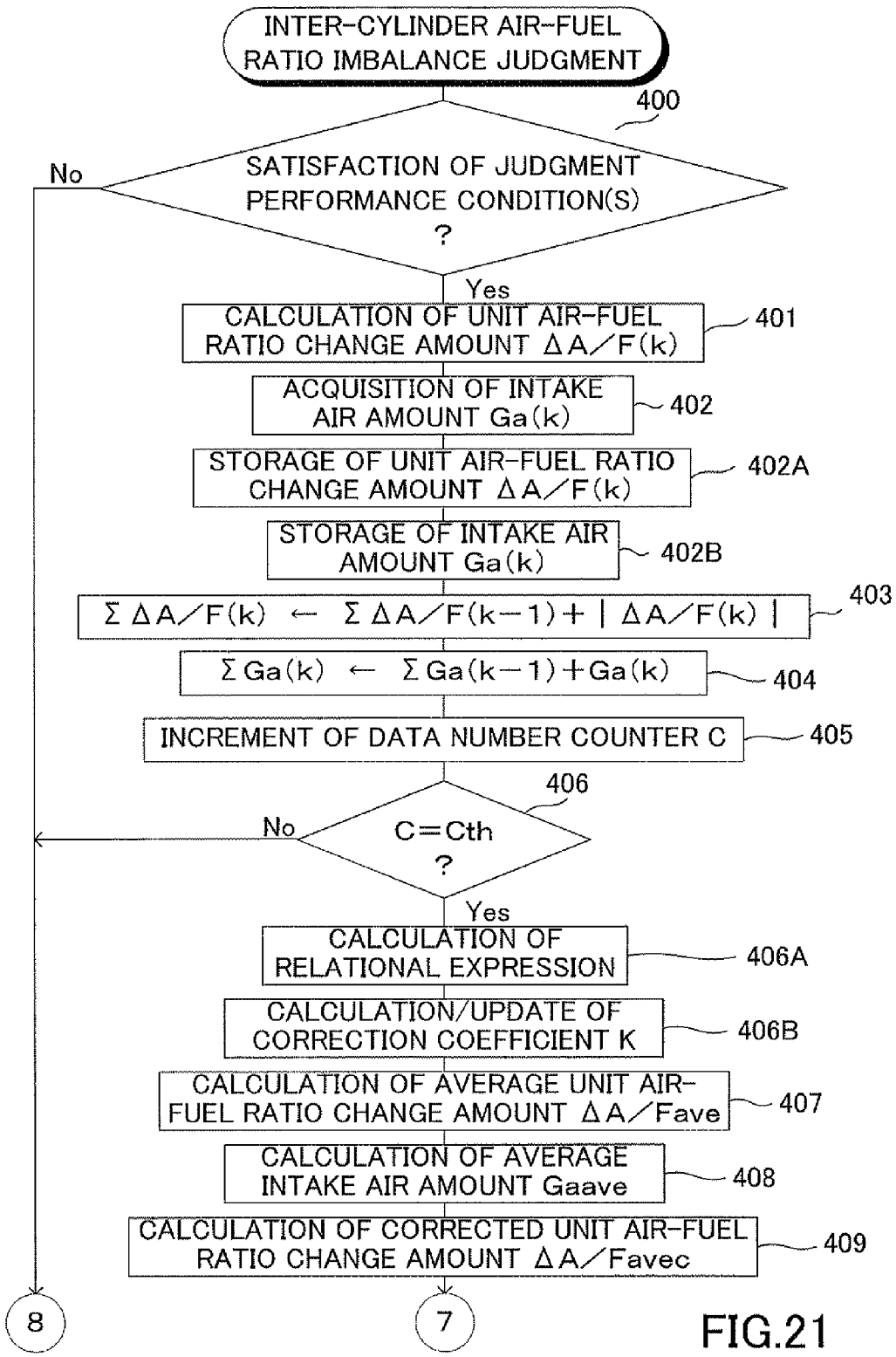
FIGS. 21 and 22 are views showing an example of a flowchart for performing an inter-cylinder air-fuel ratio imbalance judgment according to the fourth embodiment.
Figure 22:
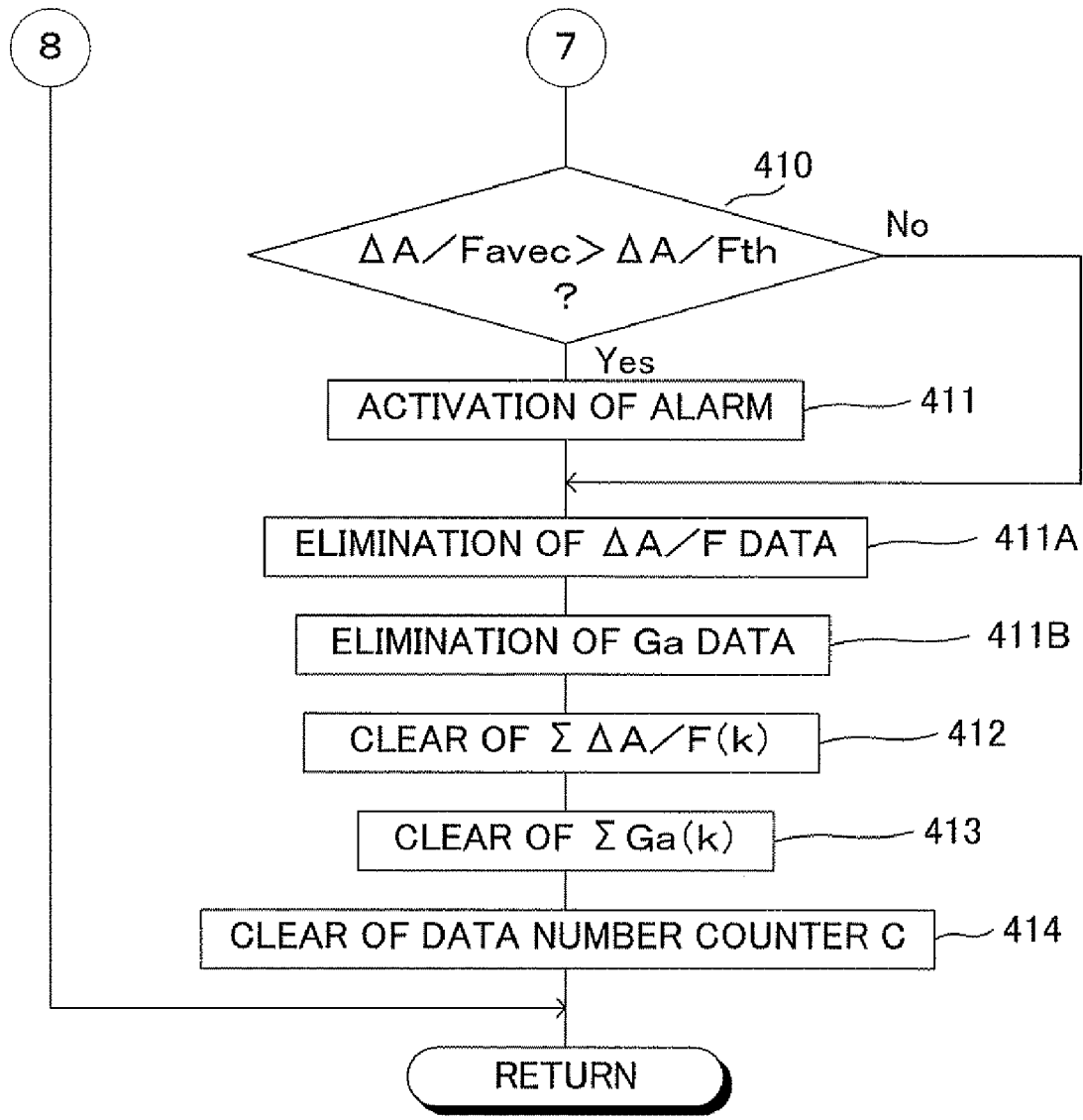

It should be noted that the inter-cylinder air-fuel ratio imbalance judgment of the fourth embodiment is performed, for example, according to a flowchart shown in FIGS. 21 and 22. Next, this flowchart will be explained.

When the routine of FIG. 21 starts, first, at the step 400, it is judged whether the condition(s) for allowing the performance of the inter-cylinder air-fuel ratio imbalance judgment is/are satisfied, for example, it is judged that the intake air amount is within the predetermined range. When it is judged that the condition(s) for allowing the performance of the inter-cylinder air-fuel ratio imbalance judgment is/are not satisfied, the routine is directly terminated. On the other hand, when it is judged that the condition(s) for allowing the performance of the inter-cylinder air-fuel ratio imbalance judgment is/are satisfied, the routine proceeds to the step 401 and the steps following the step 401.

When it is judged that the condition(s) for allowing the performance of the inter-cylinder air-fuel ratio imbalance judgment is/are satisfied and then the routine proceeds to the step 401, the unit air-fuel ratio change amount $\Delta A/F(k)$ is calculated on the basis of the output value of the upstream air-fuel ratio sensor 55. Next, at the step 402, the present intake air amount $Ga(k)$ is acquired from the air flow meter 51. Next, at the step 402A, the unit air-fuel ratio change amount $\Delta A/F(k)$ acquired at the step 401 is stored in the electronic control unit 60. Next, at the step 402B, the intake air amount $Ga(k)$ acquired at the step 402 is stored in the electronic control unit. Next, at the step 403, the integration value $\Sigma \Delta A/F(k)$ of the unit air-fuel ratio change amounts at this performance of the routine of FIGS. 21 and 22 is calculated (i.e. the integration value of the unit air-fuel ratio change amounts is updated) by adding the absolute value |ΔA/F(k)| of the unit air-fuel ratio change amount calculated at the step 401 to the integration value ΣΔA/F(k−1) of the unit air-fuel ratio change amounts calculated at the step 403 at the last performance of the routine of FIGS. 21 and 22. Next, at the step 404, the integration value ΣGa(k) of the intake air amounts at this performance of the routine of FIGS. 21 and 22 is calculated (i.e. the integration value of the intake air amounts is updated) by adding the intake air amount Ga(k) acquired at the step 402 to the integration value ΣGa(k−1) of the intake air amounts calculated at the step 404 at the last performance of the routine of FIGS. 21 and 22. Next, at the step 405, the data number counter C is incremented, which data number counter C indicates the number of the absolute values |ΔA/F(k)| of the unit air-fuel ratio change amounts added to the integration value of the unit air-fuel ratio change amounts calculated at the step 403. As is obvious, the data number counter C also indicates the number of the intake air amounts added to the integration value of the intake air amounts calculated at the step 404, the number of the data of the unit air-fuel ratio change amounts ΔA/F(k) stored in the electronic control unit at the step 402A and remaining in the electronic control unit at present and the number of the data of the intake air amounts Ga(k) stored in the electronic control unit at the step 402B and remaining in the electronic control unit at present.

Next, at the step 406, it is judged whether the data number counter C incremented at the step 405 reaches the predetermined value Cth (C=Cth). When it is judged that C≠Cth, the routine is directly terminated. On the other hand, when it is judged that C=Cth, the routine proceeds to the step 406A and the steps following the step 406A.

When at the step 406, it is judged that C=Cth and then the routine proceeds to the step 406A, a relational expression between the unit air-fuel ratio change amount and the intake air amount is calculated by the least-square method on the basis of the unit air-fuel ratio change amount ΔA/F(k) stored in the electronic control unit at the step 402A and remaining in the electronic control unit at present and the intake air amount Ga(k) stored in the electronic control unit at the step 402 and remaining in the electronic control unit at present. Next, at the step 406B, the change amount of the unit air-fuel ratio change amount per unit intake air amount is calculated as the correction coefficient K from the relational expression calculated at the step 406A and the correction coefficient already stored in the electronic control unit is updated to the calculated correction coefficient K or in the case where no correction coefficient is already stored in the electronic control unit, the calculated correction coefficient K is stored in the electronic control unit. Next, at the step 407, the average value ΔA/Fave of the unit air-fuel ratio change amounts is calculated by dividing the integration value ΣΔA/F of the unit air-fuel ratio change amounts calculated at the step 403 by the data number counter C incremented at the step 405. Next, at the step 408, the average value Gaave of the intake air amounts is calculated by dividing the integration value ΣGa of the intake air amounts calculated at the step 404 by the data number counter C incremented at the step 405. Next, at the step 409, the average value of the unit air-fuel ratio change amounts is corrected by applying the average value ΔA/Fave of the unit air-fuel ratio change amounts calculated at the step 407, the base intake air amount Gab and the average value Gaave of the intake air amounts calculated at the step 408 to the following expression 12 (this is the same as the above-mentioned expression 11) and thereby the corrected unit air-fuel ratio change amount ΔA/Favec is calculated.

$$\Delta A/Favec = \Delta A/Fave + K^*(Gab - Gaave) \quad (12)$$

It should be noted that in the above-mentioned expression 12, "K" is the correction coefficient stored in the electronic control unit 60 at the step 406B.

Next, at the step 410 shown in FIG. 22, it is judged whether the corrected unit air-fuel ratio change amount ΔA/Favec calculated at the step 409 is greater than the judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 411 and the alarm is activated for informing that the inter-cylinder air-fuel ratio imbalance occurs and then the routine proceeds to the step 411A. On the other hand, when it is judged that ΔA/Favec≦A/Fth, i.e. it is judged that no inter-cylinder air-fuel ratio imbalance occurs, the routine proceeds directly to the step 411A.

When at the step 411, the alarm is activated after it is judged that ΔA/Favec>ΔA/Fth at the step 410 or it is judged that ΔA/Favec≦ΔA/Fth at the step 410 and then the routine proceeds to the step 411A, the data of the unit air-fuel ratio change amount ΔA/F stored in the electronic control unit 60 is eliminated. Next, at the step 411B, the data of the intake air amount Ga stored in the electronic control unit is eliminated. Next, at the step 412, the integration value ΣΔA/F of the unit air-fuel ratio change amounts calculated at the step 403 shown in FIG. 22 is cleared. Next, at the step 413, the integration value ΣGa of the intake air amount calculated at the step 404 is cleared. Next, at the step 414, the data number counter C incremented at the step 405 is cleared and then the routine is terminated.

In the inter-cylinder air-fuel ratio imbalance of the second embodiment, the relational expression previously obtained by experiments, etc. is used as the relational expression between the unit air-fuel ratio change amount and the intake air amount used for correcting the unit air-fuel ratio change amount calculated during the engine operation. However, instead of this, a relational expression between the unit air-fuel ratio change amount and the intake air amount calculated on the basis of the unit air-fuel ratio change amount calculated during the engine operation and the intake air amount at the time of the calculation of the unit air-fuel ratio change amount may be used as the relational expression between the unit air-fuel ratio change amount and the intake air amount used for correcting the unit air-fuel ratio change amount calculated during the engine operation. Next, this embodiment (hereinafter, referred to as "fifth embodiment") of the inter-cylinder air-fuel ratio imbalance judgment will be explained.

In the fifth embodiment, the intake air amount used for a base for judging whether inter-cylinder air-fuel ratio imbalance condition occurs is selected and the selected intake air amount is stored as a base intake air amount in the electronic control unit 60. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

Further, the unit air-fuel ratio change amount is calculated during the engine operation on the basis of the output value of the upstream air-fuel ratio sensor 55, the calculated unit air-fuel ratio change amount is stored in the electronic control unit 60, the intake air amount at the time of the calculation of the unit air-fuel ratio change amount is acquired from the air flow meter 51 and the acquired intake air amount is stored in the electronic control unit. Further, when the data number of the unit air-fuel ratio change amounts and the data number of the intake air amounts stored in the electronic control unit reaches a predetermined number, a relational expression between the unit air-fuel ratio change amount and the intake air amount is obtained on the basis of the data of the unit air-fuel ratio change amounts and the data of the intake air amounts, for example, according to the least-square method and the obtained relational expression is stored in the electronic control unit. Further, the data of the unit air-fuel ratio change amount and the data of the intake air amount stored in the electronic control unit are eliminated, and thereafter, the unit air-fuel ratio change amount is calculated on the basis of the output value of the upstream air-fuel ratio sensor, the calculated unit air-fuel ratio change amount is newly stored in the electronic control unit, the intake air amount at the time of the calculation of the unit air-fuel ratio change amount is acquired from the air flow meter and the acquired intake air flow meter is newly stored in the electronic control unit. Further, when the data number of the unit air-fuel ratio change amounts and the data number of the intake air amounts newly stored in the electronic control unit reaches the predetermined number, respectively, a relational expression between the unit air-fuel ratio change amount and the intake air amount is newly obtained on the basis of the data of the unit air-fuel ratio change amounts and the data of the intake air amounts, for example, according to the least-square method, the newly obtained relational expression is stored in the electronic control unit and the relational expression previously stored in the electronic control unit is eliminated. As explained above, the relational expression between the unit air-fuel ratio change amount and the intake air amount is newly obtained every the data number of the unit air-fuel ratio change amounts and the data number of the intake air amounts stored in the electronic control unit reaches the predetermined number and the relational expression previously stored in the electronic control unit is replaced with the newly obtained relational expression.

It should be noted that the relational expression between the unit air-fuel ratio change amount and the intake air amount obtained as explained above is the following expression 13.

$$\Delta A/F = a*Ga + B \quad (13)$$

In the above expression 13, "a" is the slope and "b" is the intercept.

On the other hand, once the relational expression between the unit air-fuel ratio change amount and the intake air amount is obtained and the obtained relational expression is stored in the electronic control unit 60, the unit air-fuel ratio change amount calculated on the basis of the output value of the upstream air-fuel ratio sensor 55 during the engine operation is stored in the electronic control unit and is corrected according to the following expression 14.

$$\Delta A/Favec = \Delta A/Fave*(\Delta A/Fb/\Delta A/Fa) \quad (14)$$

In the above expression 14, "$\Delta A/Favec$" is the unit air-fuel ratio change amount after being corrected (i.e. the corrected unit air-fuel ratio change amount), "$\Delta A/Fave$" is the unit air-fuel ratio change amount calculated during the engine operation, "$\Delta A/Fb$" is the unit air-fuel ratio change amount (i.e. the base unit air-fuel ratio change amount) calculated by applying the base intake air amount to the above-mentioned expression 13 and "$\Delta A/Fa$" is the unit air-fuel ratio change amount (i.e. the provisional unit air-fuel ratio change amount) calculated by applying the intake air amount at the time of the calculation of the unit air-fuel ratio change amount to the above-mentioned expression 13.

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the fifth embodiment, as the intake air amount at the time of the calculation of the unit air-fuel ratio change amount is smaller than the base intake air amount, the unit air-fuel ratio change amount calculated during the engine operation is corrected to the great value, and on the other hand, as the intake air amount at the time of the calculation of the unit air-fuel ratio change amount is greater than the base intake air amount, the unit air-fuel ratio change amount calculated during the engine operation is corrected to the small value. In this regard, the inter-cylinder air-fuel ratio imbalance judgment of the fifth embodiment is similar to that of the second embodiment. Therefore, according to the fifth embodiment, the effects similar to those obtained by the inter-cylinder air-fuel ratio imbalance judgment of the second embodiment can be obtained.

Further, in the inter-cylinder air-fuel ratio imbalance judgment of the fifth embodiment, the relational expression between the unit air-fuel ratio change amount and the intake air amount used for correcting the unit air-fuel ratio change amount calculated during the engine operation is obtained on the basis of the unit air-fuel ratio change amount calculated during the engine operation and the intake air amount at the time of the calculation of the unit air-fuel ratio change amount. In this regard, the inter-cylinder air-fuel ratio imbalance judgment of the fifth embodiment is similar to that of the third embodiment. Therefore, according to the fifth embodiment, the effects similar to those obtained by the inter-cylinder air-fuel ratio imbalance judgment of the third embodiment can be obtained.

Figure 23:
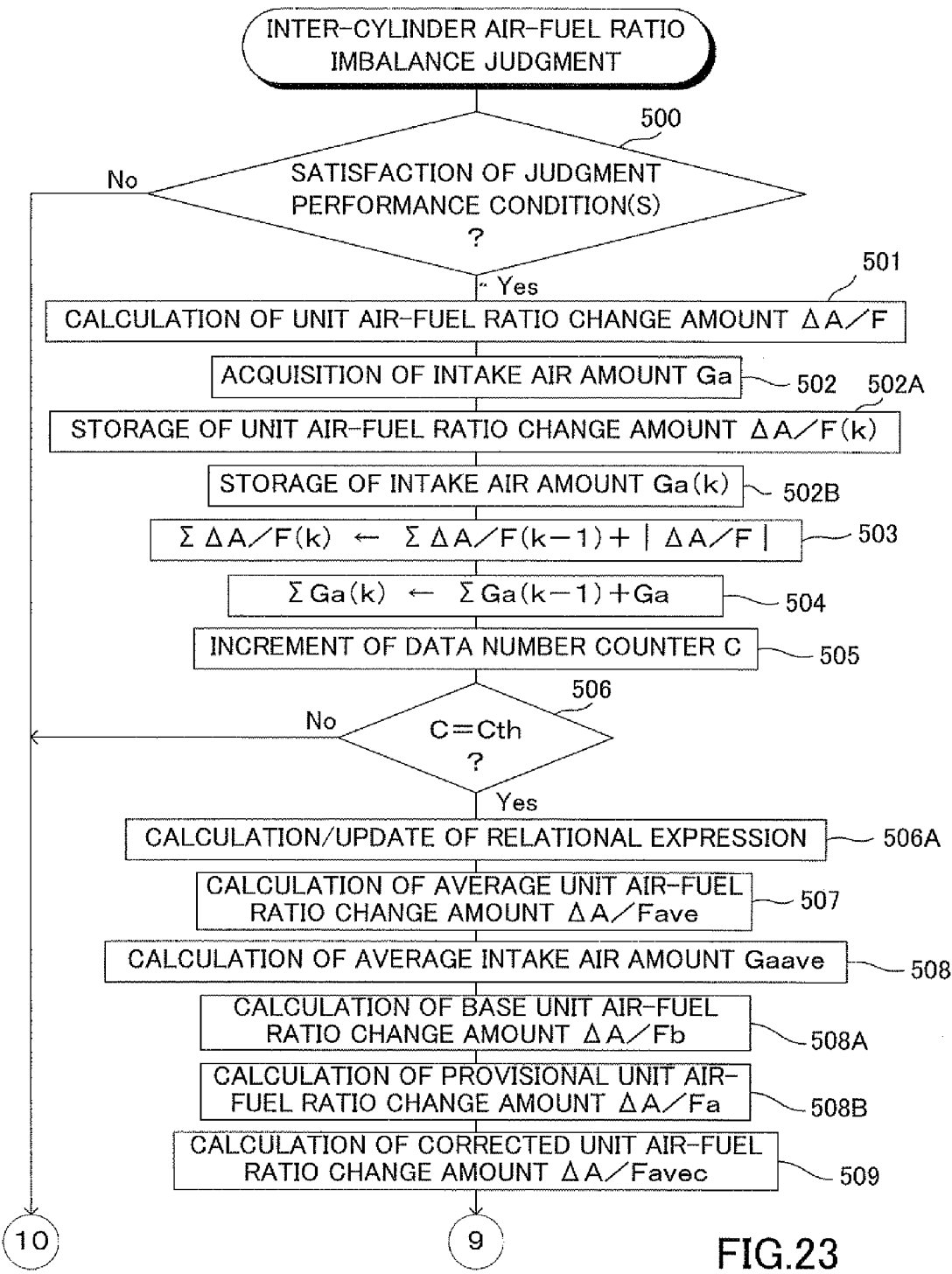
FIGS. 23 and 24 are views showing an example of a flowchart for performing an inter-cylinder air-fuel ratio imbalance judgment according to the fifth embodiment.
Figure 24:
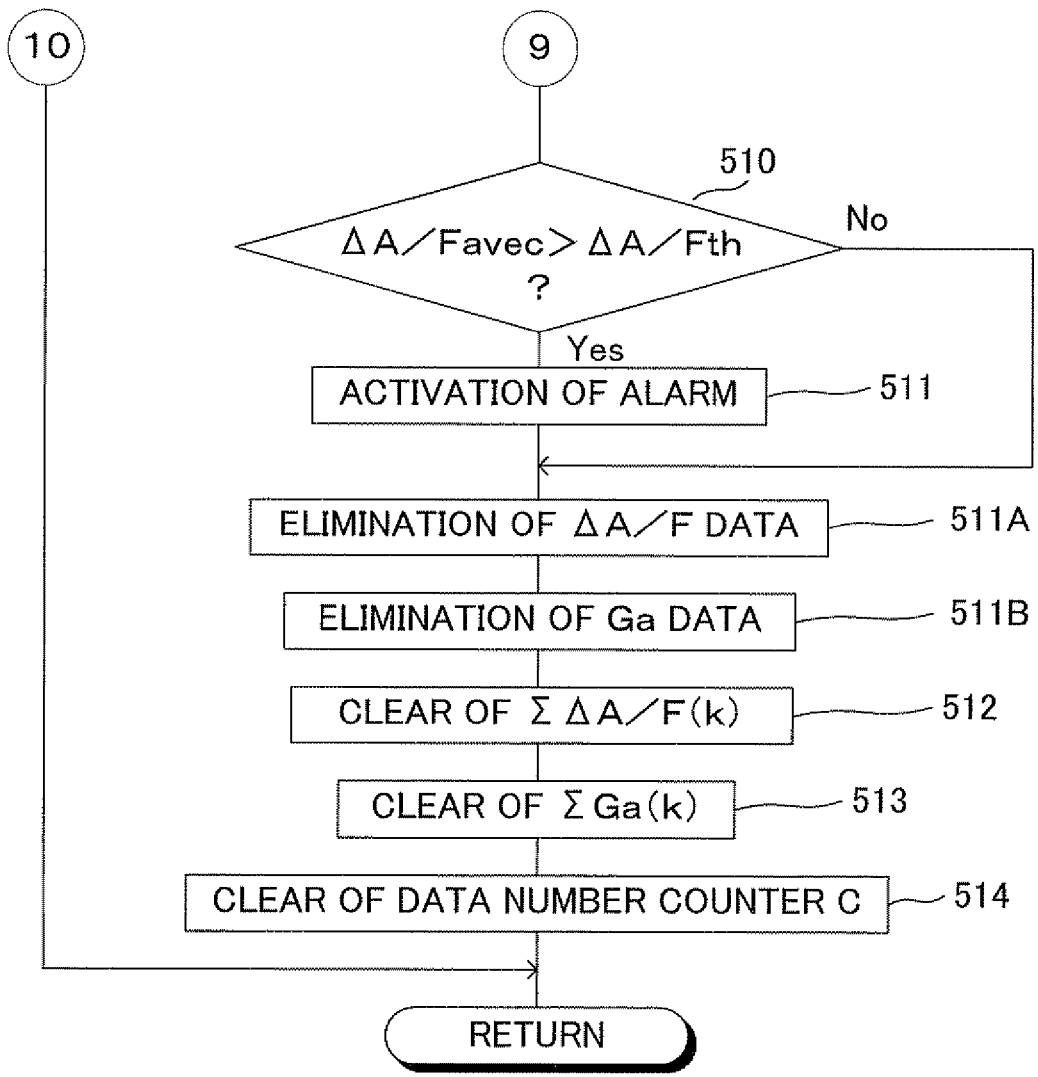

It should be noted that the inter-cylinder air-fuel ratio imbalance judgment is performed, for example, according to a flowchart shown in FIGS. 23 and 24. Next, this flowchart will be explained. It should be noted that the steps 500 to 506 shown in FIG. 23 are the same as the steps 400 to 406 shown in FIG. 21, respectively and therefore the explanations thereof will be omitted. Further, the steps 511A to 514 shown in FIG. 24 are the same as the steps 411A to 414 shown in FIG. 22, respectively and therefore the explanations thereof will be omitted.

When it is judged that C=Cth at the step 506 shown in FIG. 23 and then the routine proceeds to the step 506A, a relational expression between the unit air-fuel ratio change amount and the intake air amount is calculated by the least-square method on the basis of the unit air-fuel ratio change amount $\Delta A/F(k)$ stored in the electronic control unit at the step 502A and remaining in the electronic control unit at present and the intake air amount Ga(k) stored in the electronic control unit at the step 502B and remaining in the electronic control unit at present and the relational expression between the unit air-fuel ratio change amount and the intake air amount already stored in the electronic control unit is updated to the calculated relational expression or in the case where no relational expression between the unit air-fuel ratio change amount and the intake air amount is already stored in the electronic control unit, the calculated relational expression is stored in the electronic control unit.

It should be noted that the relational expression between the unit air-fuel ratio change amount and the intake air amount calculated at the step 502B is the following expression 15 (this is the same as the above-mentioned expression 13).

$$\Delta A/F = a*Ga + B \quad (15)$$

Next, at the step 507, the average value ΔA/Fave of the unit air-fuel ratio change amounts is calculated by dividing the integration value ΣΔA/F of the unit air-fuel ratio change amount calculated at the step 503 by the data number counter C incremented at the step 505. Next, at the step 508, the average value Gaave of the intake air amounts is calculated by dividing the integration value ΣGa of the intake air amounts calculated at the step 504 by the data number counter C incremented at the step 505. Next, at the step 508A, the base unit air-fuel ratio change amount ΔA/Fb is calculated by applying the base intake air amount Gab to "Ga" of the above-mentioned expression 15. Next, at the step 508B, the provisional unit air-fuel ratio change amount ΔA/Fa is calculated by applying the average value Gaave of the intake air amounts calculated at the step 508 to "Ga" of the above-mentioned expression 15. Next, at the step 509, the average value of the unit air-fuel ratio change amount is corrected by applying the average value ΔA/Fave of the unit air-fuel ratio change amounts calculated at the step 507, the base unit air-fuel ratio change amount ΔA/Fb calculated at the step 508A and the provisional unit air-fuel ratio change amount ΔA/Fa calculated at the step 508A to the following expression 16 (this is the same as the above-mentioned expression 14) and thereby the corrected unit air-fuel ratio change amount ΔA/Favec is calculated.

$$\Delta A/Favec = \Delta A/Fave * (\Delta A/Fb / \Delta A/Fa) \quad (16)$$

Next, at the step 510 shown in FIG. 24, it is judged whether the corrected unit air-fuel ratio change amount ΔA/Favec calculated at the step 509 shown in FIG. 23 is greater than the judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 511 and the alarm is activated for informing that the inter-cylinder air-fuel ratio imbalance condition occurs and then the routine proceeds to the step 511A. On the other hand, when it is judged that ΔA/Favec≦ΔA/Fth, i.e. it is judged that no inter-cylinder air-fuel ratio imbalance condition occurs, the routine proceeds directly to the step 511A.

In the inter-cylinder air-fuel ratio imbalance judgment of the third embodiment, the correction coefficient used for correcting the unit air-fuel ratio change amount calculated during the engine operation is calculated on the basis of the unit air-fuel ratio change amount calculated during the engine operation and the intake air amount at the time of the calculation of the unit air-fuel ratio change amount. However, in this case, if the correction coefficient is calculated using the intake air amount when the values of the intake air amounts acquired for calculating the correction coefficient are focused within the narrow range, the calculated correction coefficient may be inappropriate as the correction coefficient used for correcting the unit air-fuel ratio change amount. Accordingly, depending on the degree of the dispersion of the intake air amount acquired during the engine operation, the inter-cylinder air-fuel ratio imbalance judgment of the third embodiment may be performed or the other inter-cylinder air-fuel ratio imbalance may be performed. Next, this embodiment (hereinafter, referred to as "sixth embodiment") will be explained.

In the sixth embodiment, a relational expression between the unit air-fuel ratio change amount and the intake air amount in the case where all fuel injectors are normal is previously obtained by experiments, etc., a change amount of the unit air-fuel ratio change amount per unit intake air amount is obtained from the obtained relational expression and the obtained change amount is stored as a correction coefficient (hereinafter, this correction coefficient will be referred to as "fixed correction coefficient") in the electronic control unit 60. Further, the intake air amount used for a base for judging whether inter-cylinder air-fuel ratio imbalance condition occurs is selected and the selected intake air amount is stored as a base intake air amount in the electronic control unit. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

On the other hand, the unit air-fuel ratio change amount is integrated every the unit air-fuel ratio change amount is calculated during the engine operation and the integration value (hereinafter, this integration value will be referred to as "unit air-fuel ratio change amount integration value") is stored in the electronic control unit 60. Further, the intake air amount at the time of the calculation of the unit air-fuel ratio change amount is integrated every the unit air-fuel ratio change amount is calculated and the integration value (hereinafter, this integration value will be referred to as "intake air amount integration value") is stored in the electronic control unit. Further, the square value of the intake air amount at the time of the calculation of the unit air-fuel ratio change amount is integrated every the unit air-fuel ratio change amount is calculated and the integration value (hereinafter, this integration value will be referred to as "square intake air amount integration value") is stored in the electronic control unit. Further, the product of the unit air-fuel ratio change amount and the intake air amount at the time of the calculation of the unit air-fuel ratio change amount is integrated every the unit air-fuel ratio change amount is calculated and the integration value (hereinafter, this integration value will be referred to as "unit air-fuel ratio change amount/intake air amount integration value") is stored in the electronic control unit.

Further, when the data number in each integration value stored in the electronic control unit (as is obvious, the data numbers in the integration values are the same as each other) reaches a predetermined number, respectively, a coefficient indicating the degree of the dispersion of the data of the intake air amounts (hereinafter, this coefficient will be referred to as "dispersion coefficient") is calculated on the basis of the data of the integration values, for example, according to the following expression 17.

$$V = (\Sigma(Ga*Ga) - \Sigma Ga * \Sigma Ga/N)/(N-1) \quad (17)$$

In the above expression 17, "V" is the dispersion coefficient, "Σ(Ga*Ga)" is the square intake air amount integration value, "ΣGa" is the intake air amount integration value" and "N" is the data number of each integration value (as is obvious, the data numbers of the integration values are the same as each other).

Further, when the thus calculated dispersion coefficient V is equal to or smaller than a predetermined value, i.e. the degree of the dispersion of the data of the intake air amounts is relatively small, the fixed correction coefficient stored in the electronic control unit 60 is used as the correction coefficient for correcting the unit air-fuel ratio change amount (the details of this usage will be explained later). On the other hand, when the dispersion coefficient is greater than the predetermined value, i.e. the degree of the dispersion of the data of the intake air amount is relatively great, a correction coefficient (hereinafter, this correction coefficient will be referred to as "variable correction coefficient") is calculated according to the following expression 18 and the calculated variable correction coefficient is used as the correction coefficient for correcting the unit air-fuel ratio change amount (the details of this usage will be explained later).

$$K=(\Sigma(\Delta A/F*Ga)*N-\Sigma Ga*\Sigma\Delta A/F)/(\Sigma(Ga*Ga)*N-\Sigma Ga*\Sigma Ga) \quad (18)$$

In the above expression 18, "K" is the variable correction coefficient, "$\Sigma(\Delta A/F*Ga)$" is the unit air-fuel ratio change amount/intake air amount integration value, "$\Sigma Ga$" is the intake air amount integration value, "$\Sigma\Delta A/F$" is the unit air-fuel ratio change amount integration value, "$\Sigma(Ga*Ga)$" is the square intake air amount integration value and "N" is the data number of each integration value (as is obvious, the data numbers of the integration values are the same as each other).

Further, once it is determined whether the fixed correction coefficient or the variable correction coefficient is used as the correction coefficient, depending on the dispersion coefficient V, the unit air-fuel ratio change amount calculated on the basis of the output value of the upstream air-fuel ratio sensor 55 during the engine operation is corrected according to the following expression 19.

$$\Delta A/Favec=\Delta A/Fave+K*(Gab-Gaave) \quad (19)$$

In the above expression 19, "$\Delta A/Favec$" is the unit air-fuel ratio change amount after being corrected (i.e. the corrected unit air-fuel ratio change amount), "$\Delta A/Fave$" is the unit air-fuel ratio change amount calculated during the engine operation, "K" is the correction coefficient, that is, when the dispersion coefficient V is equal to or smaller than the predetermined value, "K" is the fixed correction coefficient and when the dispersion coefficient V is greater than the predetermined value, "K" is the variable correction coefficient, "Gab" is the base intake air amount and "Gaave" is the intake air amount at the time of the calculation of the unit air-fuel ratio change amount.

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the sixth embodiment, the unit air-fuel ratio change amount calculated during the engine operation is converted to the unit air-fuel ratio change amount in the case where the intake air amount is equal to the base intake air amount and the converted unit air-fuel ratio change amount (i.e. the corrected unit air-fuel ratio change amount) is compared with the judgment value set to a value greater than the unit air-fuel ratio change amount in the case where the intake air amount is equal to the base intake air amount and all fuel injectors are normal by a predetermined value. In this regard, the inter-cylinder air-fuel ratio imbalance judgment of the sixth embodiment is similar to that of the first embodiment. Therefore, according to the sixth embodiment, the effects similar to those obtained by the inter-cylinder air-fuel ratio imbalance judgment of the first embodiment can be obtained.

Further, in the inter-cylinder air-fuel ratio imbalance judgment of the sixth embodiment, when the correction coefficient is calculated on the basis of the unit air-fuel ratio change amount calculated during the engine operation and the intake air amount at the time of the calculation of the unit air-fuel ratio change amount, the values of the intake air amount acquired for calculating the correction coefficient are focused with in the narrow range and therefore even when the correction coefficient is calculated on the basis of the intake air amount, the calculated correction coefficient is inappropriate as the correction coefficient for correcting the unit air-fuel ratio change amount, i.e. the dispersion coefficient is equal to or smaller than the predetermined value, the correction coefficient previously obtained by experiments, etc. is used for correcting the unit air-fuel ratio change amount. Accordingly, in the inter-cylinder air-fuel ratio imbalance judgment of the sixth embodiment, the values of the intake air amounts disperse to the wide extent and only when the correction coefficient calculated using the intake air amounts is appropriate as the correction coefficient for correcting the unit air-fuel ratio change amount, i.e. the dispersion coefficient is greater than the predetermined value, the correction coefficient is calculated on the basis of the unit air-fuel ratio change amount calculated during the engine operation and the intake air amount at the time of the calculation of the unit air-fuel ratio change amount and the calculated correction coefficient is used for correcting the unit air-fuel ratio change amount. Therefore, according to the sixth embodiment, independently of the degree of the dispersion of the intake air amounts acquired during the engine operation, the inter-cylinder air-fuel ratio imbalance condition can be accurately judged.

It should be noted that in the inter-cylinder air-fuel ratio imbalance judgment of the sixth embodiment, the relational expression between the unit air-fuel ratio change amount and the intake air amount in the case where all fuel injectors are normal is previously obtained by experiments, etc, the change amount of the unit air-fuel ratio change amount per unit intake air amount is obtained from the obtained relational expression, the obtained change amount is stored as the fixed correction coefficient in the electronic control unit and when the dispersion coefficient is equal to or smaller than the predetermined value, the fixed correction coefficient stored in the electronic control unit is used for correcting the unit air-fuel ratio change amount calculated during the engine operation. However, if the variable correction coefficient is already calculated on the basis of the unit air-fuel ratio change amount calculated during the engine operation and the intake air amount at the time of the calculation of the unit air-fuel ratio change amount, the already calculated variable correction coefficient may be used when the dispersion coefficient is equal to or smaller than the predetermined value. According to this, it is not necessary to previously obtain the correction coefficient by experiments, etc.

Further, in the inter-cylinder air-fuel ratio imbalance judgment of the sixth embodiment, the relational expression between the unit air-fuel ratio change amount and the intake air amount in the case where all fuel injectors are normal is previously obtained by experiments, etc., the change amount of the unit air-fuel ratio change amount per unit intake air amount is obtained from the obtained relational expression, the obtained change amount is stored as the fixed correction coefficient in the electronic control unit, and when the dispersion coefficient is equal to or smaller than the predetermined value, the unit air-fuel ratio change amount calculated during the engine operation is corrected using the fixed correction coefficient stored in the electronic control unit and the corrected unit air-fuel ratio change amount is used for the inter-cylinder air-fuel ratio imbalance judgment. However, instead of this, a relational expression between the unit air-fuel ratio change amount and the intake air amount in the case where all fuel injectors are normal may be previously obtained by experiments, etc., the obtained relational expression may be stored as a fixed relational expression in the electronic control unit and when the dispersion coefficient is equal to or smaller than the predetermined value, similar to the second embodiment, the unit air-fuel ratio change amount calculated during the engine operation may be corrected using the fixed relational expression stored in the electronic control unit and the corrected unit air-fuel ratio change amount may be used for the inter-cylinder air-fuel ratio imbalance judgment.

Further, as explained above, in the inter-cylinder air-fuel ratio imbalance judgment of the sixth embodiment, when the dispersion coefficient is equal to or smaller than the predetermined value, the unit air-fuel ratio change amount calculated during the engine operation is corrected using the fixed correction coefficient and on the other hand, when the dispersion coefficient is greater than the predetermined value, the unit air-fuel ratio change amount calculated during the engine operation is corrected using the variable correction coefficient. In this regard, the predetermined value is set to a value corresponding to the degree of the dispersion in which the appropriate variable correction coefficient for correcting the unit air-fuel ratio change amount calculated during the engine operation can be calculated.

Figure 25:
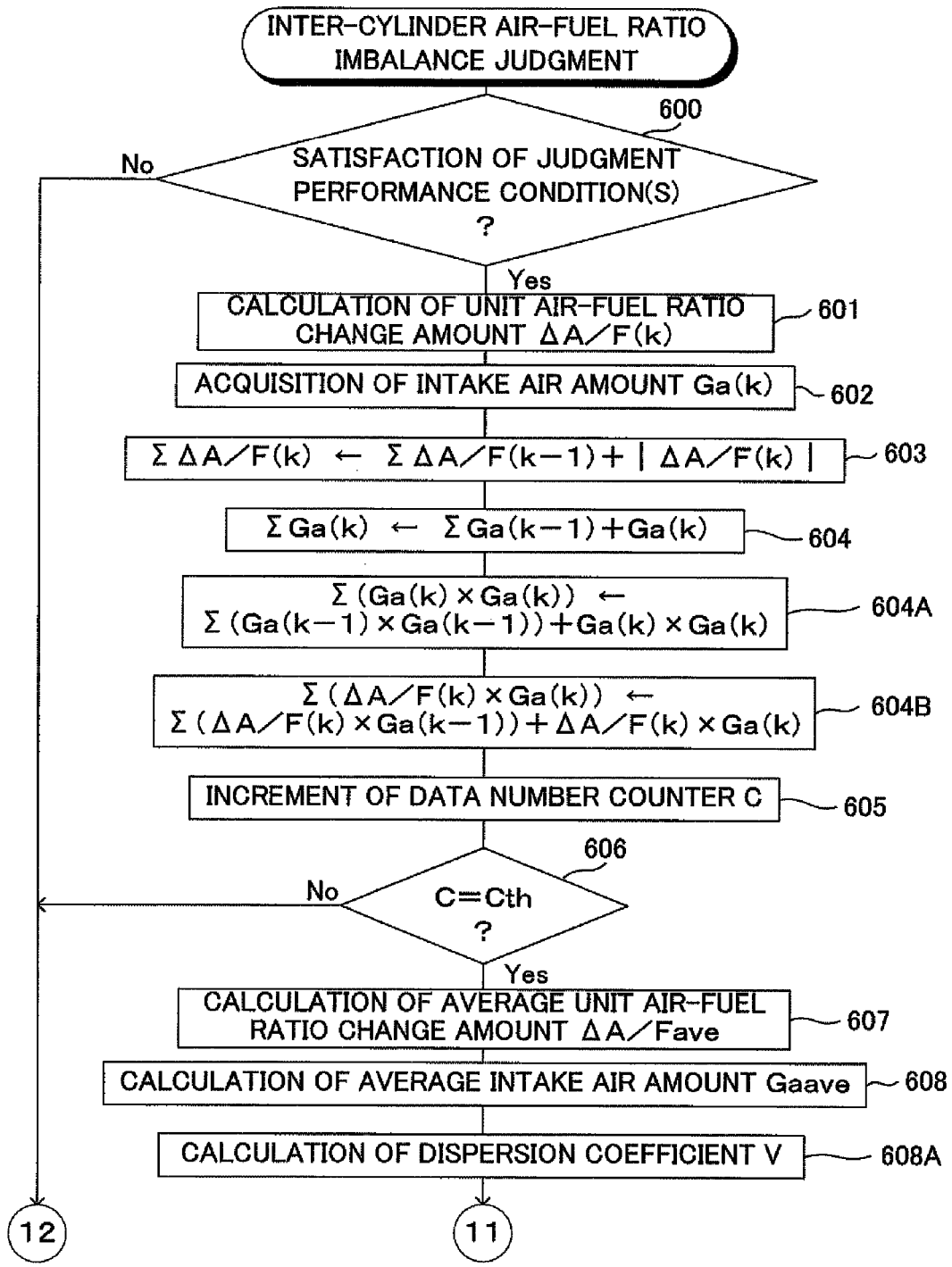
FIGS. 25 and 26 are views showing an example of a flowchart for performing an inter-cylinder air-fuel ratio imbalance judgment according to the sixth embodiment.
Figure 26:
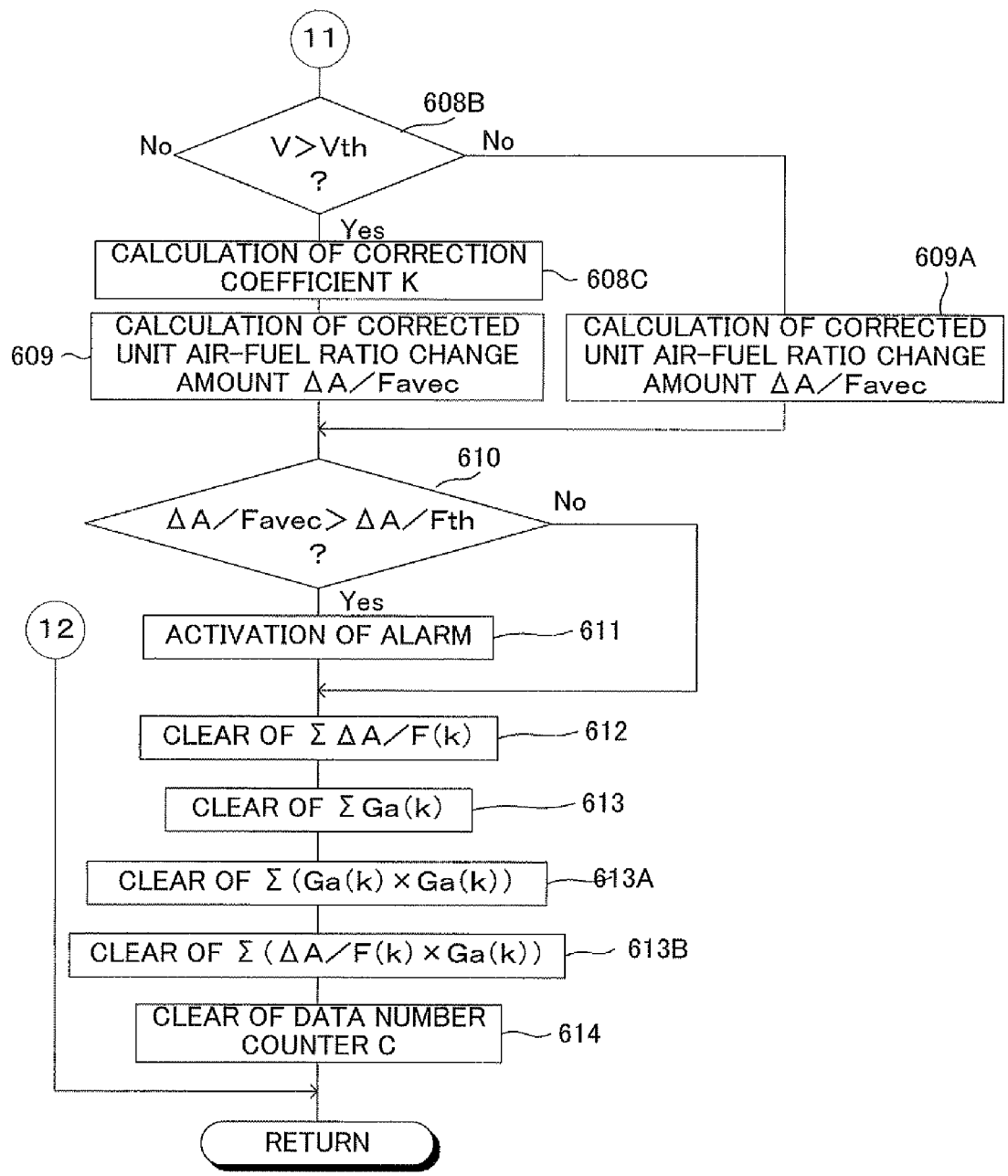

It should be noted that the inter-cylinder air-fuel ratio imbalance judgment is performed, for example, according to a flowchart shown in FIGS. 25 and 26. Next, this flowchart will be explained.

When the routine of FIG. 25 starts, first, at the step 600, it is judged whether the condition(s) for allowing the performance of the inter-cylinder air-fuel ratio imbalance judgment is/are satisfied, for example, it is judged whether the intake air amount is within a predetermined range. When it is judged that the condition(s) for allowing the performance of the inter-cylinder air-fuel ratio imbalance judgment is/are not satisfied, the routine is directly terminated. On the other hand, it is judged that the condition(s) for allowing the performance of the inter-cylinder air-fuel ratio imbalance judgment is/are satisfied, the routine proceeds to the step 601 and the steps following the step 601.

When at the step 600, it is judged that the condition(s) for allowing the performance of the inter-cylinder air-fuel ratio imbalance judgment is/are satisfied and then the routine proceeds to the step 601, the unit air-fuel ratio change amount $\Delta A/F(k)$ is calculated on the basis of the output value of the upstream air-fuel ratio sensor 55. Next, at the step 602, the present intake air amount Ga(k) is acquired from the air flow meter 51. Next, at the step 603, the integration value $\Sigma \Delta A/F(k)$ of the unit air-fuel ratio change amounts at this performance of the routine of FIG. 25 is calculated (i.e. the integration value of the unit air-fuel ratio change amounts is updated) by adding the absolute value $|\Delta A/F(k)|$ of the unit air-fuel ratio change amount calculated at the step 601 to the integration value $\Sigma \Delta A/F(k-1)$ of the unit air-fuel ratio change amounts calculated at the last performance of the routine of FIG. 25. Next, at the step 604, the integration value $\Sigma Ga(k)$ of the intake air amounts at this performance of the routine of FIG. 25 is calculated (i.e. the integration value of the intake air amounts is updated) by adding the intake air amount Ga(k) acquired at the step 602 to the integration value $\Sigma Ga(k-1)$ of the intake air amounts calculated at the step 604 at the last performance of the routine of FIG. 25. Next, at the step 604A, the square intake air amount integration value $\Sigma(Ga(k)*Ga(k))$ at this performance of the routine of FIG. 25 is calculated (i.e. the square intake air amount integration value is updated) by adding the square value Ga(k)*Ga(k) of the intake air amount Ga(k) acquired at the step 602 to the square intake air amount integration value $\Sigma(Ga(k-1)*Ga(k-1))$ calculated at the step 604A at the last performance of the routine of FIG. 25. Next, at the step 604B, the unit air-fuel ratio change amount/intake air amount integration value $\Sigma(A/F(k)*Ga(k))$ at this performance of the routine of FIG. 25 is calculated (i.e. the unit air-fuel ratio change amount/intake air amount integration value is updated) by adding the product $\Delta A/F(k)*Ga(k)$ of the unit air-fuel ratio change amount $\Delta A/F(k)$ calculated at the step 601 and the intake air amount Ga(k) acquired at the step 602 to the unit air-fuel ration change amount/intake air amount integration value $\Sigma(A/F(k-1)*Ga(k-1))$ calculated at the step 604B at the last performance of the routine of FIG. 19. Next, at the step 605, the data number counter C is incremented, which data number counter C indicates the number of the absolute values $|\Delta A/F(k)|$ of the unit air-fuel ratio change amounts added to the integration value $\Sigma \Delta A/F$ of the unit air-fuel ratio change amounts calculated at the step 603. As is obvious, the data number counter C also indicates the number of the intake air amounts added to the integration value $\Sigma Ga$ of the intake air amounts calculated at the step 604, the number of the square values of the intake air amounts added to the square intake air amount integration value $\Sigma(Ga(k)*Ga(k))$ calculated at the step 604A and the number of the products of the unit air-fuel ratio change amount and the intake air amount added to the unit air-fuel ratio change amount/intake air amount integration value $\Sigma(\Delta A/F(k)*Ga(k))$ calculated at the step 604B.

Next, at the step 606, it is judged whether the data number counter C incremented at the step 605 reaches a predetermined value Cth (C=Cth). When it is judged that C≈Cth, the routine is directly terminated. On the other hand, when it is judged that C=Cth, the routine proceeds to the step 607 and the steps following the step 607.

When at the step 606, it is judged that C=Cth and then the routine proceeds to the step 607, the average value $\Delta A/Fave$ of the unit air-fuel ratio change amounts is calculated by dividing the integration value $\Sigma \Delta A/F$ of the unit air-fuel ratio change amounts calculated at the step 603 by the data number counter C incremented at the step 605. Next, at the step 608, the average value Gaave of the intake air amounts is calculated by dividing the integration value $\Sigma Ga$ of the intake air amounts calculated at the step 604 by the data number counter C incremented at the step 605. Next, at the step 608A, a dispersion coefficient V is calculated according to the following expression 20 (this is the same as the above-mentioned expression 17) on the basis of the integration value $\Sigma Ga$ of the intake air amounts calculated at the step 604, the square intake air amount integration value $\Sigma(Ga*Ga)$ calculated at the step 604A and a data number N which indicates the same number as that indicated by the data number counter C incremented at the step 605.

$$V=(\Sigma(Ga*Ga)-\Sigma Ga*\Sigma Ga/N)/(N-1) \qquad (20)$$

Next, at the step 608B shown in FIG. 26, it is judged whether the dispersion coefficient V calculated at the step 608A is greater than a predetermined value Vth (V>Vth). When it is judged that V>Vth, the routine proceeds to the step 608C. On the other hand, when it is judged that V≦Vth, the routine proceeds to the step 609A.

When at the step 608B, it is judged that V>Vth, i.e. it is judged that the degree of the dispersion of the intake air amount data is relatively great, and then the routine proceeds to the step 608C, the variable correction coefficient K is calculated according to the following expression 21 (this is the same as the above-mentioned expression 18) on the basis of the integration value ΣΔA/F of the unit air-fuel ratio change amounts calculated at the step 603, the integration value ΣGa of the intake air amounts calculated at the step 604, the square intake air amount integration value Σ(Ga*Ga) calculated at the step 604A, the unit air-fuel ratio change amount/intake air amount integration value Σ(ΔA/F*Ga) calculated at the step 604B and a data number N which indicates the same number as that indicated by the data number counter C incremented at the step 605.

$$K=(\Sigma(\Delta A/F^*Ga)^*N-\Sigma-Ga^*\Sigma\Delta A/F)/(\Sigma(Ga^*Ga)^*N-\Sigma Ga^*\Sigma Ga) \quad (21)$$

Next, at the step 609, the corrected unit air-fuel ration change amount ΔA/Favec is calculated according to the following expression 22 (this is the same as the above-mentioned expression 19) on the basis of the average unit air-fuel ratio change amount ΔA/Fave calculated at the step 607, the average intake air amount Gaave calculated at the step 608, the correction coefficient K, i.e. the variable correction coefficient calculated at the step 608C and the base intake air amount Gab and then the routine proceeds to the step 610.

$$\Delta A/Favec=\Delta A/Fave\ K^*(Gab-Gaave) \quad (22)$$

On the other hand, when at the step 608A, it is judged that V≦Vth, i.e. it is judged that the degree of the dispersion of the intake air amount data is relatively small, and then the routine proceeds to the step 609A, the corrected unit air-fuel ration change amount ΔA/Favec is calculated according to the above-expression 22 on the basis of the average unit air-fuel ratio change amount ΔA/Fave calculated at the step 607, the average intake air amount Gaave calculated at the step 608, the correction coefficient K, i.e. the fixed correction coefficient stored in the electronic control unit 60 and the base intake air amount Gab and then the routine proceeds to the step 610.

Next, at the step 610, it is judged whether the corrected unit air-fuel ratio change amount ΔA/Favec calculated at the step 609 or 609A is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 611 and the alarm is activated for informing that the inter-cylinder air-fuel ratio imbalance condition occurs, and then the routine proceeds to the step 612. On the other hand, when it is judged that ΔA/Favec≦ΔA/Fth, i.e. it is judged that no inter-cylinder air-fuel ratio imbalance condition occurs, the routine proceeds directly to the step 612.

When at the step 611, the alarm is activated after it is judged that ΔA/Favec>ΔA/Fth at the step 610 and then the routine proceeds to the step 612 or when at the step 610, it is judged that ΔA/Favec≦ΔA/Fth and then the routine proceeds to the step 612, the integration value ΣΔA/F of the unit air-fuel ratio change amounts calculated at the step 603 shown in FIG. 25 is cleared. Next, at the step 613, the integration value ΣGa of the intake air amounts calculated at the step 604 is cleared. Next, at the step 613A, the square intake air amount integration value Σ(Ga*Ga) calculated at the step 604A is cleared. Next, at the step 613B, the unit air-fuel ratio change amount/intake air amount integration value Σ(ΔA/F*Ga) calculated at the step 604B is cleared. Next, at the step 614, the data number counter C incremented at the step 605 is cleared and then the routine is terminated.

In the inter-cylinder air-fuel ratio imbalance judgment of the six embodiment, when the dispersion coefficient is equal to or smaller than the predetermined value, the variable correction coefficient is obtained using the above-mentioned expression 18 on the basis of the data of the unit air-fuel ratio change amount calculated during the engine operation and the data of the intake air amount acquired at the time of the calculation of the unit air-fuel ratio change amount, the unit air-fuel ratio change amount calculated during the engine operation is corrected using the obtained variable correction coefficient and the corrected unit air-fuel ratio change amount is used for inter-cylinder air-fuel ratio imbalance judgment. However, instead of this, when the dispersion coefficient is equal to or smaller than the predetermined value, a relational expression between the unit air-fuel ratio change amount and the intake air amount may be obtained using the least-square method on the basis of the data of the unit air-fuel ratio change amount calculated during the engine operation and the data of the intake air amount acquired at the time of the calculation of the unit air-fuel ratio change amount, a change amount of the unit air-fuel ratio change amount per unit intake air amount may be obtained from the obtained relational expression, the unit air-fuel ratio change amount calculated during the engine operation may be corrected using the obtained change amount as a correction coefficient and the corrected unit air-fuel ratio change amount may be used for the inter-cylinder air-fuel ratio imbalance judgment. Next, this embodiment (hereinafter, referred to as "seventh embodiment") of the inter-cylinder air-fuel ratio imbalance judgment will be explained.

In the seventh embodiment, a relational expression between the unit air-fuel ratio change amount and the intake air amount in the case where all fuel injectors are normal is previously obtained by experiments, etc., a change amount of the unit air-fuel ratio change amount per unit intake air amount is obtained from the obtained relational expression and the obtained change amount is stored as a correction coefficient (hereinafter, this correction coefficient will be referred to as "fixed correction coefficient") in the electronic control unit 60. Further, the intake air amount used for a base for judging whether inter-cylinder air-fuel ratio imbalance condition occurs is selected and the selected intake air amount is stored as a base intake air amount in the electronic control unit. Further, a unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value for judging whether the inter-cylinder air-fuel ratio imbalance condition occurs and the set judgment value is stored in the electronic control unit.

On the other hand, the unit air-fuel ratio change amount is calculated during the engine operation on the basis of the output value of the upstream air-fuel ratio sensor 55, the calculated unit air-fuel ratio change amount is stored in the electronic control unit 60, the intake air amount at the time of the calculation of the unit air-fuel ratio change amount is acquired from the air flow meter 51 and the acquired intake air amount is stored in the electronic control unit. Further, the unit air-fuel ratio change amount is integrated every the unit air-fuel ratio change amount is calculated during the engine operation and the integration value (hereinafter, this integration value will be referred to as "unit air-fuel ratio change amount integration value") is stored in the electronic control unit 60. Further, the intake air amount at the time of the calculation of the unit air-fuel ratio change amount is integrated every the unit air-fuel ratio change amount is calculated and the integration value (hereinafter, this integration value will be referred to as "intake air amount integration value") is stored in the electronic control unit. Further, the square value of the intake air amount at the time of the calculation of the unit air-fuel ratio change amount is integrated every the unit air-fuel ratio change amount is calculated and the integration value (hereinafter, this integration value will be referred to as "square intake air amount integration value") is stored in the electronic control unit. Further, the product of the unit air-fuel ratio change amount and the intake air amount at the time of the calculation of the unit air-fuel ratio change amount is integrated every the unit air-fuel ratio change amount is calculated and the integration value (hereinafter, this integration value will be referred to as "unit air-fuel ratio change amount/intake air amount integration value") is stored in the electronic control unit.

Further, when the data number in each integration value stored in the electronic control unit (as is obvious, the data numbers in the integration values are the same as each other) reaches a predetermined number, respectively, a coefficient indicating the degree of the dispersion of the data of the intake air amounts (hereinafter, this coefficient will be referred to as "dispersion coefficient") is calculated on the basis of the data of the integration values, for example, according to the following expression 23.

$$V=(\Sigma(Ga*Ga)-\Sigma Ga*\Sigma Ga/N)/(N-1) \quad (23)$$

In the above expression 23, "V" is the dispersion coefficient, "$\Sigma(Ga*Ga)$" is the square intake air amount integration value, "$\Sigma Ga$" is the intake air amount integration value" and "N" is the data number of each integration value (as is obvious, the data numbers of the integration values are the same as each other).

Further, when the thus calculated dispersion coefficient V is equal to or smaller than a predetermined value, i.e. the degree of the dispersion of the data of the intake air amounts is relatively small, the fixed correction coefficient stored in the electronic control unit 60 is used as the correction coefficient for correcting the unit air-fuel ratio change amount (the details of this usage will be explained later). On the other hand, when the dispersion coefficient is greater than the predetermined value, i.e. the degree of the dispersion of the data of the intake air amount is relatively great, a relational expression between the unit air-fuel ratio change amount and the intake air amount is obtained on the basis of the data of the unit air-fuel ratio change amount and the data of the intake air amount stored in the electronic control unit, for example, by the least-square method, the change amount of the unit air-fuel ratio change amount per unit intake air amount is obtained from the obtained relational expression and the obtained change amount is used as the correction coefficient (the variable correction coefficient) for correcting the unit air-fuel ratio change amount (the details of this usage will be explained later). It should be noted that at that time, the data of the unit air-fuel ratio change amount and the data of the intake air amount stored in the electronic control unit are eliminated, and thereafter, the unit air-fuel ratio change amount is calculated on the basis of the output value of the upstream air-fuel ratio sensor, the calculated unit air-fuel ratio change amount is newly stored in the electronic control unit, the intake air amount at the time of the calculation of the unit air-fuel ratio change amount is acquired from the air flow meter and the acquired intake air flow meter is newly stored in the electronic control unit.

Further, once it is determined whether the fixed correction coefficient or the variable correction coefficient is used as the correction coefficient, depending on the dispersion coefficient V, the unit air-fuel ratio change amount calculated on the basis of the output value of the upstream air-fuel ratio sensor 55 during the engine operation is corrected according to the following expression 24.

$$\Delta A/Favec=\Delta A/Fave+K*(Gab-Gaave) \quad (24)$$

In the above expression 24, "$\Delta A/Favec$" is the unit air-fuel ratio change amount after being corrected (i.e. the corrected unit air-fuel ratio change amount), "$\Delta A/Fave$" is the unit air-fuel ratio change amount calculated during the engine operation, "K" is the correction coefficient, that is, when the dispersion coefficient V is equal to or smaller than the predetermined value, "K" is the fixed correction coefficient and when the dispersion coefficient V is greater than the predetermined value, "K" is the variable correction coefficient, "Gab" is the base intake air amount and "Gaave" is the intake air amount at the time of the calculation of the unit air-fuel ratio change amount.

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the seventh embodiment, the unit air-fuel ratio change amount calculated during the engine operation is converted to the unit air-fuel ratio change amount in the case where the intake air amount is equal to the base intake air amount and the converted unit air-fuel ratio change amount is compared with the judgment value set to a value greater than the unit air-fuel ratio change amount in the case where the intake air amount is equal to the base intake air amount and all fuel injectors are normal by a predetermined value. In this regard, the inter-cylinder air-fuel ratio imbalance judgment of the seventh embodiment is similar to that of the first embodiment. Therefore, according to the seventh embodiment, the effects similar to those obtained by the inter-cylinder air-fuel ratio imbalance judgment of the first embodiment can be obtained.

Further, in the inter-cylinder air-fuel ratio imbalance judgment of the seventh embodiment, when the dispersion coefficient is equal to or smaller than the predetermined value, the correction coefficient previously obtained by experiments, etc. is used for correcting the unit air-fuel ratio change amount and on the other hand, when the dispersion coefficient is greater than the predetermined value, the correction coefficient calculated on the basis of the unit air-fuel ratio change amount calculated during the engine operation and the intake air amount at the time of the calculation of the unit air-fuel ratio change amount is used for correcting the unit air-fuel ratio change amount. In this regard, the inter-cylinder air-fuel ratio imbalance judgment of the seventh embodiment is similar to that of the sixth embodiment. Therefore, according to the seventh embodiment, the effects similar to those obtained by the inter-cylinder air-fuel ratio imbalance judgment of the sixth embodiment can be obtained.

It should be noted that in the inter-cylinder air-fuel ratio imbalance judgment of the seventh embodiment, the relational expression between the unit air-fuel ratio change amount and the intake air amount in the case where all fuel injectors are normal is previously obtained by experiments, etc, the change amount of the unit air-fuel ratio change amount per unit intake air amount is obtained from the obtained relational expression, the obtained change amount is stored as the fixed correction coefficient in the electronic control unit and when the dispersion coefficient is equal to or smaller than the predetermined value, the fixed correction coefficient stored in the electronic control unit is used for correcting the unit air-fuel ratio change amount calculated during the engine operation. However, if the variable correction coefficient is already calculated on the basis of the unit air-fuel ratio change amount calculated during the engine operation and the intake air amount at the time of the calculation of the unit air-fuel ratio change amount, the already calculated variable correction coefficient may be used when the dispersion coefficient is equal to or smaller than the predetermined value. According to this, it is not necessary to previously obtain the correction coefficient by experiments, etc.

Further, in the inter-cylinder air-fuel ratio imbalance judgment of the seventh embodiment, the relational expression between the unit air-fuel ratio change amount and the intake air amount in the case where all fuel injectors are normal is previously obtained by experiments, etc., the change amount of the unit air-fuel ratio change amount per unit intake air amount is obtained from the obtained relational expression, the obtained change amount is stored as the fixed correction coefficient in the electronic control unit, and when the dispersion coefficient is equal to or smaller than the predetermined value, the unit air-fuel ratio change amount calculated during the engine operation is corrected using the fixed correction coefficient stored in the electronic control unit and the corrected unit air-fuel ratio change amount is used for the inter-cylinder air-fuel ratio imbalance judgment. However, instead of this, a relational expression between the unit air-fuel ratio change amount and the intake air amount in the case where all fuel injectors are normal may be previously obtained by experiments, etc., the obtained relational expression may be stored as a fixed relational expression in the electronic control unit and when the dispersion coefficient is equal to or smaller than the predetermined value, similar to the second embodiment, the unit air-fuel ratio change amount calculated during the engine operation may be corrected using the fixed relational expression stored in the electronic control unit and the corrected unit air-fuel ratio change amount may be used for the inter-cylinder air-fuel ratio imbalance judgment.

Figure 27:
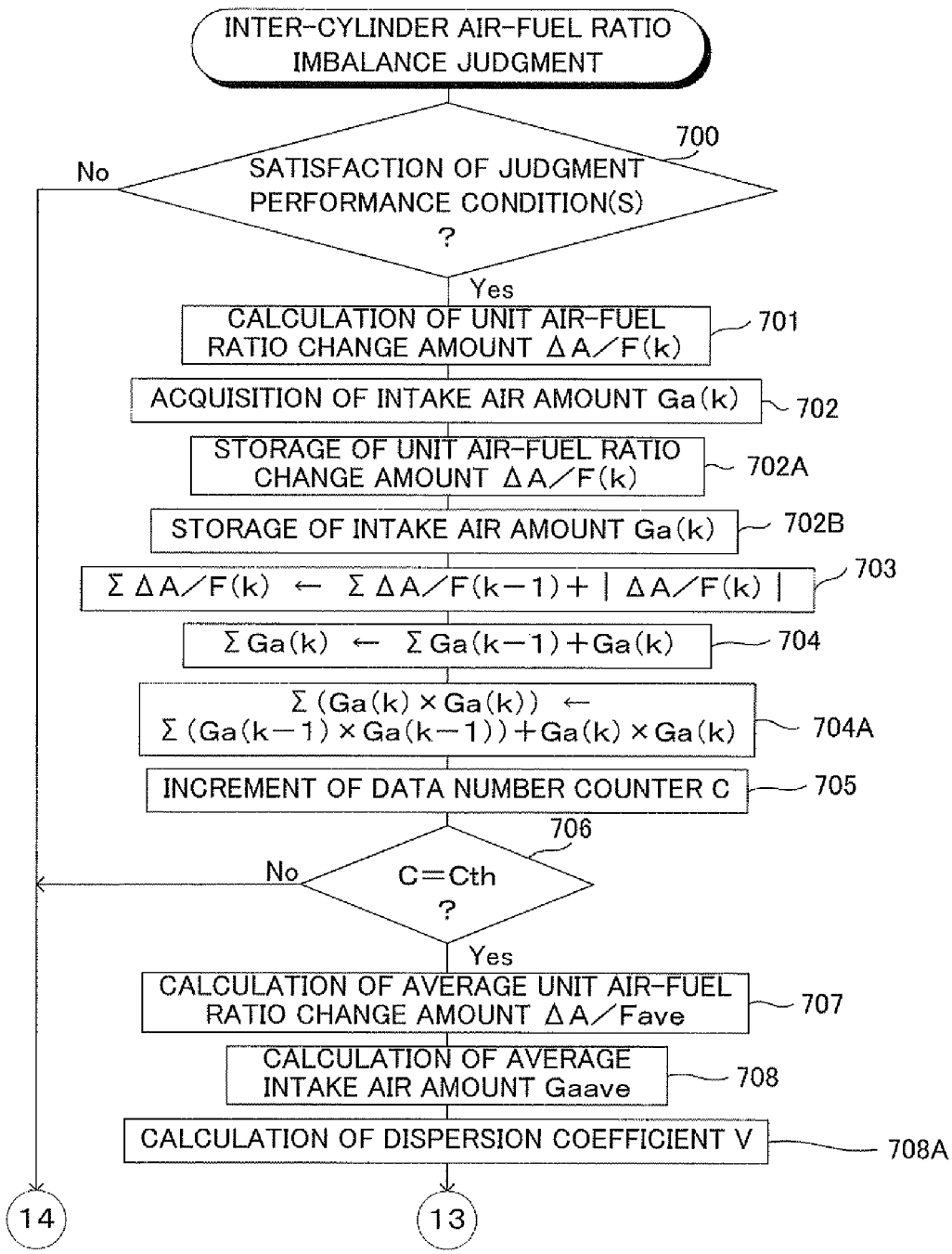
FIGS. 27 and 28 are views showing an example of a flowchart for performing an inter-cylinder air-fuel ratio imbalance judgment according to the seventh embodiment.
Figure 28:
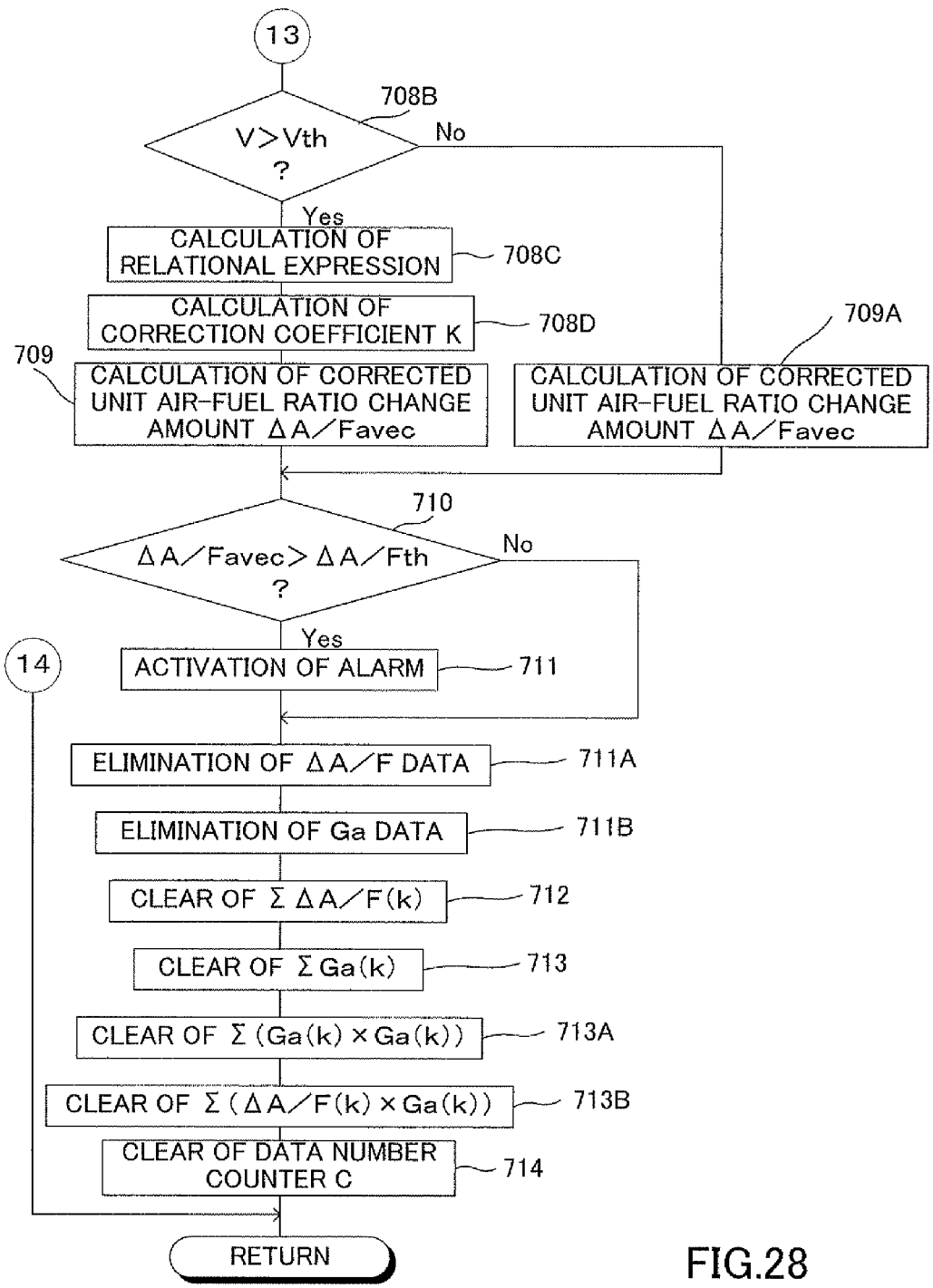

It should be noted that the inter-cylinder air-fuel ratio imbalance judgment of the seventh embodiment is performed, for example, according to a flowchart shown in FIGS. 27 and 28. Next, this flowchart will be explained.

When the routine of FIG. 27 starts, first, at the step 700, it is judged whether the condition(s) for allowing the performance of the inter-cylinder air-fuel ratio imbalance judgment is/are satisfied, for example, it is judged whether the intake air amount is within a predetermined range. When it is judged that the condition(s) for allowing the performance of the inter-cylinder air-fuel ratio imbalance judgment is/are not satisfied, the routine is directly terminated. On the other hand, it is judged that the condition(s) for allowing the performance of the inter-cylinder air-fuel ratio imbalance judgment is/are satisfied, the routine proceeds to the step 701 and the steps following the step 701.

When at the step 700, it is judged that the condition(s) for allowing the performance of the inter-cylinder air-fuel ratio imbalance judgment is/are satisfied and then the routine proceeds to the step 701, the unit air-fuel ratio change amount $\Delta A/F(k)$ is calculated on the basis of the output value of the upstream air-fuel ratio sensor 55. Next, at the step 702, the present intake air amount $Ga(k)$ is acquired from the air flow meter 51. Next, at the step 702A, the unit air-fuel ratio change amount $\Delta A/F(k)$ calculated at the step 701 is stored in the electronic control unit 60. Next, at the step 702B, the intake air amount $Ga(k)$ acquired at the step 702 is stored in the electronic control unit. Next, at the step 703, the integration value $\Sigma\Delta A/F(k)$ of the unit air-fuel ratio change amounts at this performance of the routine of FIG. 27 is calculated (i.e. the integration value of the unit air-fuel ratio change amounts is updated) by adding the absolute value $|\Delta A/F(k)|$ of the unit air-fuel ratio change amount calculated at the step 701 to the integration value $\Sigma\Delta A/F(k-1)$ of the unit air-fuel ratio change amounts calculated at the step 703 at the last performance of the routine of FIG. 27. Next, at the step 704, the integration value $\Sigma Ga(k)$ of the intake air amounts at this performance of the routine of FIG. 27 is calculated (i.e. the integration value of the intake air amounts is updated) by adding the intake air amount $Ga(k)$ acquired at the step 702 to the integration value $\Sigma Ga(k-1)$ of the intake air amounts calculated at the step 704 at the last performance of the routine of FIG. 27. Next, at the step 704A, the square intake air amount integration value $\Sigma(Ga(k)*Ga(k))$ at this performance of the routine of FIG. 27 is calculated (i.e. the square intake air amount integration value is updated) by adding the square value $Ga(k)*Ga(k)$ of the intake air amount $Ga(k)$ acquired at the step 702 to the square intake air amount integration value $\Sigma(Ga(k-1)*Ga(k-1))$ calculated at the step 704A at the last performance of the routine of FIG. 27. Next, at the step 705, the data number counter C is incremented, which data number counter C indicates the number of the absolute values $|\Delta A/F(k)|$ of the unit air-fuel ratio change amounts added to the integration value $\Sigma\Delta A/F$ of the unit air-fuel ratio change amounts calculated at the step 703. As is obvious, the data number counter C also indicates the number of the intake air amounts added to the integration value $\Sigma Ga$ of the intake air amounts calculated at the step 704, the number of the square values of the intake air amounts added to the square intake air amount integration value $\Sigma(Ga(k)*Ga(k))$ calculated at the step 704A and the number of the products of the unit air-fuel ratio change amount and the intake air amount added to the unit air-fuel ratio change amount/intake air amount integration value $\Sigma(\Delta A/F(k)*Ga(k))$ calculated at the step 704B.

Next, at the step 706, it is judged whether the data number counter C incremented at the step 705 reaches a predetermined value Cth (C=Cth). When it is judged that C≈Cth, the routine is directly terminated. On the other hand, when it is judged that C=Cth, the routine proceeds to the step 707 and the steps following the step 707.

When at the step 706, it is judged that C=Cth and then the routine proceeds to the step 707, the average value $\Delta A/Fave$ of the unit air-fuel ratio change amounts is calculated by dividing the integration value $\Sigma\Delta A/F$ of the unit air-fuel ratio change amounts calculated at the step 703 by the data number counter C incremented at the step 705. Next, at the step 708, the average value Gaave of the intake air amounts is calculated by dividing the integration value $\Sigma Ga$ of the intake air amounts calculated at the step 704 by the data number counter C incremented at the step 705. Next, at the step 708A, a dispersion coefficient V is calculated according to the following expression 25 (this is the same as the above-mentioned expression 23) on the basis of the integration value $\Sigma Ga$ of the intake air amounts calculated at the step 704, the square intake air amount integration value Σ(Ga*Ga) calculated at the step 704A and a data number N which indicates the same number as that indicated by the data number counter C incremented at the step 705.

$$V=(\Sigma(Ga*Ga)-\Sigma Ga*\Sigma Ga/N)/(N-1) \quad (25)$$

Next, at the step 708B shown in FIG. 28, it is judged whether the dispersion coefficient V calculated at the step 708A is greater than a predetermined value Vth (V>Vth). When it is judged that V>Vth, the routine proceeds to the step 708C. On the other hand, when it is judged that V≦Vth, the routine proceeds to the step 709A.

When at the step 708B, it is judged that V>Vth, i.e. the degree of the dispersion of the intake air amount data is relatively great, and then the routine proceeds to the step 708C, a relational expression between the unit air-fuel ratio change amount and the intake air amount is calculated by the least-square method on the basis of the unit air-fuel ratio change amount ΔA/F(k) stored in the electronic control unit at the step 702A and remaining in the electronic control unit at present and the intake air amount Ga(k) stored in the electronic control unit at the step 702B and remaining in the electronic control unit at present. Next, at the step 708D, the change amount of the unit air-fuel ratio change amount per unit intake air amount is calculated as the correction coefficient K (the variable correction coefficient) from the relational expression calculated at the step 708C.

Next, at the step 709, the corrected unit air-fuel ration change amount ΔA/Favec is calculated according to the following expression 26 (this is the same as the above-mentioned expression 24) on the basis of the average unit air-fuel ratio change amount ΔA/Fave calculated at the step 707, the average intake air amount Gaave calculated at the step 708, the correction coefficient K, i.e. the variable correction coefficient calculated at the step 708D and the base intake air amount Gab and then the routine proceeds to the step 710.

$$\Delta A/Favec=\Delta A/Fave+K*(Gab-Gaave) \quad (26)$$

On the other hand, when at the step 708B, it is judged that V≦Vth, i.e. it is judged that the degree of the dispersion of the intake air amount data is relatively small, and then the routine proceeds to the step 709A, the corrected unit air-fuel ration change amount ΔA/Favec is calculated according to the above-expression 26 on the basis of the average unit air-fuel ratio change amount ΔA/Fave calculated at the step 707, the average intake air amount Gaave calculated at the step 708, the correction coefficient K, i.e. the fixed correction coefficient stored in the electronic control unit 60 and the base intake air amount Gab and then the routine proceeds to the step 710.

Next, at the step 710, it is judged whether the corrected unit air-fuel ratio change amount ΔA/Favec calculated at the step 709 or 709A is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 711 and the alarm is activated for informing that the inter-cylinder air-fuel ratio imbalance condition occurs, and then the routine proceeds to the step 711A. On the other hand, when it is judged that ΔA/Favec≦ΔA/Fth, i.e. it is judged that no inter-cylinder air-fuel ratio imbalance condition occurs, the routine proceeds directly to the step 711A.

When at the step 711, the alarm is activated after it is judged that ΔA/Favec>ΔA/Fth at the step 710 and then the routine proceeds to the step 711A or when at the step 710, it is judged that ΔA/Favec≦ΔA/Fth and then the routine proceeds to the step 711A, the data of the unit air-fuel ratio change amount ΔA/F stored in the electronic control unit 60 is eliminated. Next, at the step 711B, the data of the intake air amount Ga stored in the electronic control unit is eliminated. Next, at the step 712, the integration value ΣΔA/F of the unit air-fuel ratio change amounts calculated at the step 703 shown in FIG. 27 is cleared. Next, at the step 713, the integration value ΣGa of the intake air amounts calculated at the step 704 is cleared. Next, at the step 713A, the square intake air amount integration value Σ(Ga*Ga) calculated at the step 704A is cleared. Next, at the step 713B, the unit air-fuel ratio change amount/intake air amount integration value Σ(ΔA/F*Ga) calculated at the step 704B is cleared. Next, at the step 714, the data number counter C incremented at the step 705 is cleared and then the routine is terminated.

In the inter-cylinder air-fuel ratio imbalance judgment of the sixth embodiment, when the dispersion coefficient is equal to or smaller than the predetermined value, the variable correction coefficient is obtained using the above-mentioned expression 18 on the basis of the data of the unit air-fuel ratio change amount calculated during the engine operation and the data of the intake air amount acquired at the time of the calculation of the unit air-fuel ratio change amount, the unit air-fuel ratio change amount calculated during the engine operation is corrected using the obtained variable correction coefficient and the corrected unit air-fuel ratio change amount is used for the inter-cylinder air-fuel ratio imbalance judgment. In this regard, in stead of this, when the dispersion coefficient is equal to or smaller than the predetermined value, a relational expression between the unit air-fuel ratio change amount and the intake air amount may be obtained using the least-square method on the basis of the data of the unit air-fuel ratio change amount calculated during the engine operation and the data of the intake air amount acquired at the time of the calculation of the unit air-fuel ratio change amount, the unit air-fuel ratio change amount calculated during the engine operation may be corrected using the obtained relational expression and the corrected unit air-fuel ratio change amount may be used for the inter-cylinder air-fuel ratio imbalance judgment. Next, this embodiment (hereinafter, referred to as "eighth embodiment") of the inter-cylinder air-fuel ratio imbalance judgment will be explained.

In the inter-cylinder air-fuel ratio imbalance judgment of the eighth embodiment, a relational expression between the unit air-fuel ratio change amount and the intake air amount in the case where all fuel injectors are normal is previously obtained by experiments and the obtained relational expression (hereinafter, this relational expression will be referred to as "fixed relational expression") is stored in the electronic control unit 60. In this regard, assuming that the unit air-fuel ratio change amount is indicated by "ΔA/F" and the intake air amount is indicated by "Ga", the above-mentioned fixed relational expression is described by the following expression 27 (this is the same as the above-mentioned expression 3).

$$\Delta A/F=a*Ga+b \quad (27)$$

In the above expression 27, "a" is the slope and "b" is the intercept.

Further, an intake air amount used as a base at the judgment of whether the inter-cylinder air-fuel ratio imbalance condition occurs is previously selected and the selected intake air amount is stored as a base intake air amount in the electronic control unit 60. Further, the unit air-fuel ratio change amount in the case where all fuel injectors are normal and the intake air amount is equal to the base intake air amount is previously obtained by experiments, etc., the unit air-fuel ratio change amount greater than the obtained unit air-fuel ratio change amount by a predetermined value is set to a judgment value used for judging whether the inter-cylinder air-fuel ratio imbalance condition occurs and the set judgment value is stored in the electronic control unit.

On the other hand, the unit air-fuel ratio change amount is integrated every the unit air-fuel ratio change amount is calculated during the engine operation and the integration value (hereinafter, this integration value will be referred to as "unit air-fuel ratio change amount integration value") is stored in the electronic control unit 60. Further, the intake air amount at the time of the calculation of the unit air-fuel ratio change amount is integrated every the unit air-fuel ratio change amount is calculated and the integration value (hereinafter, this integration value will be referred to as "intake air amount integration value") is stored in the electronic control unit. Further, the square value of the intake air amount at the time of the calculation of the unit air-fuel ratio change amount is integrated every the unit air-fuel ratio change amount is calculated and this integration value (hereinafter, this integration value will be referred to as "square intake air amount integration value") is stored in the electronic control unit.

Further, when the data number in each integration value stored in the electronic control unit (as is obvious, the data numbers in the integration values are the same as each other) reaches a predetermined number, respectively, a coefficient indicating the degree of the dispersion of the data of the intake air amounts (hereinafter, this coefficient will be referred to as "dispersion coefficient") is calculated on the basis of the data of the integration values, for example, according to the following expression 28 (this is the same as the above-mentioned expression 17).

$$V = (\Sigma(Ga*Ga) - \Sigma Ga*\Sigma Ga/N)/(N-1) \qquad (28)$$

In the above expression 28, "V" is the dispersion coefficient, "$\Sigma(Ga*Ga)$" is the square intake air amount integration value, "$\Sigma Ga$" is the intake air amount integration value" and "N" is the data number of each integration value (as is obvious, the data numbers of the integration values are the same as each other).

Further, when the thus calculated dispersion coefficient V is equal to or smaller than a predetermined value, i.e. the degree of the dispersion of the data of the intake air amounts is relatively small, the relational expression (the above-mentioned expression 27) between the unit air-fuel ratio change amount and the intake air amount stored in the electronic control unit 60 is used for correcting the unit air-fuel ratio change amount (the details of this usage will be explained later). On the other hand, when the dispersion coefficient is greater than the predetermined value, i.e. the degree of the dispersion of the data of the intake air amount is relatively great, a relational expression between the unit air-fuel ratio change amount and the intake air amount is obtained on the basis of the data of the unit air-fuel ratio change amount and the data of the intake air amount stored in the electronic control unit 60, for example, by the least-square method and the obtained relational expression (hereinafter, this relational expression will be referred to as "variable relational expression") is used for correcting the unit air-fuel ratio change amount (the details of this usage will be explained later). It should be noted that the variable relational expression is described by the following expression 29 (this is the same as the above-mentioned expression 3).

$$\Delta A/F = a*Ga + b \qquad (29)$$

In the above expression 29, "a" is the slope and "b" is the intercept.

Further, the unit air-fuel ratio change amount is calculated on the basis of the output value of the upstream air-fuel ratio sensor 55 during the engine operation and the calculated unit air-fuel ratio change amount is corrected according to the following expression 30 (this is the same as the above-mentioned expression 4).

$$\Delta A/Favec = \Delta A/Fave*(\Delta A/Fb/\Delta A/Fa) \qquad (30)$$

In the above expression 30, "$\Delta A/Favec$" is the unit air-fuel ratio change amount after being corrected (i.e. corrected unit air-fuel ratio change amount) and "$\Delta A/Fave$" is the unit air-fuel ratio change amount calculated during the engine operation.

Further, when the dispersion coefficient V is equal to or smaller than the predetermined value, in the above expression 30, "$\Delta A/Fb$" is the unit air-fuel ratio change amount (i.e. base unit air-fuel ratio change amount) calculated by applying the base intake air amount to the fixed relational expression (the above-mentioned expression 27) stored in the electronic control unit 60 and "$\Delta A/Fa$" is the unit air-fuel ratio change amount (i.e. provisional unit air-fuel ratio change amount) calculated by applying the intake air amount at the time of the calculation of the unit air-fuel ratio change amount to the above-mentioned fixed relational expression (the above-mentioned expression 27).

On the other hand, when the dispersion coefficient V is greater than the predetermined value, in the above-mentioned expression 30, "$\Delta A/Fb$" is the unit air-fuel ratio change amount (i.e. base unit air-fuel ratio change amount) calculated by applying the base intake air amount to the above-mentioned variable relational expression (the above-mentioned expression 29) and "$\Delta A/Fa$" is the unit air-fuel ratio change amount (i.e. provisional unit air-fuel ratio change amount) calculated by applying the intake air amount at the time of the calculation of the unit air-fuel ratio change amount to the above-mentioned variable relational expression (the above-mentioned expression 29).

Further, the thus calculated corrected unit air-fuel ratio change amount $\Delta A/Favec$ is compared with the judgment value stored in the electronic control unit 60 and when the corrected unit air-fuel ratio change amount is equal to or smaller than the judgment value, it is judged that no inter-cylinder air-fuel ratio imbalance condition occurs. On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the eighth embodiment, the unit air-fuel ratio change amount calculated during the engine operation is converted to the unit air-fuel ratio change amount in the case where the intake air amount is equal to the base intake air amount and the converted unit air-fuel ratio change amount is compared with the judgment value set to a value greater than the unit air-fuel ratio change amount in the case where the intake air amount is equal to the base intake air amount and all fuel injectors are normal by a predetermined value. In this regard, the inter-cylinder air-fuel ratio imbalance judgment of the eighth embodiment is similar to that of the second embodiment. Therefore, according to the eighth embodiment, the effects similar to those obtained by the inter-cylinder air-fuel ratio imbalance judgment of the second embodiment can be obtained.

Further, in the inter-cylinder air-fuel ratio imbalance judgment of the eighth embodiment, when the dispersion coefficient is equal to or smaller than the predetermined value, the relational expression between the unit air-fuel ratio change amount and the intake air amount previously obtained by experiments, etc. is used for correcting the unit air-fuel ratio change amount and on the other hand, when the dispersion coefficient is greater than the predetermined value, the relational expression between the unit air-fuel ratio change amount and the intake air amount calculated on the basis of the unit air-fuel ratio change amount calculated during the engine operation and the intake air amount at the time of the calculation of the unit air-fuel ratio change amount is used for correcting the unit air-fuel ratio change amount. In this regard, the inter-cylinder air-fuel ratio imbalance judgment of the eighth embodiment is similar to that of the sixth embodiment. Therefore, according to the eighth embodiment, the effects similar to those obtained by the inter-cylinder air-fuel ratio imbalance judgment of the sixth embodiment can be obtained.

It should be noted that in the inter-cylinder air-fuel ratio imbalance judgment of the eighth embodiment, the relational expression between the unit air-fuel ratio change amount and the intake air amount in the case where all fuel injectors are normal is previously obtained by experiments, etc, the obtained relational expression is stored in the electronic control unit and when the dispersion coefficient is equal to or smaller than the predetermined value, the relational expression between the unit air-fuel ratio change amount and the intake air amount stored in the electronic control unit is used for correcting the unit air-fuel ratio change amount calculated during the engine operation. However, if the variable relational expression is already calculated on the basis of the unit air-fuel ratio change amount calculated during the engine operation and the intake air amount at the time of the calculation of the unit air-fuel ratio change amount, the already calculated variable relational expression may be used when the dispersion coefficient is equal to or smaller than the predetermined value. According to this, it is not necessary to previously obtain the relational expression between the unit air-fuel ratio change amount and the intake air amount by experiments, etc.

Further, in the inter-cylinder air-fuel ratio imbalance judgment of the eighth embodiment, the relational expression between the unit air-fuel ratio change amount and the intake air amount in the case where all fuel injectors are normal is previously obtained by experiments, etc., the obtained relational expression is stored as the fixed relational expression in the electronic control unit, and when the dispersion coefficient is equal to or smaller than the predetermined value, the unit air-fuel ratio change amount calculated during the engine operation is corrected using the fixed relational expression stored in the electronic control unit and the corrected unit air-fuel ratio change amount is used for the inter-cylinder air-fuel ratio imbalance judgment. However, instead of this, a relational expression between the unit air-fuel ratio change amount and the intake air amount in the case where all fuel injectors are normal may be previously obtained by experiments, etc., a change amount of the unit air-fuel ratio change amount per unit intake air amount may be obtained from the obtained relational expression and the obtained change amount may be stored as a fixed correction coefficient in the electronic control unit and when the dispersion coefficient is equal to or smaller than the predetermined value, the unit air-fuel ratio change amount calculated during the engine operation may be corrected using the fixed correction coefficient stored in the electronic control unit and the corrected unit air-fuel ratio change amount may be used for the inter-cylinder air-fuel ratio imbalance judgment.

Figure 29:
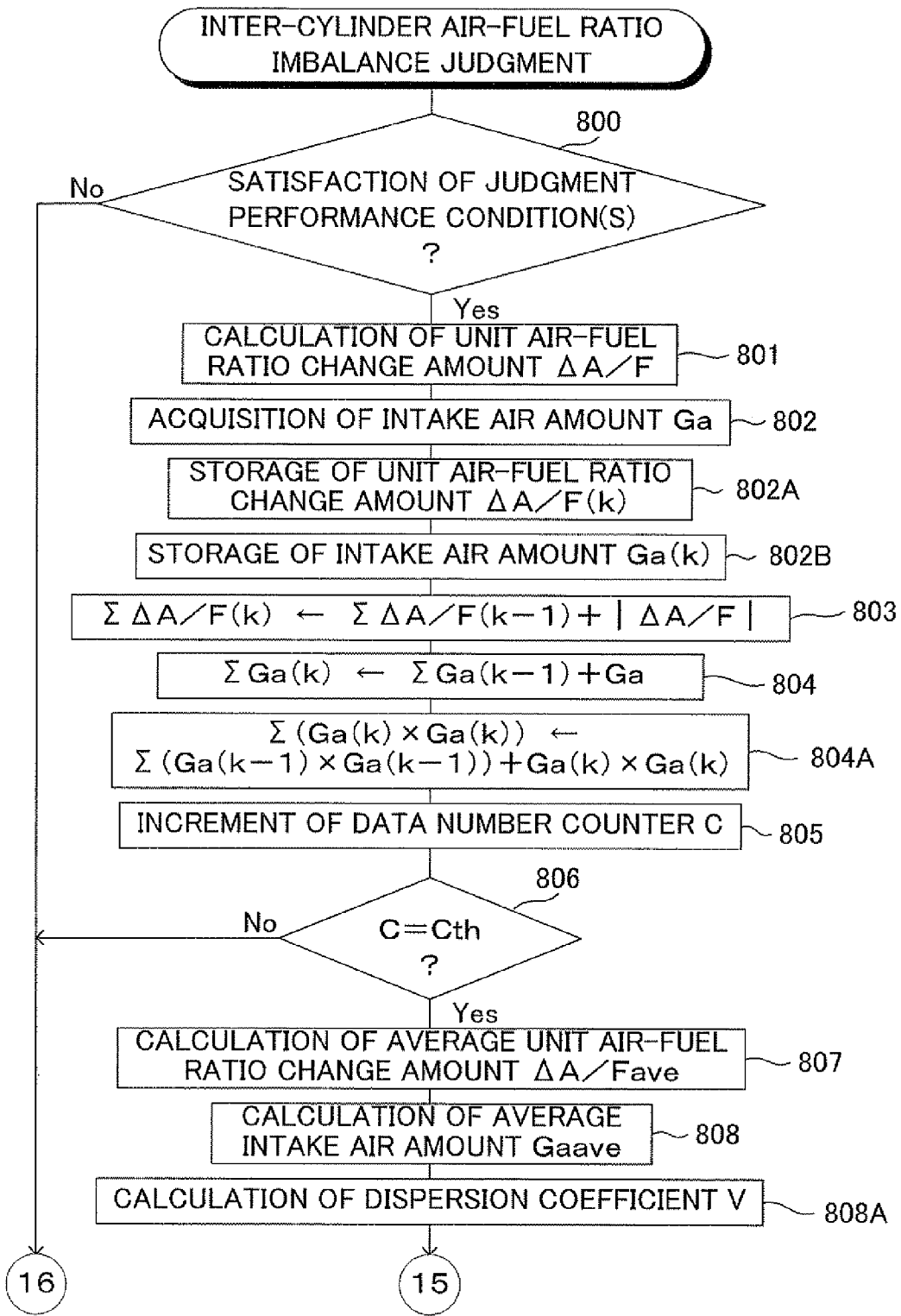
FIGS. 29 to 31 are views showing an example of a flowchart for performing an inter-cylinder air-fuel ratio imbalance judgment according to the eighth embodiment.
Figure 30:
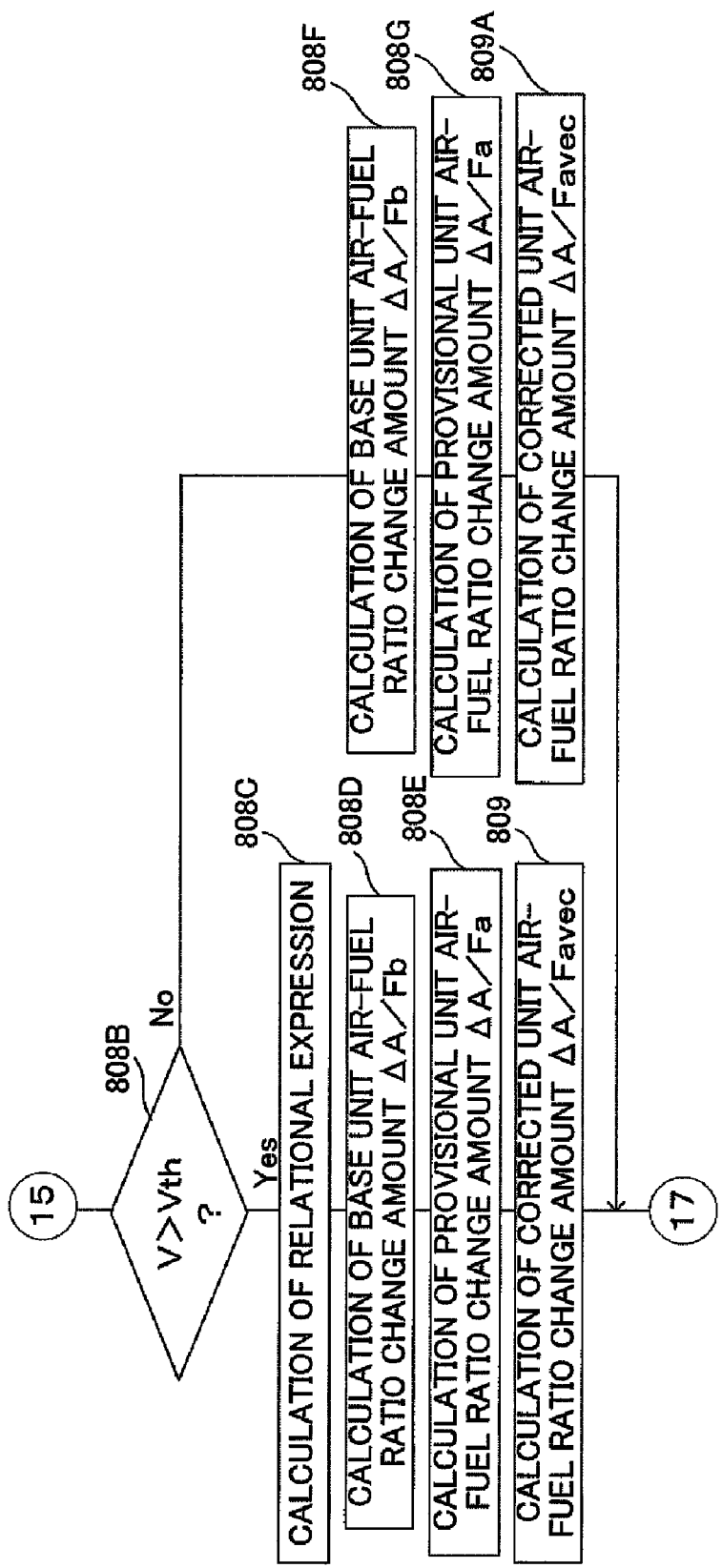
Figure 31:
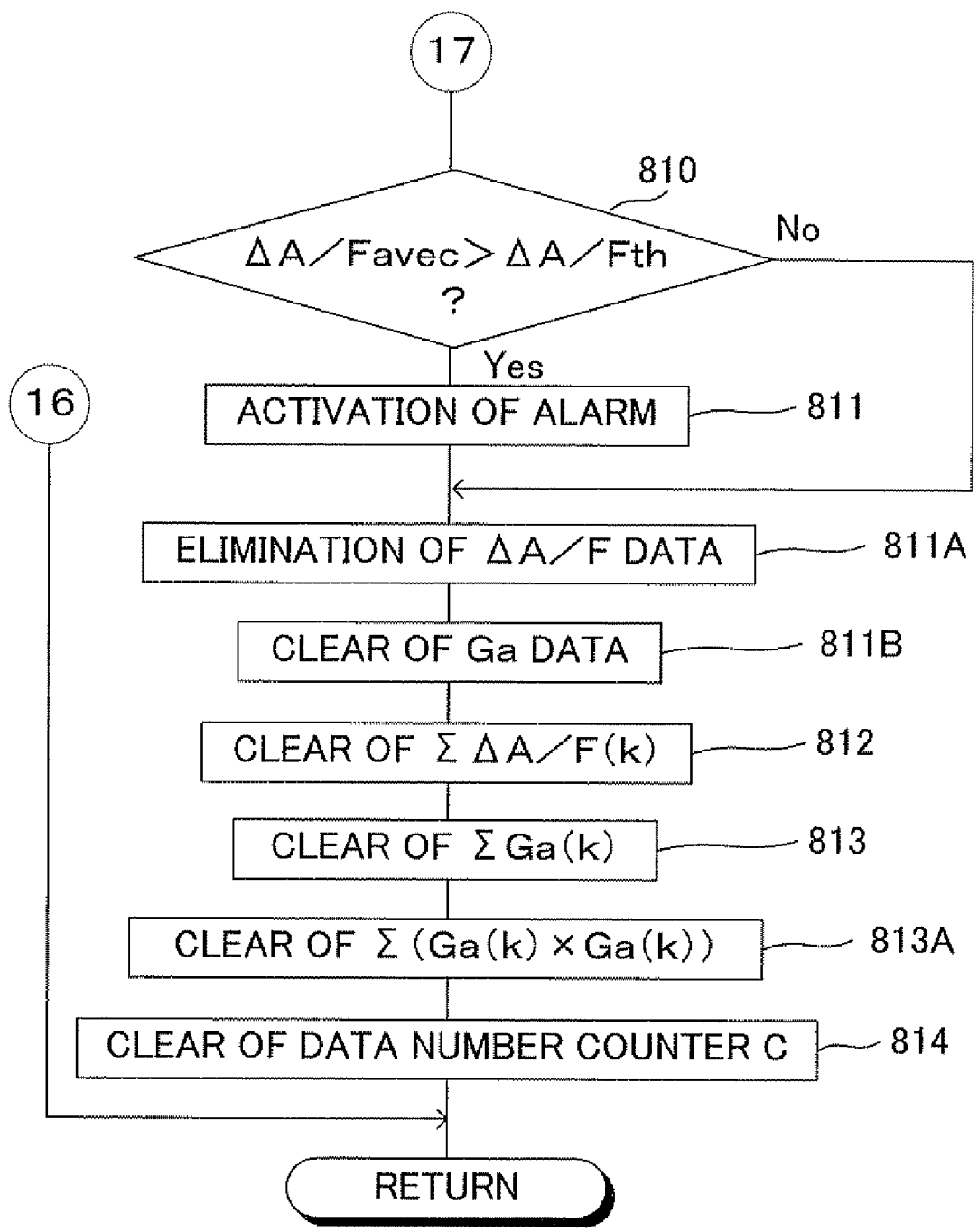

It should be noted that the inter-cylinder air-fuel ratio imbalance judgment of the eighth embodiment is performed, for example, according to a flowchart shown in FIGS. 29 to 31. Next, this flowchart will be explained.

When the routine of FIG. 29 starts, first, at the step 800, it is judged whether the condition(s) for allowing the performance of the inter-cylinder air-fuel ratio imbalance judgment is/are satisfied, for example, it is judged whether the intake air amount is within a predetermined range. When it is judged that the condition(s) for allowing the performance of the inter-cylinder air-fuel ratio imbalance judgment is/are not satisfied, the routine is directly terminated. On the other hand, it is judged that the condition(s) for allowing the performance of the inter-cylinder air-fuel ratio imbalance judgment is/are satisfied, the routine proceeds to the step 801 and the steps following the step 801.

When at the step 800, it is judged that the condition(s) for allowing the performance of the inter-cylinder air-fuel ratio imbalance judgment is/are satisfied and then the routine proceeds to the step 801, the unit air-fuel ratio change amount $\Delta A/F(k)$ is calculated on the basis of the output value of the upstream air-fuel ratio sensor 55. Next, at the step 802, the present intake air amount Ga(k) is acquired from the air flow meter 51. Next, at the step 802A, the unit air-fuel ratio change amount $\Delta A/F(k)$ calculated at the step 801 is stored in the electronic control unit 60. Next, at the step 802B, the intake air amount Ga(k) acquired at the step 802 is stored in the electronic control unit. Next, at the step 803, the integration value $\Sigma \Delta A/F(k)$ of the unit air-fuel ratio change amounts at this performance of the routine of FIG. 29 is calculated (i.e. the integration value of the unit air-fuel ratio change amounts is updated) by adding the absolute value $|\Delta A/F(k)|$ of the unit air-fuel ratio change amount calculated at the step 801 to the integration value $\Sigma \Delta A/F(k-1)$ of the unit air-fuel ratio change amounts calculated at the step 803 at the last performance of the routine of FIG. 29. Next, at the step 804, the integration value $\Sigma Ga(k)$ of the intake air amounts at this performance of the routine of FIG. 29 is calculated (i.e. the integration value of the intake air amounts is updated) by adding the intake air amount Ga(k) acquired at the step 802 to the integration value $\Sigma Ga(k-1)$ of the intake air amounts calculated at the step 804 at the last performance of the routine of FIG. 29. Next, at the step 804A, the square intake air amount integration value $\Sigma(Ga(k)*Ga(k))$ at this performance of the routine of FIG. 29 is calculated (i.e. the square intake air amount integration value is updated) by adding the square value $Ga(k)*Ga(k)$ of the intake air amount Ga(k) acquired at the step 802 to the square intake air amount integration value $\Sigma(Ga(k-1)*Ga(k-1))$ calculated at the step 804A at the last performance of the routine of FIG. 29. Next, at the step 805, the data number counter C is incremented, which data number counter C indicates the number of the absolute values $|\Delta A/F(k)|$ of the unit air-fuel ratio change amounts added to the integration value $\Sigma \Delta A/F$ of the unit air-fuel ratio change amounts calculated at the step 803. As is obvious, the data number counter C also indicates the number of the intake air amounts added to the integration value $\Sigma Ga$ of the intake air amounts calculated at the step 804, the number of the data of the unit air-fuel ratio change amounts $\Delta A/F(I)$ stored in the electronic control unit at the step 802A and remaining in the electronic control unit at present, the number of the data of the intake air amount Ga(k) stored in the electronic control unit at the step 802B and remaining in the electronic control unit at present and the number of the square values of the intake air amounts added to the square intake air amount integration value $\Sigma(Ga(k)*Ga(k))$ calculated at the step 804A.

Next, at the step 806, it is judged whether the data number counter C incremented at the step 805 reaches a predetermined value Cth (C=Cth). When it is judged that C≠Cth, the routine is directly terminated. On the other hand, when it is judged that C=Cth, the routine proceeds to the step 807 and the steps following the step 807.

When at the step 806, it is judged that C=Cth and then the routine proceeds to the step 807, the average value ΔA/Fave of the unit air-fuel ratio change amounts is calculated by dividing the integration value ΣΔA/F of the unit air-fuel ratio change amounts calculated at the step 803 by the data number counter C incremented at the step 805. Next, at the step 808, the average value Gaave of the intake air amounts is calculated by dividing the integration value ΣGa of the intake air amounts calculated at the step 804 by the data number counter C incremented at the step 805. Next, at the step 808A, a dispersion coefficient V is calculated according to the following expression 31 (this is the same as the above-mentioned expression 28) on the basis of the integration value ΣGa of the intake air amounts calculated at the step 804, the square intake air amount integration value Σ(Ga*Ga) calculated at the step 804A and a data number N which indicates the same number as that indicated by the data number counter C incremented at the step 805.

$$V = ((Ga*Ga) - \Sigma Ga * \Sigma Ga/N)/(N-1) \quad (31)$$

Next, at the step 808B shown in FIG. 30, it is judged whether the dispersion coefficient V calculated at the step 808A is greater than a predetermined value Vth (V>Vth). When it is judged that V>Vth, the routine proceeds to the step 808C. On the other hand, when it is judged that V≦Vth, the routine proceeds to the step 808F.

When at the step 808B, it is judged that V>Vth, i.e. the degree of the dispersion of the intake air amount data is relatively great, and then the routine proceeds to the step 808C, a relational expression (variable relational expression) between the unit air-fuel ratio change amount and the intake air amount is calculated by the least-square method on the basis of the unit air-fuel ratio change amount ΔA/F(k) stored in the electronic control unit at the step 802A and remaining in the electronic control unit at present and the intake air amount Ga(k) stored in the electronic control unit at the step 802B and remaining in the electronic control unit at present. It should be noted that the relational expression calculated at the step 802B is the following expression 32 (this is the same as the above-mentioned expression 29).

$$\Delta A/F = a*Ga+b \quad (32)$$

Next, at the step 808D, the base unit air-fuel ratio change amount ΔA/Fb is calculated by applying the base intake air amount Gab to "Ga" of the above-mentioned expression 32 (the variable relational expression). Next, at the step 808E, the provisional unit air-fuel ratio change amount ΔA/Fa is calculated by applying the average value Gaave of the intake air amounts calculated at the step 808 to "Ga" of the above-mentioned expression 32. Next, at the step 809, the average value of the unit air-fuel ratio change amounts is corrected by applying the average value ΔA/Fave of the unit air-fuel ratio change amounts calculated at the step 807, the base unit air-fuel ratio change amount ΔA/Fb calculated at the step 808D and the provisional unit air-fuel ratio change amount ΔA/Fa calculated at the step 808E to the following expression 33 (this is the same as the above-mentioned expression 30) and thereby the corrected unit air-fuel ratio change amount ΔA/Favec is calculated and then the routine proceeds to the step 810 shown in FIG. 31.

$$\Delta A/Favec = \Delta A/Fave * (\Delta A/Fb/\Delta A/Fa) \quad (33)$$

On the other hand, when at the step 808B, it is judged that V≦Vth, i.e. it is judged that the degree of the dispersion of the intake air amount data is relatively small, and then the routine proceeds to the step 808F, the base unit air-fuel ration change amount ΔA/Fb is calculated by applying the base intake air amount Gab to "Ga" of the above-expression 27 (the fixed relational expression) at the step 808F. Next, at the step 808G, the provisional unit air-fuel ration change amount ΔA/Fa is calculated by applying the average value Gaave of the intake air amount calculated at the step 808 to "Ga" of the above-expression 27. Next, at the step 809A, the average value of the unit air-fuel ratio change amounts is corrected by applying the average value ΔA/Fave of the unit air-fuel ratio change amounts calculated at the step 807, the base unit air-fuel ratio change amount ΔA/Fb calculated at the step 808F and the provisional unit air-fuel ratio change amount ΔA/Fa calculated at the step 808G to the above-mentioned expression 33 and thereby the corrected unit air-fuel ratio change amount ΔA/Favec is calculated and then the routine proceeds to the step 810 shown in FIG. 31.

Next, at the step 810 shown in FIG. 31, it is judged whether the corrected unit air-fuel ratio change amount ΔA/Favec calculated at the step 809 or 809A is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 811 and the alarm is activated for informing that the inter-cylinder air-fuel ratio imbalance condition occurs, and then the routine proceeds to the step 811A. On the other hand, when it is judged that ΔA/Favec≦ΔA/Fth, i.e. it is judged that no inter-cylinder air-fuel ratio imbalance condition occurs, the routine proceeds directly to the step 811A.

When at the step 811, the alarm is activated after it is judged that ΔA/Favec>ΔA/Fth at the step 810 and then the routine proceeds to the step 811A or when at the step 810, it is judged that ΔA/Favec≦ΔA/Fth and then the routine proceeds to the step 811A, the data of the unit air-fuel ratio change amount ΔA/F stored in the electronic control unit 60 is eliminated. Next, at the step 811B, the data of the intake air amount Ga stored in the electronic control unit is eliminated. Next, at the step 812, the integration value ΣΔA/F of the unit air-fuel ratio change amounts calculated at the step 803 shown in FIG. 29 is cleared. Next, at the step 813, the integration value ΣGa of the intake air amounts calculated at the step 804 is cleared. Next, at the step 813A, the square intake air amount integration value Σ(Ga*Ga) calculated at the step 804A is cleared. Next, at the step 814, the data number counter C incremented at the step 805 is cleared and then the routine is terminated.

In the inter-cylinder air-fuel ratio imbalance judgment of the first embodiment, the unit air-fuel ratio change amount is calculated during the engine operation and the intake air amount at this performance of the calculation of the unit air-fuel ratio change amount is read from the air flow meter 51, then the calculated unit air-fuel ratio change amount is corrected using the read intake air amount and then it is judged whether the inter-cylinder air-fuel ratio imbalance condition occurs using the corrected unit air-fuel ratio change amount. That is, in consideration of the change of the unit air-fuel ratio change amount, depending on the intake air amount, the unit air-fuel ratio change amount is corrected using the intake air amount corresponding the unit air-fuel ratio change amount in question and it is judged whether the inter-cylinder air-fuel ratio imbalance condition occurs using the corrected unit air-fuel ratio change amount.

In this regard, it takes a certain time for the air to reach the air-fuel ratio detecting element 55a after the air passes the air flow meter 51. Therefore, strictly, the intake air amount detected by the air flow meter when the unit air-fuel ratio change amount is calculated on the basis of the output value of the upstream air-fuel ratio sensor does not correspond to the amount of the exhaust gas reaching the air-fuel detecting element of the upstream air-fuel ratio sensor when the unit air-fuel ratio change amount is calculated. Accordingly, when the unit air-fuel ratio change amount is calculated on the basis of the output value of the upstream air-fuel ratio sensor, the intake air amount exactly corresponding to the calculated air-fuel ratio change amount is the intake air amount detected by the air flow meter before the present by the time necessary for the air to reach the air-fuel ratio detecting element of the upstream air-fuel ratio sensor after the air passes the air flow meter.

Therefore, in the inter-cylinder air-fuel ratio imbalance judgment of the first embodiment, in consideration of the time necessary for the air to reach the air-fuel detecting element of the upstream air-fuel ratio sensor after the air passes the air flow meter, the unit air-fuel ratio change amount calculated during the engine operation may be corrected and it may be judged whether the inter-cylinder air-fuel ratio imbalance condition occurs using the corrected unit air-fuel ratio change amount. Next, this embodiment (hereinafter, will be referred to as "ninth embodiment") of the inter-cylinder air-fuel ratio imbalance judgment will be explained.

Figure 32:
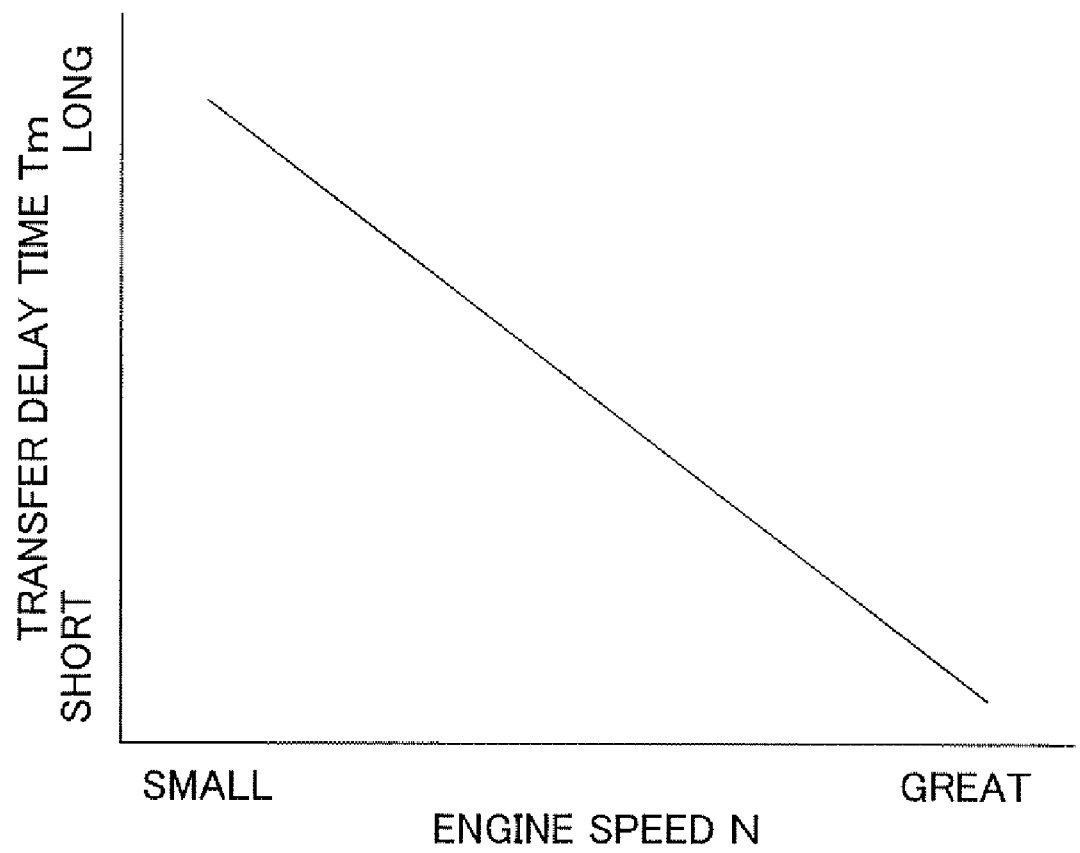
FIG. 32 a view showing a map used to calculate a transfer delay time.

In the ninth embodiment, the time necessary for the air to reach the air-fuel ratio detecting element 55a of the upstream air-fuel ratio sensor 55 after the air passes the air flow meter 51, depending on the engine speed is previously obtained by experiments, etc. and as shown in FIG. 32, is stored as transfer delay time Tm in the electronic control unit 60 in the form of a map as a function of the engine speed N. Further, a relational expression between the unit air-fuel ratio change amount and the intake air amount in the case where all fuel injectors are normal is previously obtained by experiments, etc., a change amount of the unit air-fuel ratio change amount per unit intake air amount is obtained from the obtained relational expression and the obtained change amount is stored as a correction coefficient in the electronic control unit 60. As is obvious, the intake air amount used for obtaining the correction coefficient is the intake air amount detected by the air flow meter before the time of the calculation of the corresponding unit air-fuel ratio change amount by the transfer delay time, depending on the engine speed.

Further, an intake air amount used for a base at the judgment of whether the inter-cylinder air-fuel ratio imbalance condition occurs is previously selected and the selected intake air amount is stored as a base intake air amount in the electronic control unit. Further, the unit air-fuel ratio change amount in the case where all fuel injectors are normal and the intake air amount is equal to the base intake air amount is previously obtained by experiments, etc., a unit air-fuel ratio change amount greater than the obtained unit air-fuel ratio change amount by a predetermined value is set to a judgment value used for judging whether the inter-cylinder air-fuel ratio imbalance condition occurs and the set judgment value is stored in the electronic control unit.

Further, the unit air-fuel ratio change amount is calculated on the basis of the output value of the upstream air-fuel ratio sensor 55 during the engine operation. Further, the transfer delay time Tm is obtained from the map of FIG. 32 on the basis of the engine speed at the time of the calculation of the unit air-fuel ratio change amount. Further, the intake air amount before the time of the calculation of the unit air-fuel ratio change amount by the above-obtained transfer delay time Tm is read. Further, the above-calculated unit air-fuel ratio change amount is corrected according to the following expression 34 (this is the same as the above-mentioned expression 1).

$$\Delta A/Favec = \Delta A/Fave + K^*(Gab - Gaave) \tag{34}$$

In the above expression 34, "$\Delta A/Favec$" is the unit air-fuel ratio change amount after being corrected (hereinafter, this unit air-fuel ratio change amount will be referred to as "corrected unit air-fuel ratio change amount"), "$\Delta A/Fave$" is the unit air-fuel ratio change amount calculated during the engine operation, "K" is the above-mentioned correction coefficient stored in the electronic control unit 60, "Gab" is the base intake air amount and "Gaave" is the intake air amount before the time of the calculation of the unit air-fuel ratio change amount by the obtained transfer delay time Tm.

Further, the thus calculated corrected unit air-fuel ratio change amount $\Delta A/Fave$ is compared with the judgment value stored in the electronic control unit 60 and when the corrected unit air-fuel ratio change amount is equal to or smaller than the judgment value, it is judged that no inter-cylinder air-fuel ratio imbalance condition occurs.

On the other hand, when the corrected unit air-fuel ratio change amount is greater than the judgment value, it is judged that the inter-cylinder air-fuel ratio imbalance condition occurs.

That is, in the inter-cylinder air-fuel ratio imbalance judgment of the ninth embodiment, the unit air-fuel ratio change amount calculated during the engine operation is converted to a unit air-fuel ratio change amount in the case where the intake air amount is equal to the base intake air amount and the converted unit air-fuel ratio change amount is compared with the judgment value set to a value greater than the unit air-fuel ratio change amount in the case where the intake air amount is equal to the base intake air amount and the all fuel injectors are normal by a predetermined value. In this regard, the inter-cylinder air-fuel ratio imbalance judgment of the ninth embodiment is similar to that of the first embodiment. Therefore, according to the ninth embodiment, the effects similar to those obtained by the inter-cylinder air-fuel ratio imbalance judgment of the first embodiment can be obtained.

Further, in the inter-cylinder air-fuel ratio imbalance judgment of the ninth embodiment, the unit air-fuel ratio change amount is corrected using the intake air amount exactly corresponding to the unit air-fuel ratio change amount calculated during the engine operation and it is judged whether the inter-cylinder air-fuel ratio imbalance condition occurs on the basis of the corrected unit air-fuel ratio change amount. Therefore, the inter-cylinder air-fuel ratio imbalance condition can be accurately judged.

Figure 33:
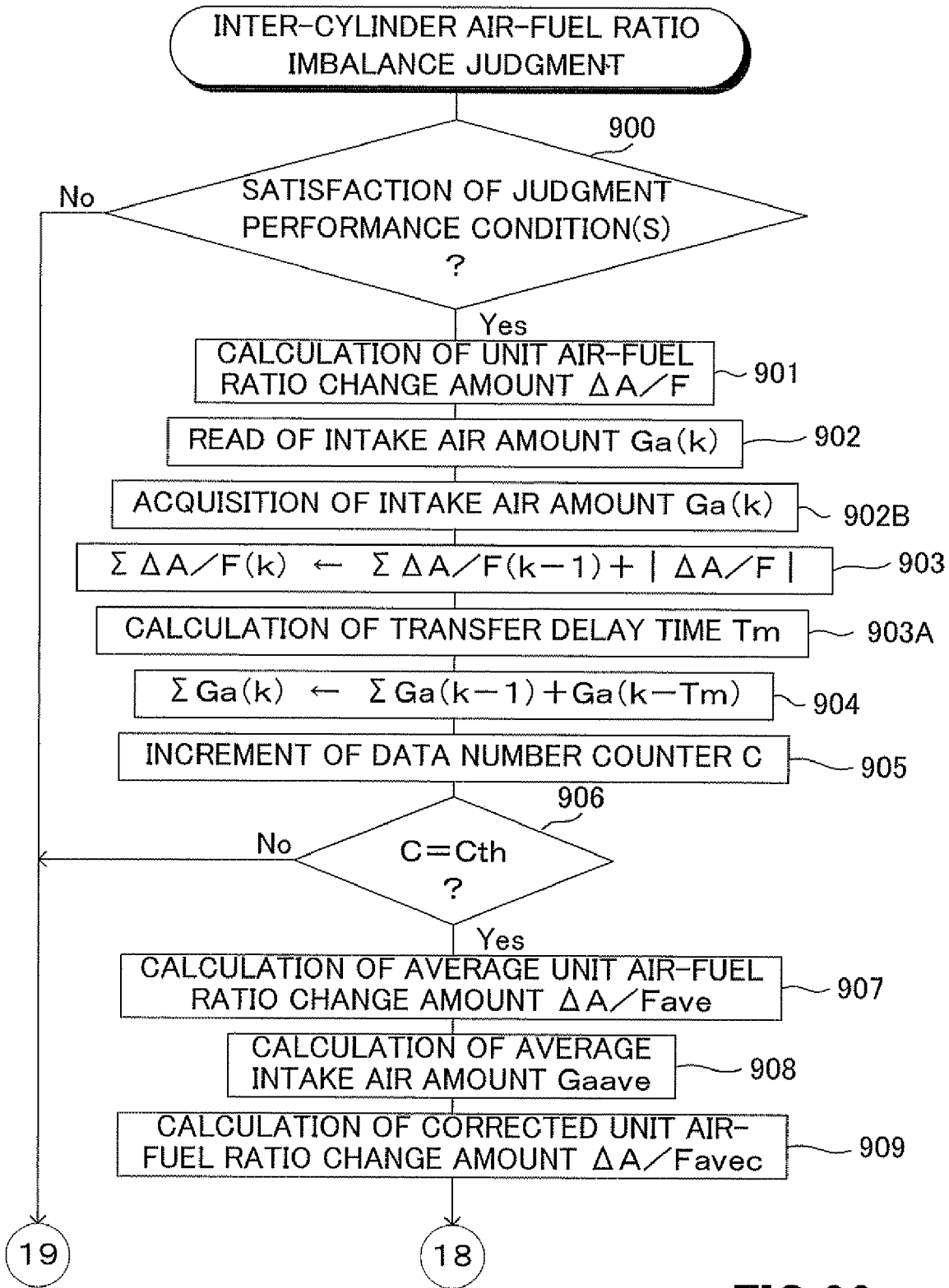
FIGS. 33 and 34 are views showing an example of a flowchart for performing an inter-cylinder air-fuel ratio imbalance judgment according to the ninth embodiment.
Figure 34:
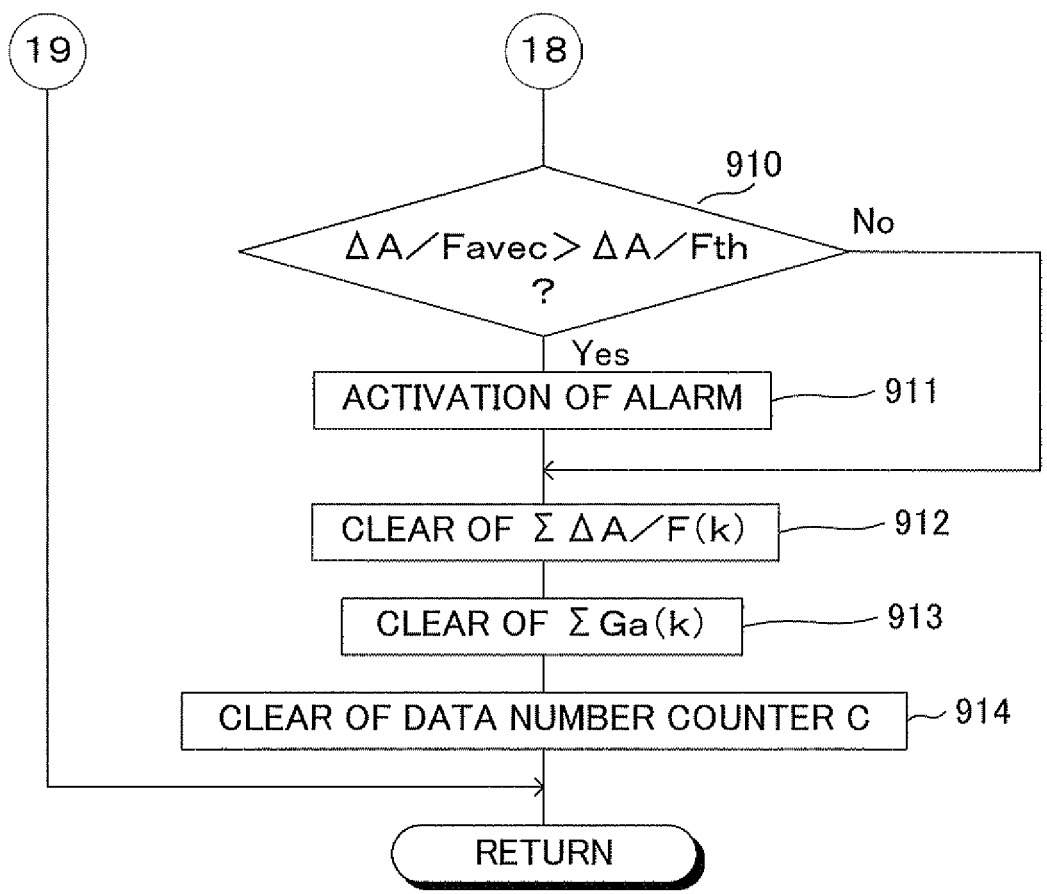

It should be noted that the inter-cylinder air-fuel ratio imbalance judgment of the ninth embodiment is performed, for example, according to a flowchart shown in FIGS. 33 and 34. Next, this flowchart will be explained. It should be noted that the steps 905 to 909 shown in FIG. 33 are the same as the steps 105 to 109 shown in FIG. 15, respectively and therefore the explanations thereof will be omitted. Further, the steps 910 to 914 shown in FIG. 34 are the same as the steps 110 to 114 shown in FIG. 16, respectively and therefore the explanations thereof will be omitted.

When the routine of FIG. 33 starts, first, at the step 900, it is judged whether the condition(s) for allowing the performance of the inter-cylinder air-fuel ratio imbalance judgment is/are satisfied, for example, it is judged whether the intake air amount is within a predetermined range. When it is judged that the condition(s) for allowing the performance of the inter-cylinder air-fuel ratio imbalance judgment is/are not satisfied, the routine is directly terminated. On the other hand, the condition(s) for allowing the performance of the inter-cylinder air-fuel ratio imbalance judgment is/are satisfied, the routine proceeds to the step 901 and the steps following the step 901.

When at the step 900, it is judged that the condition(s) for allowing the performance of the inter-cylinder air-fuel ratio imbalance judgment is/are satisfied, and then the routine proceeds to the step 901, the unit air-fuel ratio change amount ΔA/F is calculated on the basis of the output value of the upstream air-fuel ratio sensor 55. Next, at the step 902, the present intake air amount Ga is acquired from the air flow meter 51. Next, at the step 902B, the intake air amount Ga (k) acquired at the step 902 is stored as the intake air amount at present in the electronic control unit. Next, at the step 903, an integration value ΣΔA/F(k) of the unit air-fuel ratio change amounts at this performance of the routine of FIG. 33 is calculated (i.e. the integration value of the unit air-fuel ratio change amounts is updated) by adding the absolute value |ΔA/F| of the unit air-fuel ratio change amount calculated at the step 901 to the integration value ΣΔA/F(k−1) of the unit air-fuel ratio change amounts calculated at the step 903 at the last performance of the routine of FIG. 33. Next, at the step 903A, the transfer delay time Tm is calculated from the map shown in FIG. 32, depending on the engine speed N. Next, at the step 904, an integration value ΣGa(k) of the intake air amounts at this performance of the routine of FIG. 33 is calculated (i.e. the integration value of the intake air amounts is updated) by adding the intake air amount Ga(k−Tm) out of the intake air amounts acquired at the step 902 and stored in the electronic control unit before the present by the transfer delay time Tm to the integration value ΣGa(k−1) of the intake air amounts calculated at the step 904 at the last performance of the routine of FIG. 33. That is, the integration value ΣGa of the intake air amounts calculated at the step 904 is calculated by integrating the intake air amounts, each of which is the intake air amount when the air corresponding to the exhaust gas having the air-fuel ratio corresponding to the output value of the upstream air-fuel ratio sensor 55 used for calculating the unit air-fuel ratio change amount added to the integration value ΣΔA/F of the unit air-fuel ratio change amounts calculated at the step 903 passed the air flow meter 51.

Next, at the step 905, a data number counter C is incremented, which data number counter C indicates the number of the absolute values |ΔA/F| of the unit air-fuel ratio change amounts added to the integration value ΣΔA/F of the unit air-fuel ratio change amounts calculated at the step 903. As is obvious, the data number counter C also indicates the number of the intake air amounts added to the integration value ΣGa of the intake air amounts calculated at the step 904.

Further, when at the step 906, it is judged that C=Cth and then the routine proceeds to the step 907, the average value ΔA/Fave of the unit air-fuel ratio change amounts is calculated by dividing the integration value ΣΔA/F of the unit air-fuel ratio change amounts calculated at the step 903 by the data number counter C incremented at the step 905, and then at the step 908, the average value Gaave of the intake air amounts is calculated by dividing the integration value ΣGa of the intake air amounts calculated at the step 904 by the data number counter C incremented at the step 905. As explained above, the integration value ΣGa of the intake air amounts calculated at the step 904 is the integration value of the intake air amounts, each of which is the intake air amount when the air corresponding to the exhaust gas having the air-fuel ratio corresponding to the output value of the upstream air-fuel ratio sensor 55 used for calculating the unit air-fuel ratio change amount added to the integration value ΣΔA/F of the unit air-fuel ratio change amounts calculated at the step 903 passed the air flow meter 51. Accordingly, the average value Gaave of the intake air amounts calculated by dividing this integration value of the intake air amounts by the data number counter C incremented at the step 905 exactly corresponds to the amount of the exhaust gas having the air-fuel ratio corresponding to the average value ΔA/Fave of the unit air-fuel ratio change amounts calculated at the step 907.

Further, at the step 909, the average value of the unit air-fuel ratio change amounts is corrected by applying the average value ΔA/Fave of the unit air-fuel ratio change amounts calculated at the step 907, the base intake air amount Gab and the average value Gaave of the intake air amounts calculated at the step 908 to the following expression 35 (this is the same as the above-mentioned expression 34) and thereby the corrected unit air-fuel ratio change amount ΔA/Favec is calculated.

$$\Delta A/Favec = \Delta A/Fave + K^*(Gab - Gaave) \quad (35)$$

Next, at the step 910 shown in FIG. 34, it is judged whether the corrected unit air-fuel ratio change amount ΔA/Favec calculated at the step 909 is greater than a judgment value ΔA/Fth (ΔA/Favec>ΔA/Fth). When it is judged that ΔA/Favec>ΔA/Fth, i.e. it is judged that the inter-cylinder air-fuel ratio imbalance condition occurs, the routine proceeds to the step 911 and an alarm is activated for informing that the inter-cylinder air-fuel ratio imbalance condition occurs, and then the routine proceeds to the step 912. On the other hand, when it is judged that ΔA/Favec≦ΔA/Fth, i.e. it is judged that no inter-cylinder air-fuel ratio imbalance condition occurs, the routine proceeds directly to the step 912.

It should be noted that also in the inter-cylinder air-fuel ratio imbalance judgment of the second to eighth embodiments, the unit air-fuel ratio change amount is calculated during the engine operation and the intake air amount at the calculation of the unit air-fuel ratio change amount is acquired from the air flow meter 51, and the provisional unit air-fuel ratio change amount is calculated using the acquired intake air amount in the second embodiment, the correction coefficient (the variable correction coefficient) is calculated and the unit air-fuel ratio change amount calculated during the engine operation is corrected using the acquired intake air amount in the third embodiment, the relational expression between the unit air-fuel ratio change amount and the intake air amount is calculated and the unit air-fuel ratio change amount calculated during the engine operation is corrected using the acquired intake air amount in the fourth embodiment, the relational expression between the unit air-fuel ratio and the intake air amount is calculated and the provisional unit air-fuel ratio change amount is calculated in the fifth embodiment, the dispersion coefficient is calculated, the correction coefficient (the variable correction coefficient) is calculated and the unit air-fuel ratio calculated during the engine operation is corrected in the sixth embodiment, the dispersion coefficient is calculated, the relational expression between the unit air-fuel ration change amount and the intake air amount is calculated and the unit air-fuel ratio change amount calculated during the engine operation is corrected in the seventh embodiment, and the dispersion coefficient is calculated, the relational expression between the unit air-fuel ratio change amount and the intake air amount is calculated and the provisional unit air-fuel ratio change amount is calculated in the eighth embodiment. Accordingly, as the intake air amount used for the calculation of these parameters, similar to the inter-cylinder air-fuel ratio imbalance judgment of the ninth embodiment, the intake air amount in consideration of the time which the air passing the air flow meter takes to reach the air-fuel ratio detecting element of the upstream air-fuel ratio sensor may be used.

Further, the above-explained embodiments are those in the case where the inter-cylinder air-fuel ratio imbalance judgment device of the invention is applied to the spark ignition type multi-cylinder internal combustion engine. However, the inter-cylinder air-fuel ratio imbalance judgment device of the invention can be applied to the compression ignition type multi-cylinder internal combustion engine without any inconsistency.

The invention claimed is:

1. In a multi-cylinder internal combustion engine, having a plurality of combustion chambers, fuel injectors arranged corresponding to said combustion chambers, respectively and an air-fuel ratio sensor arranged for detecting an air-fuel ratio of an exhaust gas in one of an exhaust passage converging portion where exhaust passages in communication with said corresponding combustion chambers converge and an exhaust passage portion downstream of said exhaust passage converging portion, wherein an amount of fuel injected from each fuel injector is controlled such that an air-fuel ratio of a mixture formed in each combustion chamber becomes a target air-fuel ratio on the basis of an output value of said air-fuel ratio sensor, an inter-cylinder air-fuel ratio imbalance judgment device for the multi-cylinder internal combustion engine for judging whether there is an inter-cylinder air-fuel ratio imbalance condition where a difference in the air-fuel ratio of the mixture between said combustion chambers is greater than a predetermined air-fuel ratio difference, wherein assuming that an amount of air introduced into said combustion chamber is referred to as an intake air amount, an amount of change of the air-fuel ratio of the exhaust gas detected by said air-fuel ratio sensor per unit time is referred to as a unit air-fuel ratio change amount, and the unit air-fuel ratio change amount when the difference in the air-fuel ratio of the mixture between said combustion chambers is smaller than or equal to said predetermined air-fuel ratio difference and the intake air amount is a specific intake air amount is referred to as a base unit air-fuel ratio change amount, one of said base unit air-fuel ratio change amount and the unit air-fuel ratio change amount greater than said base unit air-fuel ratio change amount by a predetermined value is set as a judgment value, wherein the unit air-fuel ratio change amount is calculated during the operation of said internal combustion engine, wherein when the intake air amount is smaller than said specific intake air amount, the unit air-fuel ratio change amount calculated during the operation of said internal combustion engine is corrected such that the unit air-fuel ratio change amount increases in the condition that said base unit air-fuel ratio change amount is an upper limit for the corrected unit air-fuel ratio change amount, wherein when the intake air amount is greater than said specific intake air amount, the unit air-fuel ratio change amount calculated during the operation of said internal combustion engine is corrected such that the unit air-fuel ratio change amount decreases in the condition that said base unit air-fuel ratio change amount is a lower limit for the corrected unit air-fuel ratio change amount, and wherein when the corrected unit air-fuel ratio change amount is greater than said judgment value, it is judged that the inter-cylinder air-fuel ratio imbalance condition occurs.

2. The inter-cylinder air-fuel ratio imbalance judgment device for the multi-cylinder internal combustion engine, set forth in claim 1, wherein assuming that the unit air-fuel ratio change amount per a unit intake air amount obtained from a relational expression between the unit air-fuel ratio change amount and the intake air amount when the difference in the air-fuel ratio of the mixture between the combustion chambers is referred to as a correction coefficient, and the difference of said specific intake air amount relative to the intake air amount corresponding to the unit air-fuel ratio change amount calculated during the operation of said internal combustion engine is referred to as an intake air amount difference, the unit air-fuel ratio change amount calculated during the operation of said internal combustion engine is corrected by adding a value obtained by multiplying said correction coefficient by the intake air amount difference to the unit air-fuel ratio change amount calculated during the operation of said internal combustion engine.

3. The inter-cylinder air-fuel ratio imbalance judgment device for the multi-cylinder internal combustion engine, set forth in claim 1, wherein assuming that a relational expression between the unit air-fuel ratio change amount and the intake air amount when the difference in the air-fuel ratio of the mixture between said combustion chambers is smaller or equal to said predetermined air-fuel ratio difference is referred to as a base relational expression, the unit air-fuel ratio change amount obtained from said base relational expression when the intake air amount corresponding to the unit air-fuel ration change amount calculated during the operation of said internal combustion engine is applied to said base relational expression is acquired as a provisional unit air-fuel ratio change amount and the unit air-fuel ratio change amount obtained from said base relational expression when said specific intake air amount is applied to said base relational expression is acquired as said base unit air-fuel ratio change amount, and wherein the unit air-fuel ratio change amount calculated during the operation of said internal combustion engine is corrected by multiplying the unit air-fuel ratio change amount calculated during the operation of said internal combustion engine by a ratio of said base unit air-fuel ratio change amount relative to said provisional unit air-fuel ratio change amount.

4. The inter-cylinder air-fuel ratio imbalance judgment device for the multi-cylinder internal combustion engine, set forth in claim 2, wherein said correction coefficient is obtained on the basis of a unit air-fuel ratio change amount calculated during the operation of said internal combustion engine and the intake air amount associated with said unit air-fuel ratio change amount.

5. The inter-cylinder air-fuel ratio imbalance judgment device for the multi-cylinder internal combustion engine, set forth in claim 3, wherein said base relational expression is obtained on the basis of a unit air-fuel ratio change amount calculated during the operation of said internal combustion engine and the intake air amount associated with said calculated unit air-fuel ratio change amount.

6. The inter-cylinder air-fuel ratio imbalance judgment device for the multi-cylinder internal combustion engine, set forth in claim 4,
- wherein a degree of dispersion of a plurality of intake air amounts acquired in association with the unit air-fuel ratio change amounts calculated during the operation of said internal combustion engine is calculated as a dispersion degree,
- wherein when said calculated dispersion degree is greater than a predetermined dispersion degree, a change amount of the unit air-fuel ratio change amount obtained from a relational expression between the intake air amount and the unit air-fuel ratio change amount obtained on the basis of the unit air-fuel ratio change amount calculated during the operation of said internal combustion engine and the intake air amount acquired in association with said unit air-fuel ration change amount is used as said correction coefficient, and
- wherein when the calculated dispersion degree is smaller than or equal to said predetermined dispersion degree, a change amount of a previously obtained unit air-fuel ratio change amount is used as said correction coefficient.

7. The inter-cylinder air-fuel ratio imbalance judgment device for the multi-cylinder internal combustion engine, set forth in claim 5,
- wherein a degree of dispersion of the intake air amounts acquired in association with the unit air-fuel ratio change amount calculated during the operation of said internal combustion engine is calculated as a dispersion degree,
- wherein when the calculated dispersion degree is greater than a predetermined dispersion degree, a relational expression between the intake air amount and the unit air-fuel ratio change amount obtained on the basis of the unit air-fuel ratio change amount calculated during the operation of said internal combustion engine and the intake air amount acquired in association with said unit air-fuel ratio change amount is used as said base relational expression, and
- wherein when the calculated dispersion degree is smaller than or equal to said predetermined dispersion degree, a relational expression between a previously obtained unit air-fuel ratio change amount and the intake air amount is used to said base relational expression.

8. The inter-cylinder air-fuel ratio imbalance judgment device for the multi-cylinder internal combustion engine, set forth in claim 1, comprising an air flow meter for detecting the intake air amount in an intake passage,
- wherein assuming that a time which the air takes from the passage of the air through said air flow meter to the detection of the air-fuel ratio of the exhaust gas by said air-fuel ratio sensor, which exhaust gas corresponds to said air passing through said air flow meter and reaching said air-fuel ratio sensor, is referred to as an air transfer delay time, the intake air amount detected by said air flow meter prior to the time of detection of the air-fuel ratio of the exhaust gas by said air-fuel ratio sensor by said air transfer delay time, which exhaust gas is used for calculation of the unit air-fuel ratio change amount when the unit air-fuel ratio change amount is calculated during the operation of said internal combustion engine, is used as the intake air amount corresponding to the unit air-fuel ratio change amount calculated during said internal combustion engine.

9. The inter-cylinder air-fuel ratio imbalance judgment device for the multi-cylinder internal combustion engine, set forth in claim 1,
- wherein the judgment of whether there is the inter-cylinder air-fuel ratio imbalance condition is performed when the intake air amount is within a predetermined range.

\* \* \* \* \*